United States Patent
Kim et al.

(10) Patent No.: US 12,265,424 B2
(45) Date of Patent: Apr. 1, 2025

(54) DISPLAY DEVICE

(71) Applicant: Samsung Display Co., Ltd., Yongin-si (KR)

(72) Inventors: Tae Woong Kim, Seongnam-si (KR); Sangjun Lee, Hwaseong-si (KR); Beomjin Kim, Asan-si (KR); Jonghwa Lee, Hwaseong-si (KR); Jin Hwan Choi, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 108 days.

(21) Appl. No.: 17/719,843

(22) Filed: Apr. 13, 2022

(65) Prior Publication Data

US 2023/0056973 A1    Feb. 23, 2023

(30) Foreign Application Priority Data

Aug. 23, 2021   (KR) .................... 10-2021-0110761

(51) Int. Cl.
*G06F 1/16*   (2006.01)
(52) U.S. Cl.
CPC .......... *G06F 1/1652* (2013.01); *G06F 1/1656* (2013.01)
(58) Field of Classification Search
CPC .... G06F 1/1652; G06F 1/1656; G06F 1/1637; G09F 9/301; F16H 19/06; F16H 21/18
See application file for complete search history.

(56) References Cited

U.S. PATENT DOCUMENTS

| | | | |
|---|---|---|---|
| 10,111,344 B2 | 10/2018 | Han et al. | |
| 10,223,942 B2 | 3/2019 | Chu | |
| 10,362,690 B2 | 7/2019 | Han | |
| 10,687,428 B2 | 6/2020 | Kim et al. | |
| 11,013,130 B2 | 5/2021 | Shin et al. | |
| 2016/0363960 A1* | 12/2016 | Park | G09F 15/0062 |
| 2017/0103735 A1* | 4/2017 | Oh | G06F 1/1626 |
| 2017/0188708 A1 | 7/2017 | Yu et al. | |
| 2017/0364119 A1* | 12/2017 | Lee | G06F 1/1652 |
| 2021/0068280 A1 | 3/2021 | Han et al. | |
| 2022/0179457 A1 | 6/2022 | Seol et al. | |
| 2022/0201108 A1* | 6/2022 | Kim | G06F 1/1626 |

FOREIGN PATENT DOCUMENTS

| | | | |
|---|---|---|---|
| KR | 200445233 Y1 | 7/2009 | |
| KR | 1020170006012 A | 1/2017 | |
| KR | 1020170095636 A | 8/2017 | |
| KR | 101966787 B1 | 4/2019 | |
| KR | 1020190054427 A | 5/2019 | |
| KR | 1020190054430 A | 5/2019 | |
| KR | 102252772 B1 | 5/2021 | |

* cited by examiner

*Primary Examiner* — Md Saiful A Siddiqui
(74) *Attorney, Agent, or Firm* — CANTOR COLBURN LLP

(57) ABSTRACT

A display device includes: a display module, a lifting part disposed on a rear surface of the display module and connected to the display module, and a drive belt connected to the lifting part and which moves in a first direction to extend and retract the lifting part in the first direction. The drive belt moves along a guide groove that is defined in the lifting part and that is open in the first direction.

20 Claims, 44 Drawing Sheets

DISPLAY DEVICE

This application claims priority to Korean Patent Application No. 10-2021-0110761 filed on Aug. 23, 2021, and all the benefits accruing therefrom under 35 U.S.C. § 119, the content of which in its entirety is herein incorporated by reference.

BACKGROUND

Embodiments of the present disclosure described herein relate to a display device.

An electronic device, such as a smart phone, a digital camera, a notebook computer, a navigation device, a smart television, or the like, which provides an image to a user include a display device for displaying an image. The display device generates an image and provides the generated image to the user through a display screen.

With the development of display device technologies, various forms of display devices have been developed. For example, various flexible display devices that can be curved, folded, or rolled have been developed. The flexible display device may be easy to carry and may improve user convenience.

The shape of a flexible display panel used in the flexible display device may be diversely modified. The flexible display panel may be deformed in a predetermined shape, may be accommodated in a housing, and may be flatly extended outside the housing. When the display panel is extended outside the housing, a structure for moving the display panel upward is desirable.

SUMMARY

Embodiments of the present disclosure provide a display device including a lifting part disposed on a rear surface of a display module to support the display module more flatly when the display module is extended outside a housing.

According to an embodiment, a display device includes: a display module; a lifting part disposed on a rear surface of the display module and connected to the display module; and a drive belt that is connected to the lifting part and which moves in a first direction to extend and retract the lifting part in the first direction. The drive belt moves along a guide groove that is defined in the lifting part and that is open in the first direction.

According to an embodiment, a display device includes: a display module; a plurality of support parts coupled to the display module, the plurality of support parts being arranged in a first direction and coupled to move relative to each other in the first direction, and a drive belt connected to the uppermost support part among the plurality of support parts and disposed in a guide groove defined in each of the plurality of support parts except for the uppermost support part. A $k^{th}$ support part is connected to at least a part of opposite sides of a $(k+1)^{th}$ support part disposed under the $k^{th}$ support part and moves in the first direction, the plurality of support parts includes the $k^{th}$ support part and the $(k+1)^{th}$ support part, and k is a natural number.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
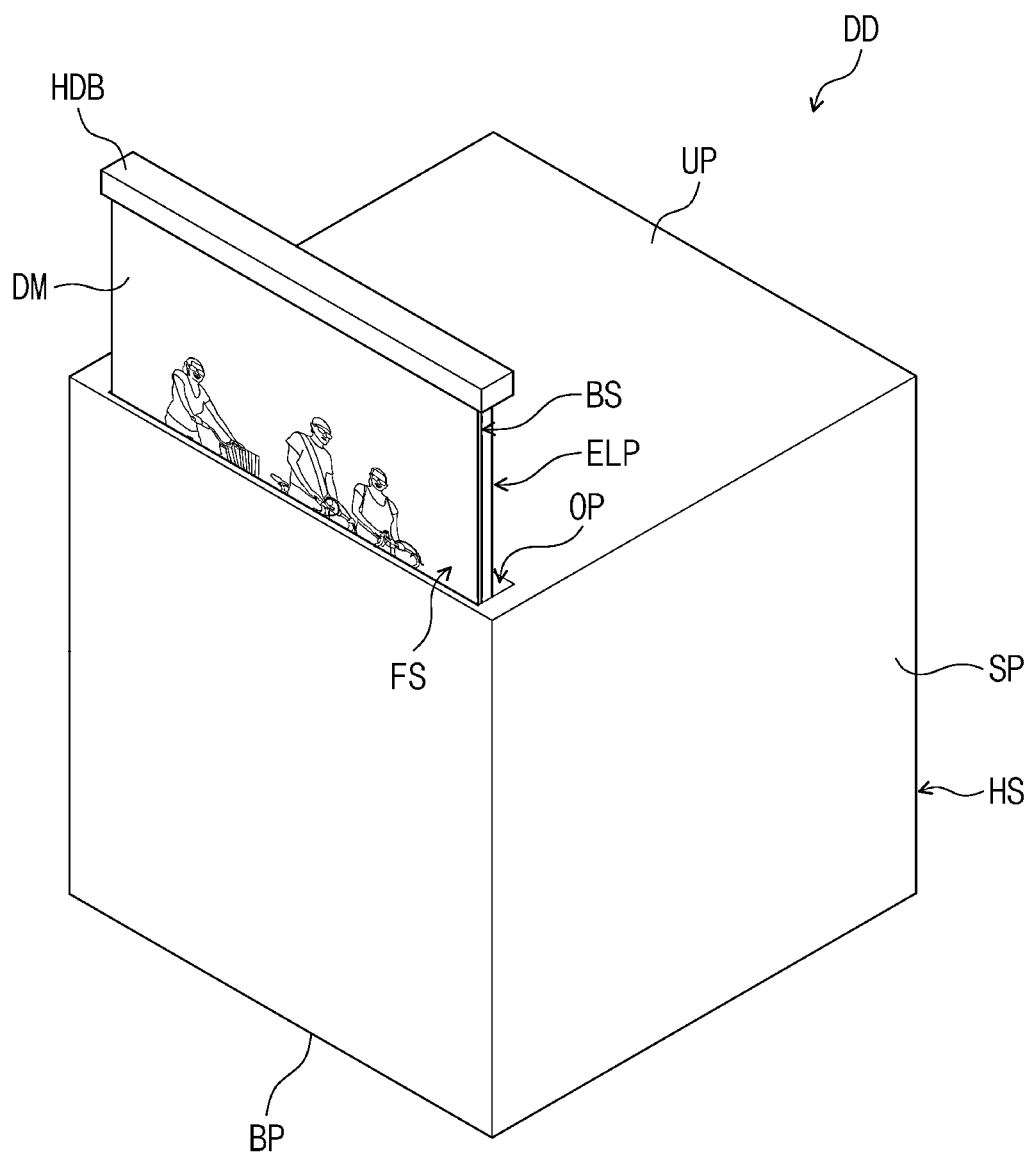
FIG. 1 is a perspective view of a display device according to an embodiment of the present disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes all of one or more combinations defined by related components.

Terms such as "first", "second", and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the present disclosure will be described with reference to the accompanying drawings.

FIG. 1 is a perspective view of a display device according to an embodiment of the present disclosure.

Referring to FIG. 1, the display device DD may include a housing HS, a head bar HDB, a display module DM, and a lifting part ELP. The housing HS may have a box shape. However, the shape of the housing HS is not limited thereto. The housing HS may have an opening OP defined therein, and the opening OP may be open in a first direction DR1.

Hereinafter, a direction crossing the first direction DR1 is defined as a second direction DR2. Furthermore, a direction crossing a plane defined by the first and second directions DR1 and DR2 is defined as a third direction DR3.

The housing HS may include a bottom part BP, an upper part UP, and sidewall parts SP. The opening OP may be defined in the upper part UP. The bottom part BP and the upper part UP may have a plane defined by the second and third directions DR2 and DR3. The bottom part BP and the upper part UP may face each other in the first direction DR1. The sidewall parts SP may extend from the periphery of the bottom part BP to the periphery of the upper part UP.

The head bar HDB may be disposed over the opening OP. The head bar HDB may move toward or away from the housing HS in the first direction DR1.

A portion of the display module DM may be accommodated in the housing HS, and another portion of the display module DM may be exposed outside the housing HS. The display module DM may move into or out of the housing HS through the opening OP. The display module DM may have a plane defined by the first and second directions DR1 and DR2 outside the housing HS.

The display module DM may be connected to the head bar HDB. One end of the display module DM (e.g., upper end) may be connected to the head bar HDB, and the display module DM may move together with the head bar HDB. When the head bar HDB moves toward or away from the housing HS in the first direction DR1, the display module DM may move in the first direction DR1 together with the head bar HDB. The area of the display module DM exposed outside the housing HS may be increased or decreased as the head bar HDB moves.

A front surface FS of the display module DM may be defined as a display surface and may have a plane defined by the first direction DR1 and the second direction DR2. An image generated by the display module DM may be provided to a user through the front surface FS. The front surface FS and the rear surface BS of the display module DM may be surfaces facing away from each other in the third direction DR3.

The lifting part ELP may be disposed on the rear surface BS of the display module DM. A portion of the lifting part ELP may be accommodated in the housing HS, and another portion of the lifting part ELP may be disposed outside the housing HS. The lifting part ELP may move into or out of the housing HS through the opening OP.

The lifting part ELP may be connected to the head bar HDB. One end of the lifting part ELP (e.g., upper end) and the one end of the display module DM (e.g., upper end) may be connected to the head bar HDB, and the lifting part ELP may be connected to the display module DM through the head bar HDB accordingly.

The lifting part ELP may be extended and retracted in the first direction DR1. The configuration of the lifting part ELP will be described below in detail. As the lifting part ELP is extended and retracted in the first direction DR1, the head bar HDB connected to the lifting part ELP may move toward or away from the housing HS in the first direction DR1.

As the lifting part ELP moves the head bar HDB, the head bar HDB may move the display module DM in the first direction DR1. Accordingly, when the lifting part ELP is extended and retracted in the first direction DR1, the display module DM may be extended and retracted in the first direction DR1.

Although not illustrated, function buttons may be disposed on the housing HS. The function buttons may provide various functions to the display device DD. For example, the display module DM may move into or out of the housing HS by operations of the function buttons. Furthermore, the luminance and definition of an image displayed on the display module DM may be controlled by operations of the function buttons.

Figure 2:
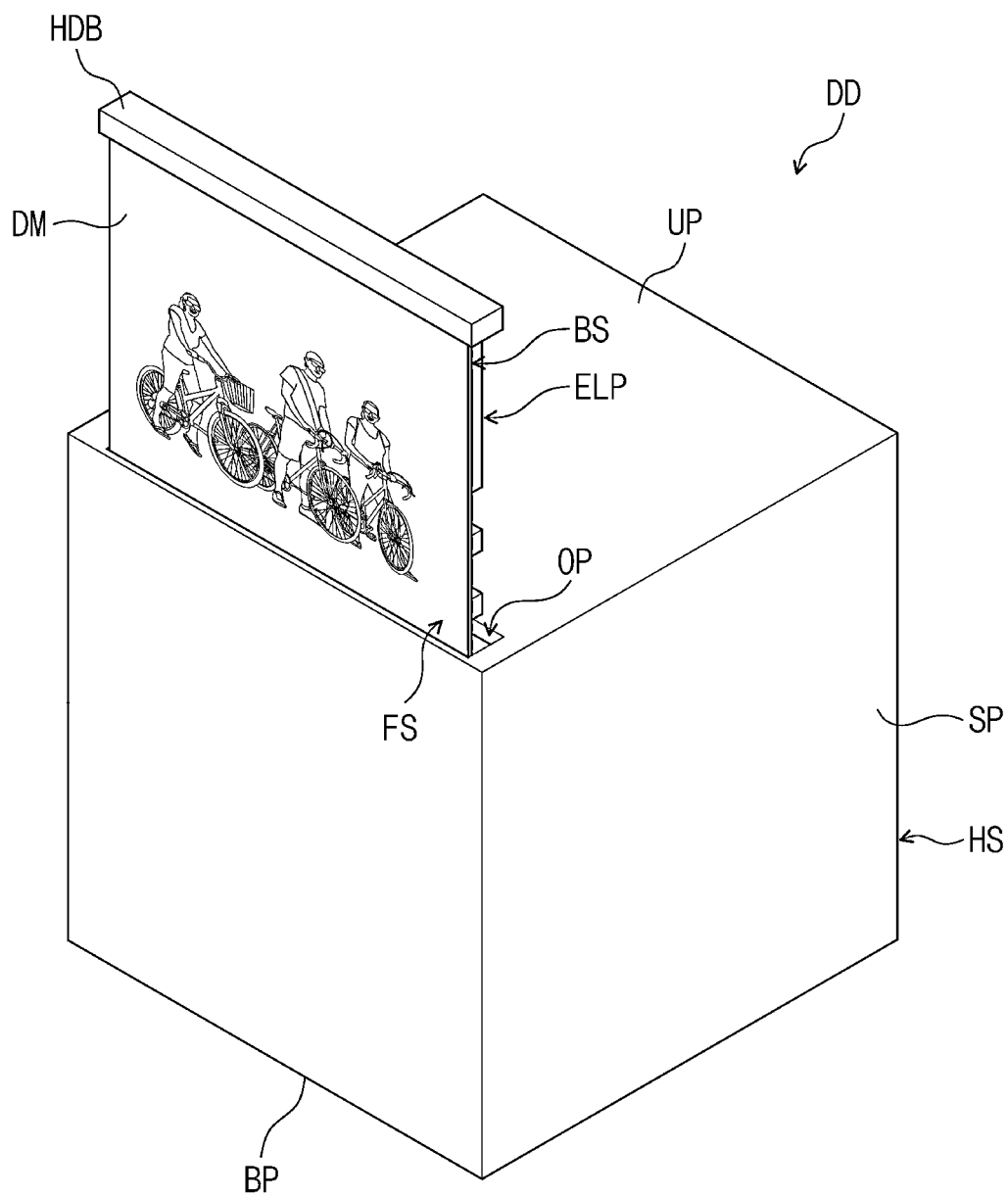
FIGS. 2 and 3 are views illustrating extended states of a display module illustrated in FIG. 1.
Figure 2:
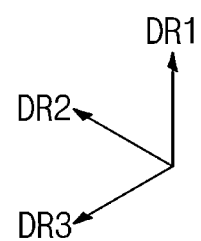
Figure 3:
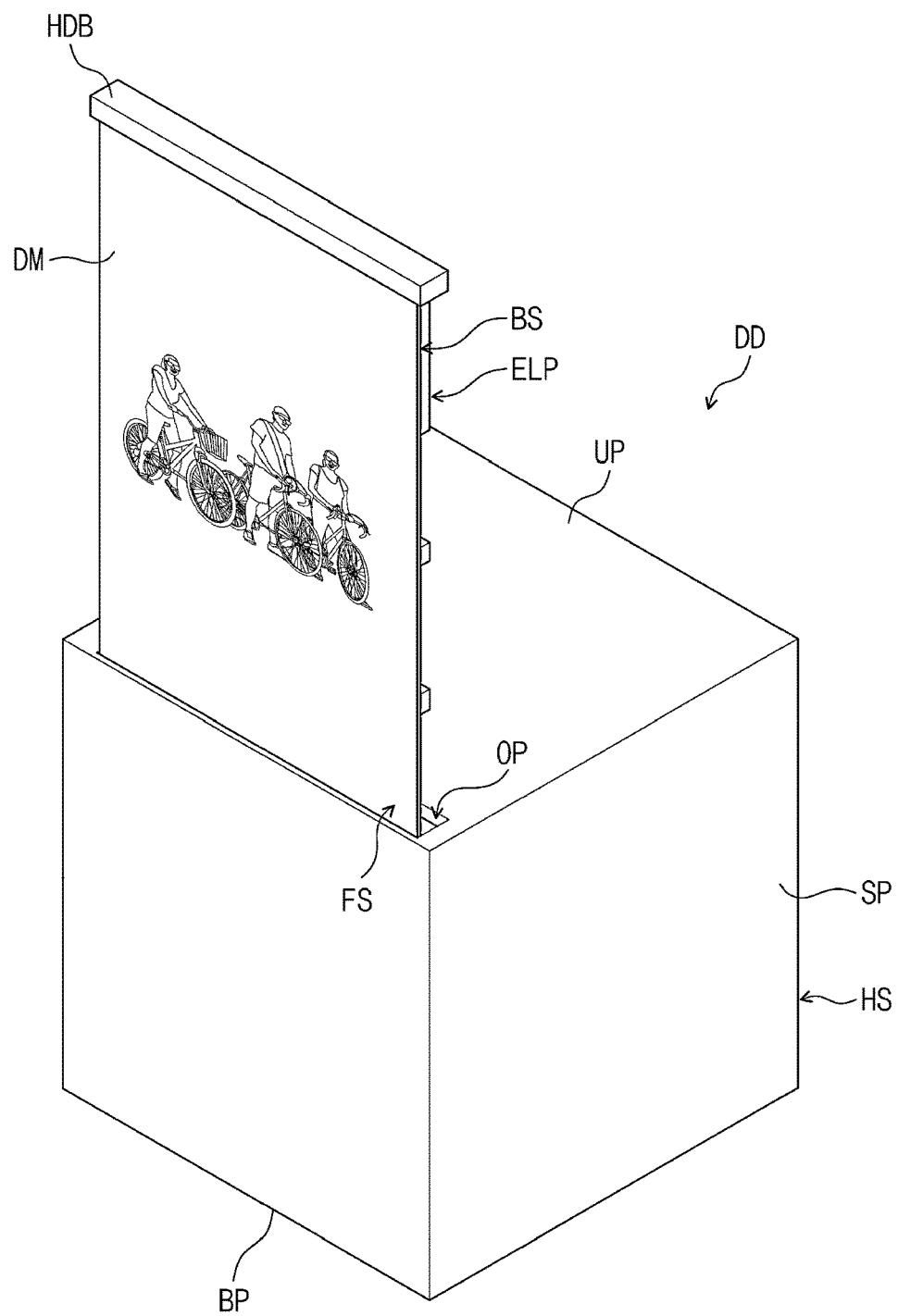

FIGS. 2 and 3 are views illustrating extended states of the display module illustrated in FIG. 1.

Referring to FIGS. 2 and 3, the lifting part ELP may be extended in the first direction DR1 through the opening OP, and the head bar HDB may move away from the housing HS in the first direction DR1. As the head bar HDB moves away from the housing HS in the first direction DR1, the display module DM may be extracted from the housing HS to the outside through the opening OP. Accordingly, the area of the display module DM exposed outside the housing HS may be increased.

Referring to FIGS. 1 and 2, the head bar HDB may move toward the housing HS in the first direction DR1. As the head bar HDB moves toward the housing HS in the first direction DR1, the display module DM may be retracted into the housing HS through the opening OP. Accordingly, the area of the display module DM exposed outside the housing HS may be decreased.

Figure 4:
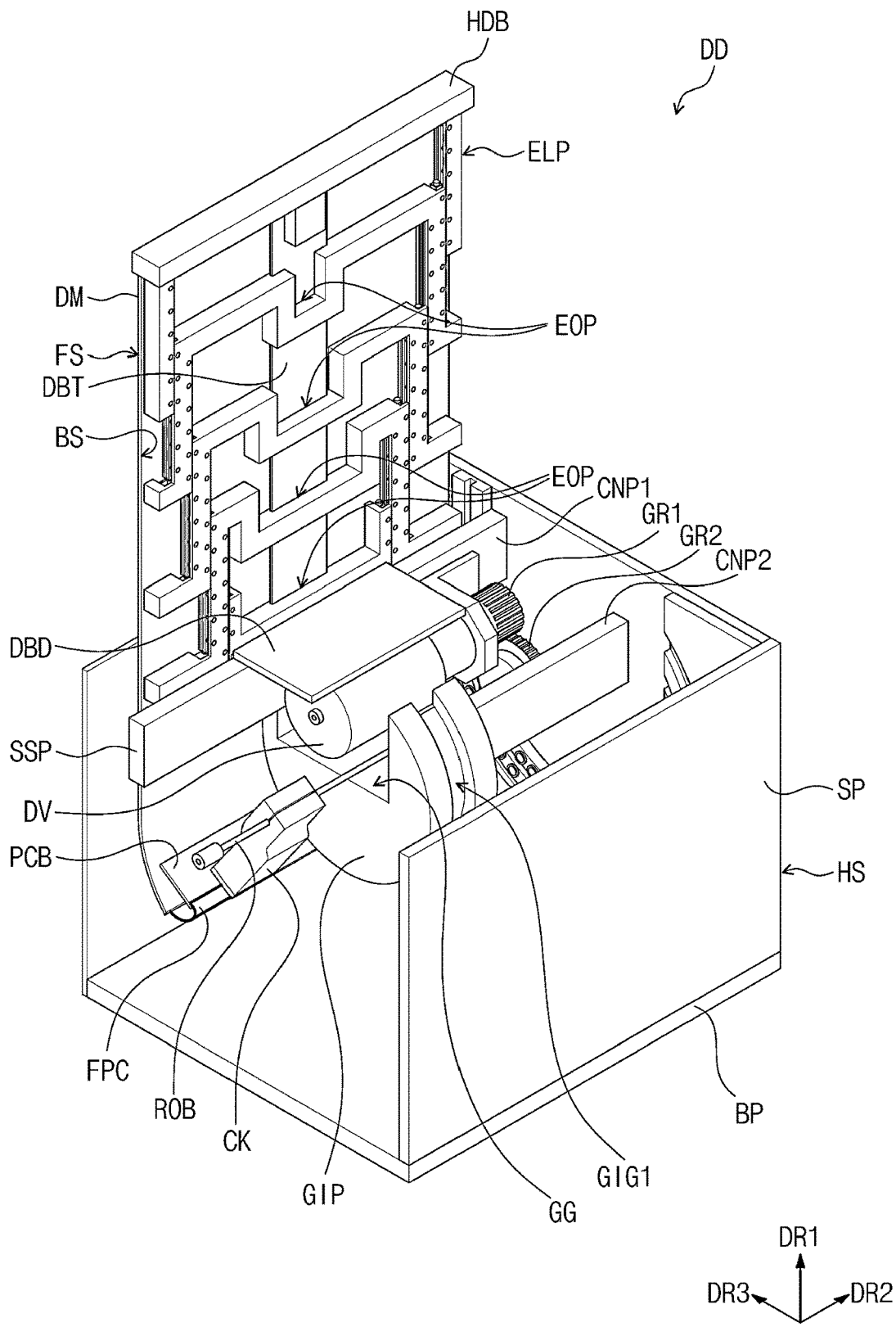
FIG. 4 is a view illustrating a rear side of a lifting part and components in a housing in an extended state of the lifting part illustrated in FIG. 3.

FIG. 4 is a view illustrating a rear side of the lifting part and components in the housing in an extended state of the lifting part illustrated in FIG. 3.

Referring to FIG. 4, the display device DD may include a drive belt DBT, a drive part DV, a guide part GIP, a crank CK, a rotating bar ROB, first and second gears GR1 and GR2, a support plate SSP, a drive board DBD, first and second connecting parts CNP1 and CNP2, a printed circuit board PCB, and a flexible circuit board FPC. The drive part DV, the guide part GIP, the crank CK, the rotating bar ROB, the support plate SSP, the drive board DBD, the printed circuit board PCB, and the flexible circuit board FPC may be accommodated in the housing HS.

Hereinafter, an upper end and a lower end used herein represent relative positions of a corresponding component with respect to the first direction DR1.

One end (e.g., upper end) of the display module DM may be disposed outside the housing HS, and an opposite end (e.g., lower end) of the display module DM may be accommodated in the housing HS. A portion of the display module DM may be bent to be in a curved shape and may be disposed in the housing HS. A portion of the display module DM exposed outside the housing HS may remain flat.

The front side of the lifting part ELP may face the rear surface BS of the display module DM, and the rear side of the lifting part ELP may face away from the front side of the lifting part ELP. In FIG. 4, the rear side of the lifting part ELP is illustrated.

When the lifting part ELP is extended, a portion of the lifting part ELP may be disposed in the housing HS. The lifting part ELP may have guide grooves EOP defined therein, and the guide grooves EOP may be open in the first direction DR1. The drive belt DBT may be connected to the lifting part ELP. The drive belt DBT may extend in the first direction DR1 and may be disposed in the guide grooves EOP. With respect to the first direction DR1, one end (e.g., upper end) of the drive belt DBT may be connected to an upper end of the lifting part ELP. The drive belt DBT may be connected to the head bar HDB through the lifting part ELP.

The one end (e.g., upper end) of the drive belt DBT may be disposed outside the housing HS, and an opposite end (e.g., lower end) of the drive belt DBT may be accommodated in the housing HS. A portion of the drive belt DBT may have a curved shape and may be disposed in the housing HS, and the shape will be illustrated below in detail through detailed drawings. A portion of the drive belt DBT disposed in the lifting part ELP may be disposed along the guide grooves EOP and may have a flat shape.

The drive belt DBT may move in the first direction DR1 along the guide grooves EOP. The drive belt DBT connected to the upper end of the lifting part ELP may extend and retract the lifting part ELP in the first direction DR1 while moving in the first direction DR1 along the guide grooves EOP. This operation will be described below in detail.

The support plate SSP may be adjacent to a lower end of the lifting part ELP in the housing HS. The drive part DV may be disposed adjacent to the support plate SSP and may be connected to the support plate SSP. The first connecting part CNP1 may be connected to the support plate SSP. Substantially, the drive part DV may be connected to the support plate SSP by the first connecting part CNP1. The drive part DV may be disposed over the guide part GIP. The drive part DV may be disposed in a recess GG defined in the guide part GIP.

The periphery of the guide part GIP may have a curved shape when viewed in the second direction DR2. A first guide groove GIG1 may be defined on the periphery of the guide part GIP. A function of the first guide groove GIG1 will be described below in detail.

The guide part GIP may be connected, through the second connecting part CNP2, to one of the sidewall parts SP facing each other in the second direction DR2. The periphery of the guide part GIP may have an arc shape that faces toward the sidewall parts SP facing each other in the third direction DR3 and the bottom part BP. The crank CK and the rotating bar ROB may be disposed adjacent to the guide part GIP. The crank CK and the rotating bar ROB may be connected to the drive part DV through the first and second gears GR1 and GR2 and may receive torque of the drive part DV.

The interconnections among the drive part DV, the guide part GIP, the crank CK, the rotating bar ROB, the support plate SSP, and the first and second connecting parts CNP1 and CNP2 will be described below in detail with reference to an exploded perspective view of FIG. 16.

The drive part DV may move the drive belt DBT. For example, the first gear GR1 may be connected to the drive part DV, and the second gear GR2 may be disposed to be engaged with the first gear GR1 and may be connected to the rotating bar ROB. The torque of the drive part DV may be transmitted to the rotating bar ROB through the first gear GR1 and the second gear GR2. This configuration will be described below in more detail with reference to the exploded perspective view of FIG. 16.

As the torque of the drive part DV is transmitted to the rotating bar ROB, the rotating bar ROB may rotate, and the crank CK connected to the rotating bar ROB may rotate. The crank CK may move along the periphery of the guide part GIP while rotating.

The opposite end (e.g., lower end) of the drive belt DBT may be connected to the crank CK, and while the crank Ck rotates, the drive belt DBT may move in a curved direction along a guide groove GIG1 (illustrated in FIGS. 16 and 17) that is defined on the periphery of the guide part GIP. When the drive belt DBT moves, the drive belt DBT may move in the first direction DR1 in the guide grooves EOP. This operation will be described below in detail.

The drive board DBD may be disposed on the support plate SSP. The drive board DBD may control overall operation of the display device DD. For example, the drive board DBD may control an operation of turning on/off the display device DD, an operation of adjusting the definition and luminance of a screen of the display device DD, and an operation for extension and retraction of the lifting part ELP.

The printed circuit board PCB may be connected to the display module DM and may control operation of the display module DM. For example, pixels of the display module DM may be driven by the printed circuit board PCB to generate an image. The printed circuit board PCB may be connected to the display module DM through the flexible circuit board FPC.

The flexible circuit board FPC may be connected to the display module DM and the printed circuit board PCB and may be bent toward the rear surface BS of the display module DM. The printed circuit board PCB may be disposed on the rear surface BS of the display module DM.

Figure 5:
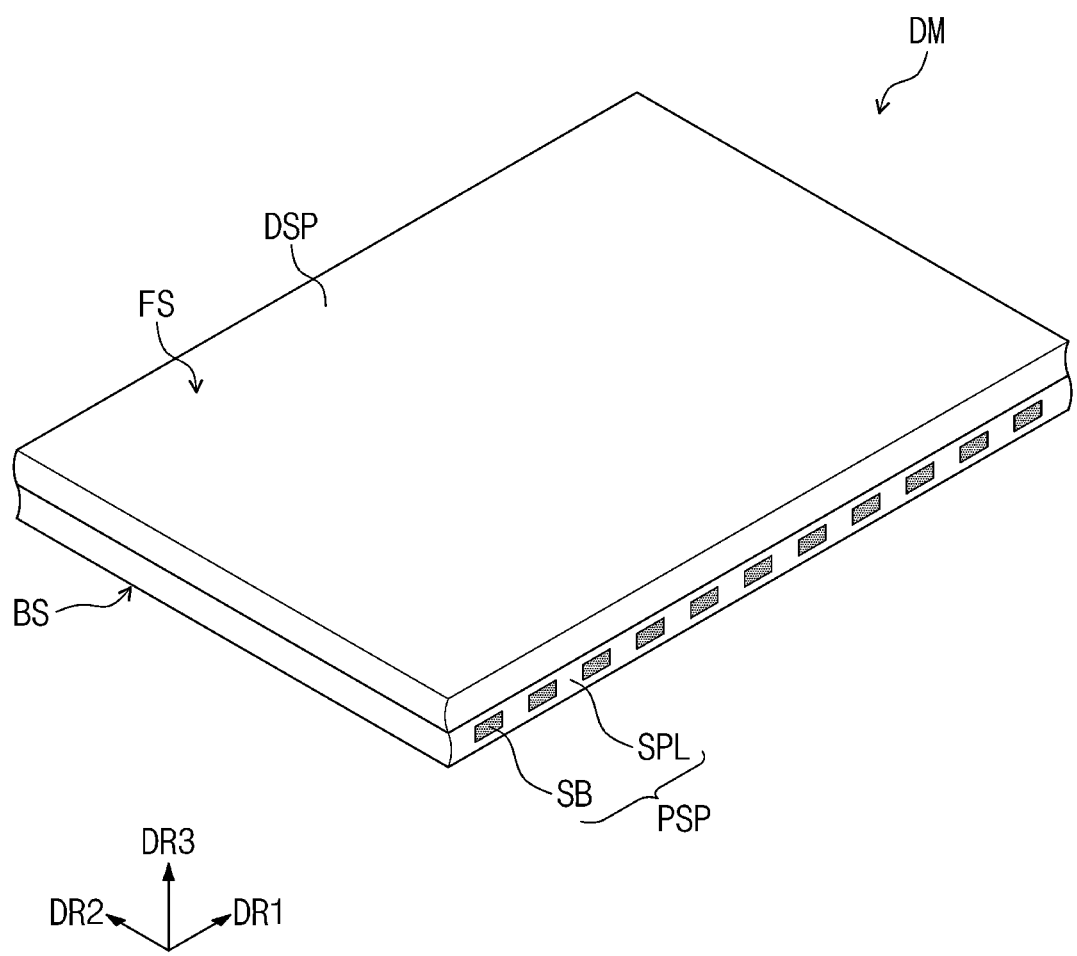
FIG. 5 is a perspective view of a portion of the display module illustrated in FIG. 3.
Figure 6:
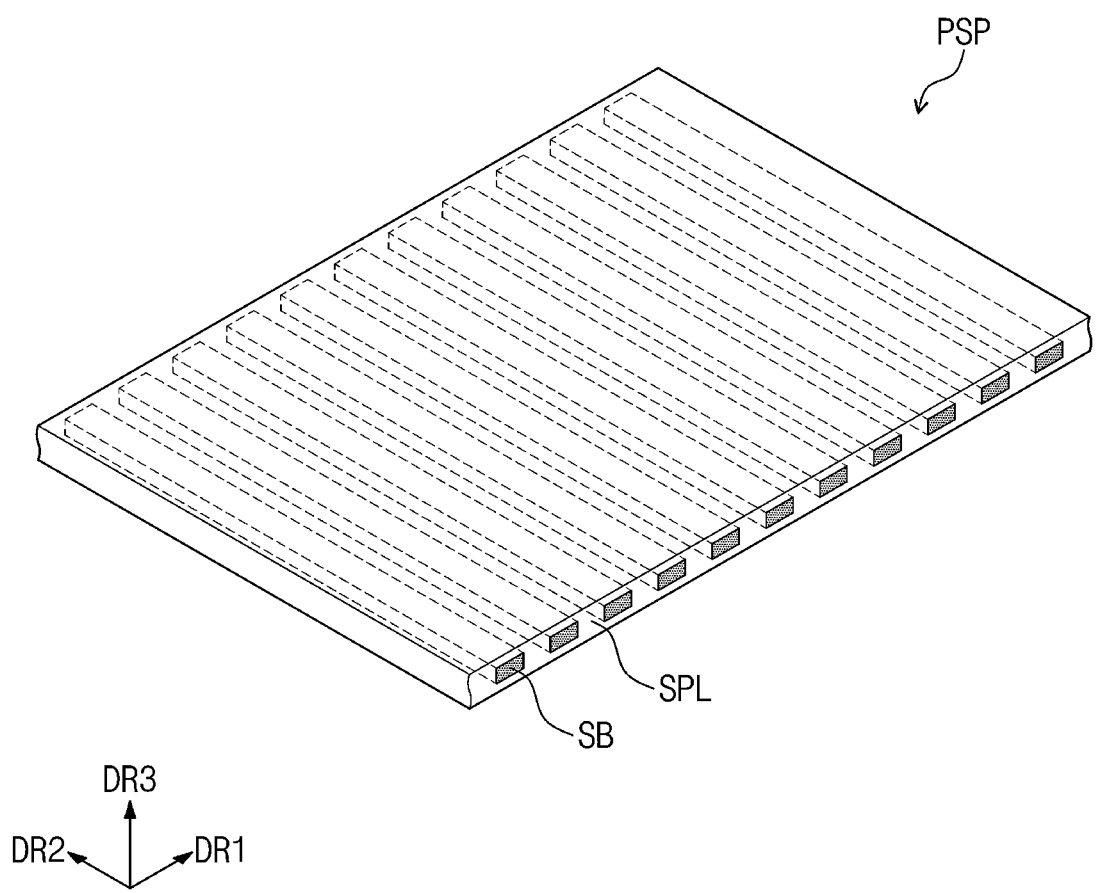
FIG. 6 is a perspective view of a panel support part illustrated in FIG. 5.

FIG. 5 is a perspective view of a portion of the display module illustrated in FIG. 3. FIG. 6 is a perspective view of a panel support part illustrated in FIG. 5.

Referring to FIGS. 5 and 6, the display module DM may include a display part DSP and the panel support part PSP disposed under one surface (e.g., real surface) of the display part DSP. A front surface of the display part DSP may be the front surface FS of the display module DM described above. The panel support part PSP may face a rear surface of the display part DSP that faces away from the front surface of the display part PSP and may be attached to the rear surface of the display part DSP. For example, the panel support part PSP may be attached to the display part DSP through a pressure sensitive adhesive.

The panel support part PSP may include a support layer SPL and a plurality of support bars SB disposed in the support layer SPL. When viewed in the second direction DR2, the support bars SB may have a quadrilateral shape. However, the shape of the support bars SB is not limited thereto.

The support bars SB may extend in the second direction DR2 and may be arranged in the first direction DR1. In FIG. 6, the support bars SB disposed in the support layer SPL are illustrated by dotted lines. The support bars SB may be spaced apart from each other at equal intervals in the first direction DR1. However, the intervals between the support bars SB are not limited thereto.

The support bars SB may be of a rigid type. For example, the support bars SB may contain metal. For example, the support bars SB may contain aluminum, stainless steel, or invar.

The support layer SPL may contain an elastomer having a predetermined elasticity. For example, the support layer SPL may contain at least one of thermoplastic polyurethane, silicone, thermoplastic rubbers, elastolefin, thermoplastic olefin, polyamide, polyether block amide, synthetic polyisoprene, polybutadiene, chloroprene rubber, butyl rubber, styrene-butadiene, epichlorohydrin rubber, polyacrylic rubber, silicone rubber, fluorosilicone rubber, fluoroelastomers, or ethylene-vinyl acetate.

The support bars SB may have a higher modulus than the support layer SPL. The support layer SPL may have a modulus of 20 kilopascals (KPa) to 20 megapascal (MPa). The support bars SB may have a modulus of 1 gigapascals (GPa) to 200 GPa. The support layer SPL and the support bars SB may support the display part DSP.

The support bars SB having a higher stiffness may support the display module DM, and the support layer SPL having a predetermined elasticity may provide a flat surface to the display module DM. The display module DM may remain flat because the display module DM is attached to the support layer SPL having a flat surface. Accordingly, the surface quality of the display module DM may be effectively improved.

Figure 7:
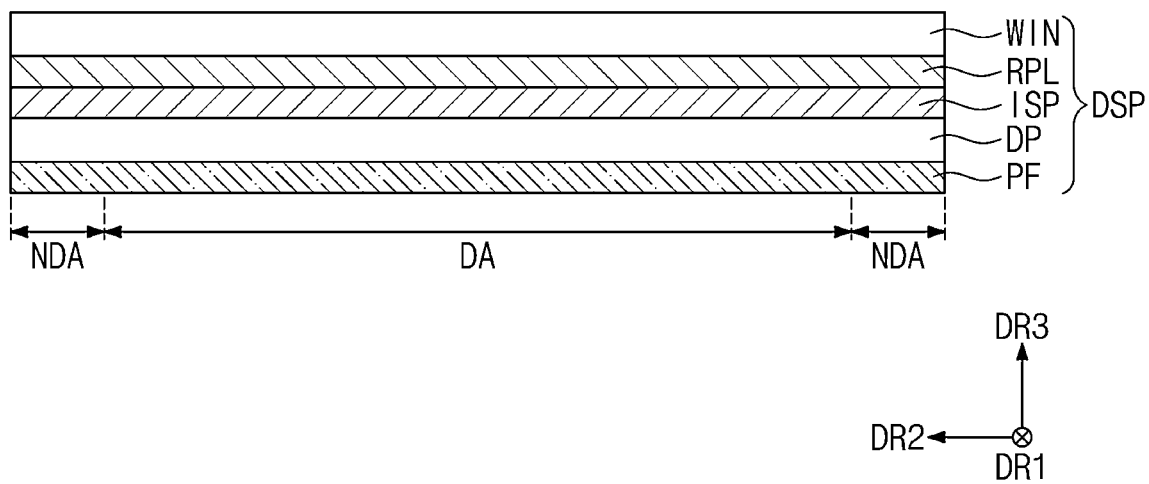
FIG. 7 is a view illustrating a section of a display part illustrated in FIG. 5.

FIG. 7 is a view illustrating a section of the display part illustrated in FIG. 5.

In FIG. 7, a section of the display part DSP viewed in the first direction DR1 is illustrated.

Referring to FIG. 7, the display part DSP may include a display panel DP, an input sensing part ISP, an anti-reflection layer RPL, a window WIN, and a panel protection film PF. The display part DSP may include a display area DA that displays an image and a non-display area NDA that is disposed around the display area DA and that does not display an image.

The display panel DP may be a flexible display panel. The display panel DP according to an embodiment of the present disclosure may be an emissive display panel and is not particularly limited. For example, the display panel DP may be an organic light emitting display panel or an inorganic light emitting display panel. An emissive layer of the organic light emitting display panel may contain an organic light emitting material. An emissive layer of the inorganic light emitting display panel may contain quantum dots, quantum rods, or the like. Hereinafter, it will be exemplified that the display panel DP is an organic light emitting display panel.

The input sensing part ISP may be disposed on the display panel DP. The input sensing part ISP may include a plurality of sensors (not illustrated) for sensing an external input in a capacitive manner. The input sensing part ISP may be directly manufactured on the display panel DP when the display module DM is manufactured. However, without being limited thereto, the input sensing part ISP may be manufactured as a panel separate from the display panel DP and may be attached to the display panel DP by an adhesive layer.

The anti-reflection layer RPL may be disposed on the input sensing part ISP. The anti-reflection layer RPL may be directly formed on the input sensing part ISP, or may be coupled to the input sensing part ISP by an adhesive layer. The anti-reflection layer RPL may be defined as a film for preventing reflection of external light. The anti-reflection layer RPL may decrease the reflectivity of external light incident toward the display panel DP from above the display device DD.

When external light travelling toward the display panel DP is reflected from the display panel DP and provided back to the user, the user may visually recognize the external light as in a mirror. To prevent such a phenomenon, the anti-reflection layer RPL may include a plurality of color filters that display the same colors as the pixels of the display panel DP.

External light may be filtered in the same colors as those of the pixels by the color filters. In this case, the external light may not be visible to the user. However, without being limited thereto, the anti-reflection layer RPL may include a polarizer film for decreasing the reflectivity of external light in another embodiment. The polarizer film may include a phase retarder and/or a polarizer.

The window WIN may be disposed on the anti-reflection layer RPL. The window WIN may be directly formed on the anti-reflection layer RPL, or may be coupled to the anti-reflection layer RPL by an adhesive layer. The window WIN may protect the display panel DP, the input sensing part ISP, and the anti-reflection layer RPL from external scratches and shocks.

The panel protection film PF may be disposed under the display panel DP. The panel protection film PF may be directly formed on the bottom of the display panel DP, or may be coupled to the display panel DP by an adhesive layer. The panel protection film PF may protect a lower portion of the display panel DP. The panel protection film PF may contain a flexible plastic material such as polyethylene terephthalate ("PET").

Figure 8:
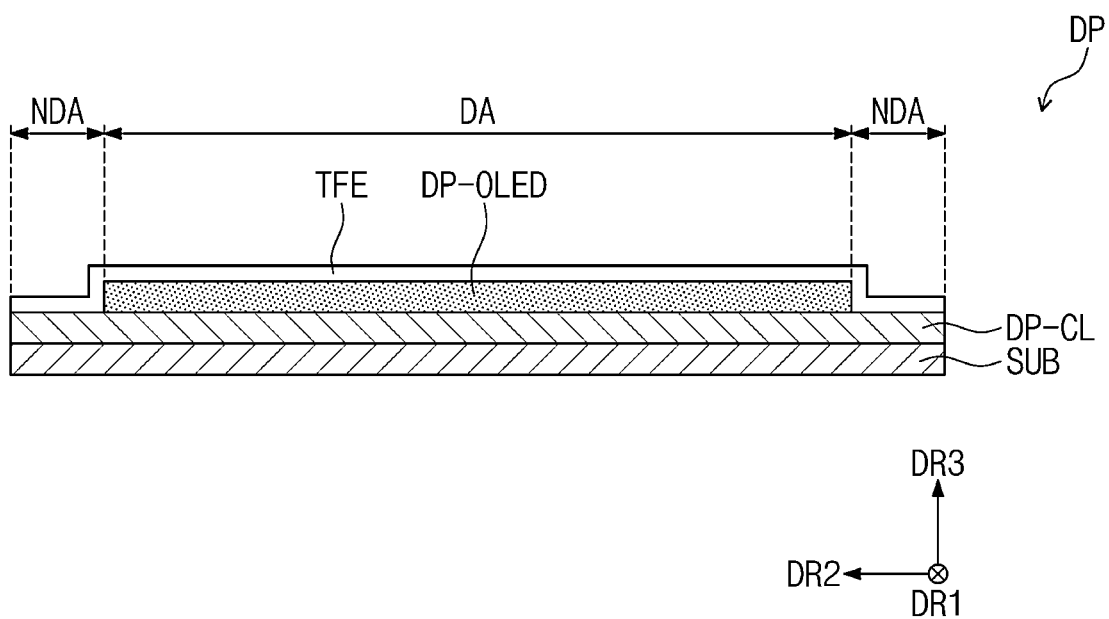
FIG. 8 is a view illustrating a section of a display panel illustrated in FIG. 7.

FIG. 8 is a view illustrating a section of the display panel illustrated in FIG. 7.

In FIG. 8, a section of the display panel DP viewed in the first direction DR1 is illustrated.

Referring to FIG. 8, the display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

The substrate SUB may include a display area DA and a non-display area NDA around the display area DA. The substrate SUB may contain a flexible plastic material such as polyimide ("PI"). The display element layer DP-OLED may be disposed on the display area DA.

A plurality of pixels may be disposed on the display area DA. Each of the pixels may include a light emitting element that is connected to a transistor disposed in the circuit element layer DP-CL and is disposed in the display element layer DP-OLED.

The thin-film encapsulation layer TFE may be disposed on the circuit element layer DP-CL to cover the display element layer DP-OLED. The thin-film encapsulation layer TFE may include inorganic layers and an organic layer between the inorganic layers. The inorganic layers may protect the pixels from moisture/oxygen. The organic layer may protect the pixels from foreign matter such as dust particles.

Figure 9:
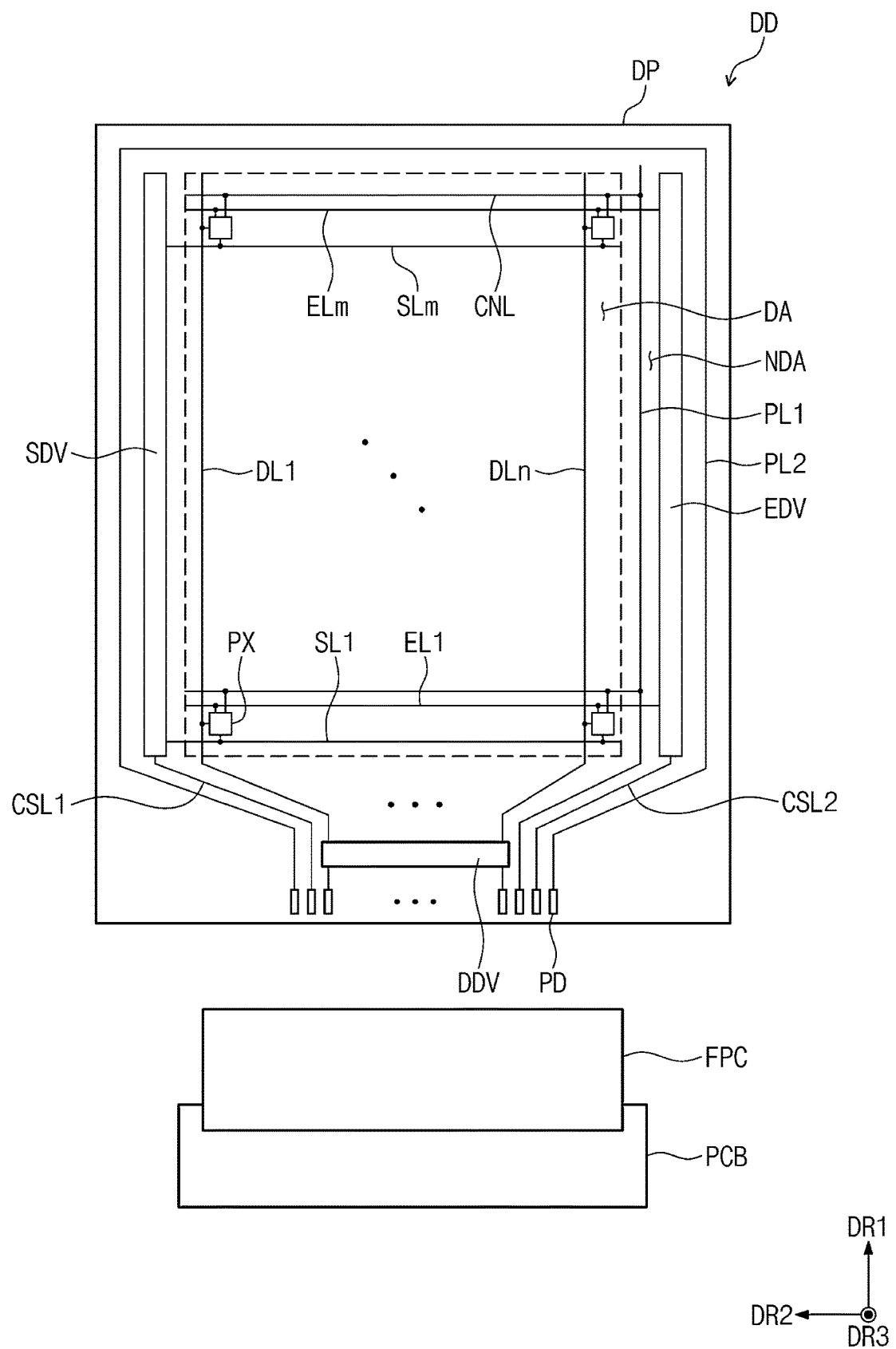
FIG. 9 is a plan view of the display panel illustrated in FIG. 8.

FIG. 9 is a plan view of the display panel illustrated in FIG. 8.

Referring to FIG. 9, the display device DD may include the display panel DP, a scan driver SDV, a data driver DDV, an emission driver EDV, and a plurality of pads PD. The display panel DP may include a display area DA and a non-display area NDA surrounding the display area DA.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, first and second power lines PL1 and PL2, and connecting lines CNL. "m" and "n" are natural numbers.

The pixels PX may be disposed on the display area DA. The scan driver SDV and the emission driver EDV may be disposed on the non-display areas NDA that are adjacent to long sides of the display panel DP, respectively. The data driver DDV may be disposed on the non-display area NDA adjacent to one of short sides of the display panel DP. When viewed on the plane, the data driver DDV may be adjacent to a lower end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The emission lines EL1 to ELm may extend in the second direction DR2 and may be connected to the pixels PX and the emission driver EDV.

The first power line PL1 may extend in the first direction DR1 and may be disposed on the non-display area NDA. The first power line PL1 may be disposed between the display area DA and the emission driver EDV. However, without being limited thereto, the first power line PL1 may be disposed between the display area DA and the scan driver SDV in another embodiment.

The connecting lines CNL may extend in the second direction DR2 and may be arranged in the first direction DR1. The connecting lines CNL may be connected to the first power line PL1 and the pixels PX. A first voltage may be applied to the pixels PX through the first power line PL1 and the connecting lines CNL connected with each other.

The second power line PL2 may be disposed on the non-display area NDA. The second power line PL2 may extend along the long sides of the display panel DP and the other short side of the display panel DP where the data driver DDV is not disposed. The second power line PL2 may be disposed outward of the scan driver SDV and the emission driver EDV.

Although not illustrated, the second power line PL2 may extend toward the display area DA and may be connected to the pixels PX. A second voltage having a lower level than the first voltage may be applied to the pixels PX through the second power line PL2.

The first control line CSL1 may be connected to the scan driver SDV and may extend toward the lower end of the display panel DP when viewed on the plane. The second control line CSL2 may be connected to the emission driver EDV and may extend toward the lower end of the display panel DP when viewed on the plane. The data driver DDV may be disposed between the first control line CSL1 and the second control line CSL2.

The pads PD may be disposed on the display panel DP. The pads PD may be closer to the lower end of the display panel DP than the data driver DDV. The data driver DDV, the first power line PL1, the second power line PL2, the first control line CSL1, and the second control line CSL2 may be connected to the pads PD. The data lines DL1 to DLn may be connected to the data driver DDV, and the data driver DDV may be connected to the pads PD corresponding to the data lines DL1 to DLn.

Although not illustrated, the display device DD may further include a timing controller for controlling operations of the scan driver SDV, the data driver DDV, and the emission driver EDV and a voltage generator for generating the first and second voltages. The timing controller and the voltage generator may be disposed on the printed circuit board PCB.

The printed circuit board PCB may be connected to the flexible circuit board FPC, and the flexible circuit board FPC may be connected to the pads PD. The timing controller and the voltage generator may be connected to the corresponding pads PD through the printed circuit board PCB and the flexible circuit board FPC.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The emission driver EDV may generate a plurality of emission signals, and the emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. Emission time of the pixels PX may be controlled by the emission signals.

Figure 10:
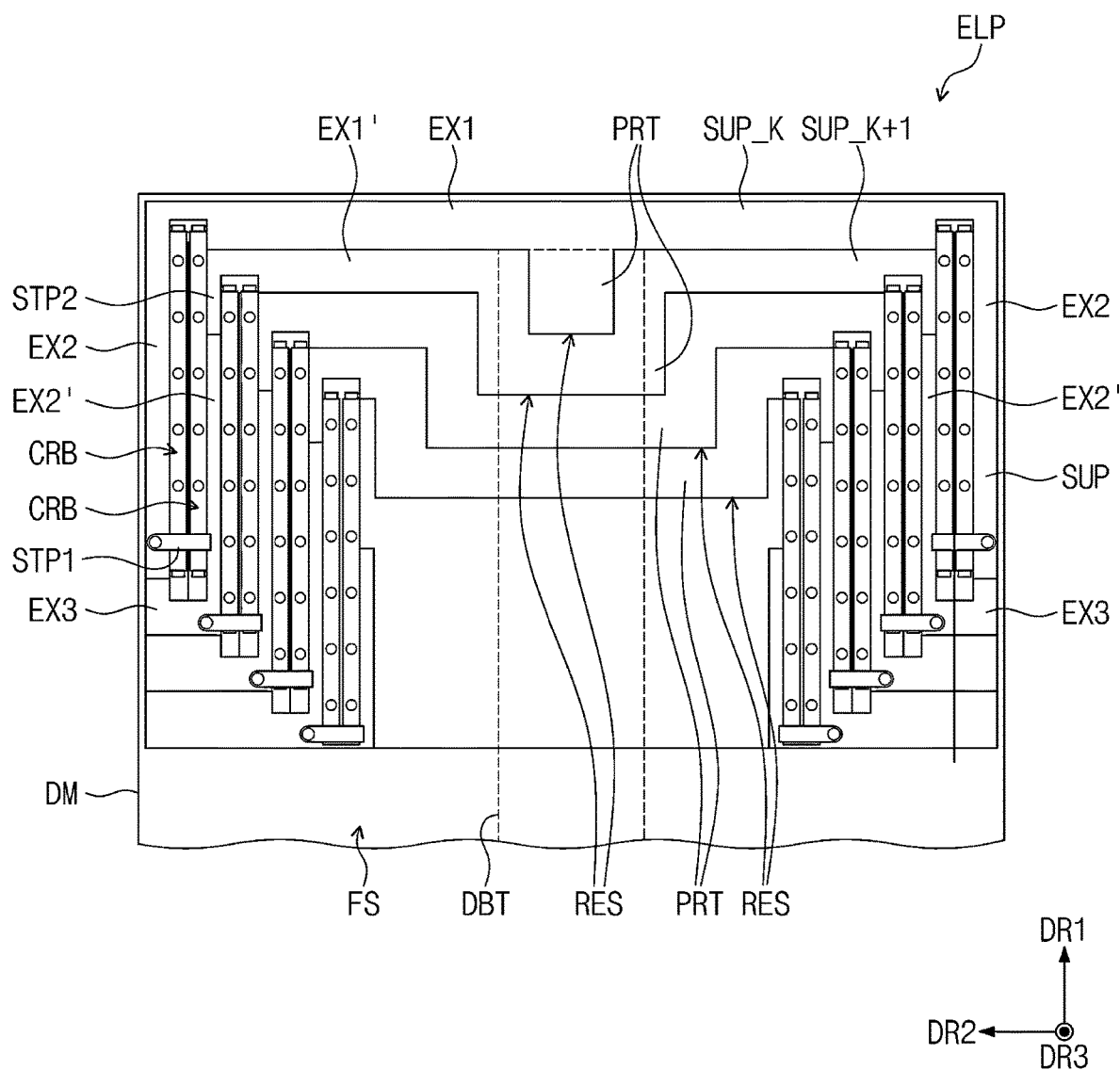
FIG. 10 is a view illustrating a front side of the lifting part illustrated in FIG. 4.
Figure 11:
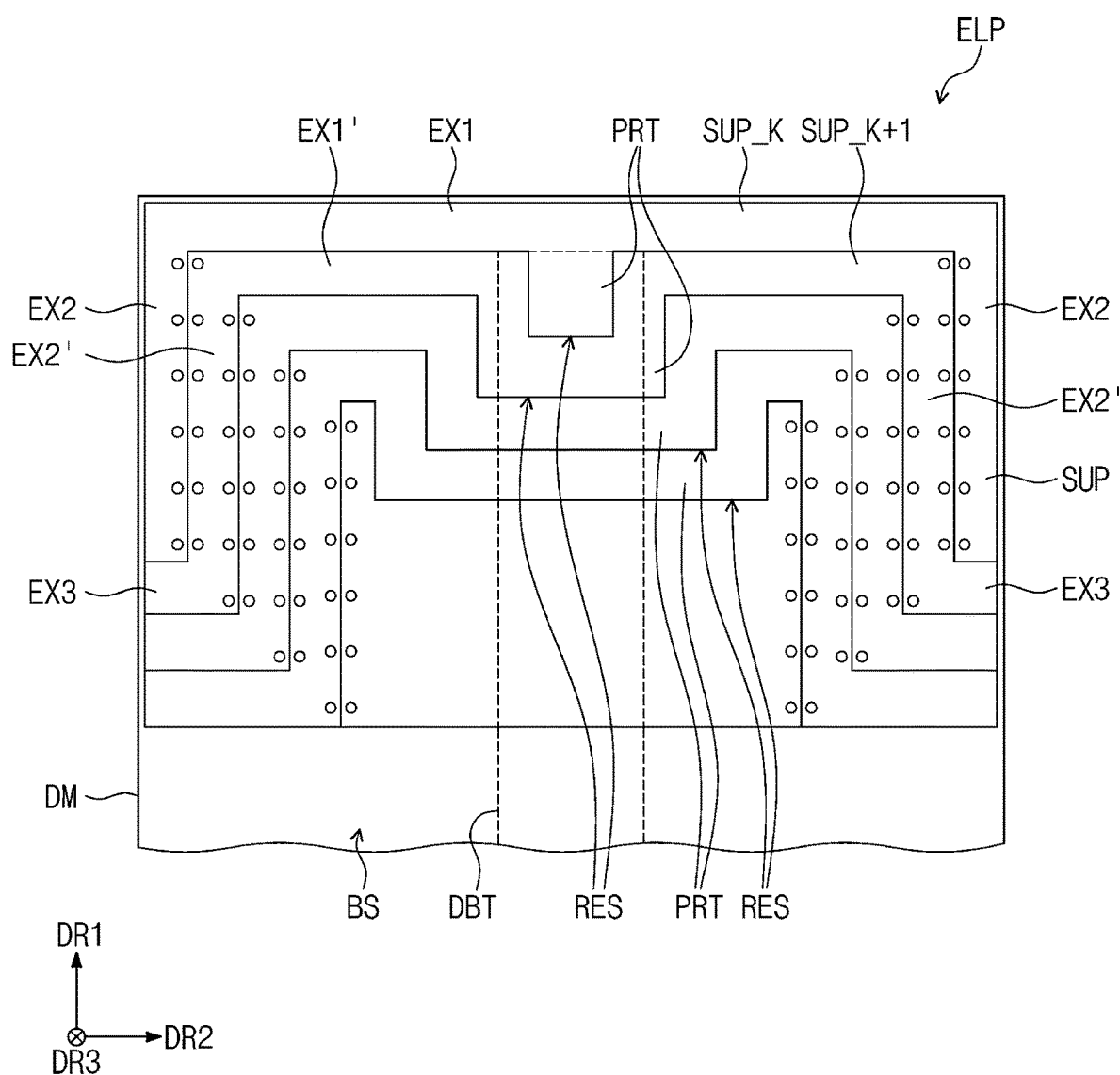
FIG. 11 is a view illustrating a rear side of the lifting part illustrated in FIG. 4.
Figure 12:
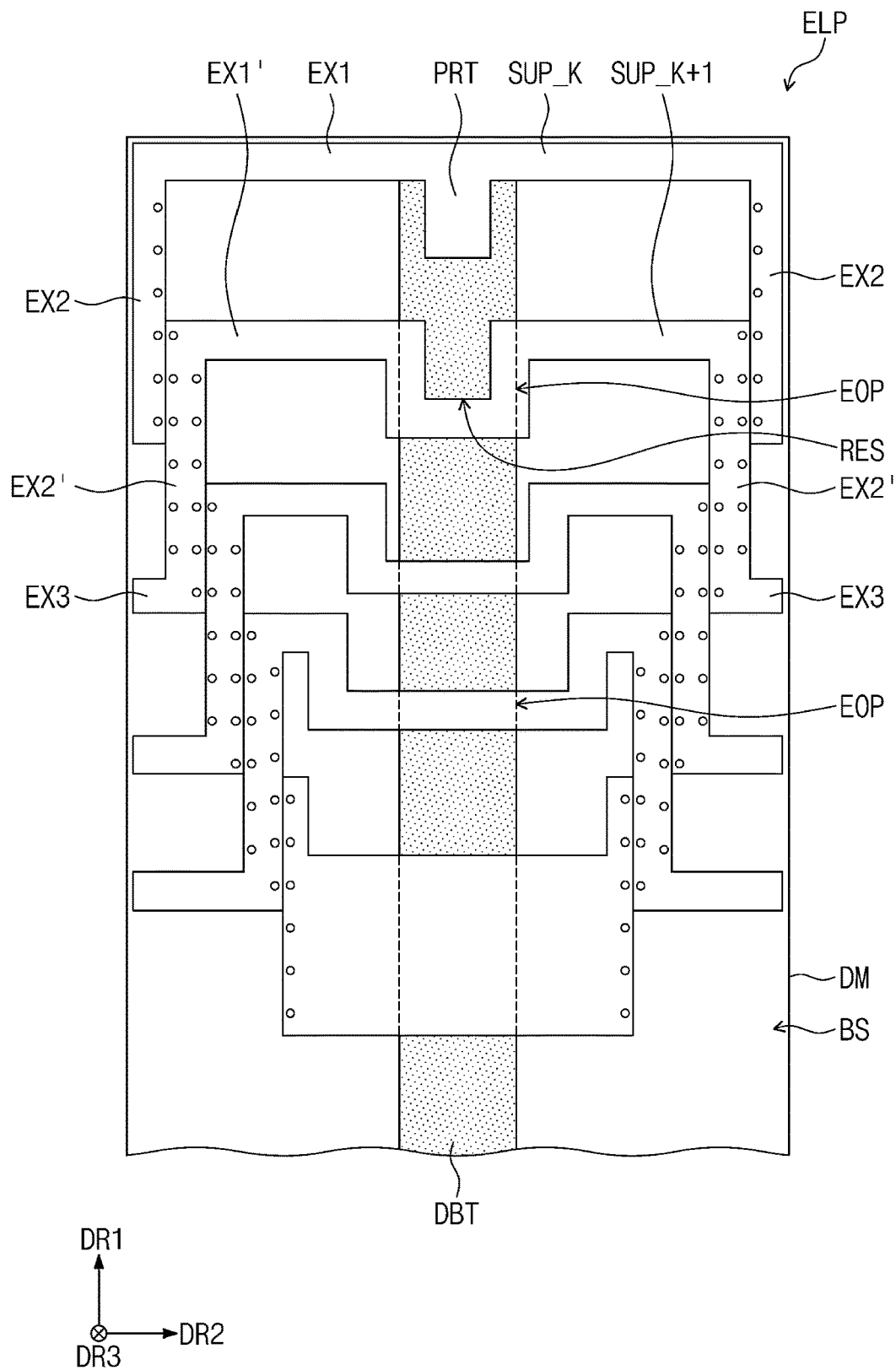
FIG. 12 is a view illustrating an extended state of the lifting part illustrated in FIG. 11.

FIG. 10 is a view illustrating the front side of the lifting part illustrated in FIG. 4. FIG. 11 is a view illustrating the rear side of the lifting part illustrated in FIG. 4. FIG. 12 is a view illustrating an extended state of the lifting part illustrated in FIG. 11.

FIGS. 10 and 11 illustrate a retracted state of the lifting part ELP. In FIGS. 10 and 11, the drive belt DBT is illustrated by dotted lines.

Referring to FIGS. 10, 11, and 12, the lifting part ELP may include a plurality of support parts SUP arranged in the first direction DR1 and coupled to move relative to each other in the first direction DR1. When the lifting part ELP is retracted to the minimum, the support parts SUP may be disposed to make contact with each other. When the lifting part ELP is extended, the support parts SUP may be separated away from each other in the first direction DR1.

At least one of the support parts SUP may extend from one side (e.g., left side in FIG. 12) of the display module DM to the other side (e.g., right side in FIG. 12) thereof and may be disposed on the rear surface BS of the display module DM. The one side and the other side of the display module DM may be the opposite sides of the display module DM that are opposite to each other in the second direction DR2.

For example, in FIG. 12, the remaining support parts SUP other than the lowermost support part SUP with respect to the first direction DR1 may extend from the one side (e.g., left side) of the display module DM to the other side (e.g., right side) thereof and may be disposed on the rear surface BS of the display module DM. Accordingly, some of the support parts SUP may support the display module DM in the horizontal axis corresponding to the second direction DR2 when the display module DM is extended outside the housing HS. In the drawings, the plurality of support parts SUP are illustrated as extending from the one side of the display module DM to the other side thereof. However, without being limited thereto, in another embodiment, only one support part SUP may extend from the one side of the display module DM to the other side thereof. The drive belt DBT may be connected to the uppermost support part SUP with respect to the first direction DR1 and may be disposed in guide grooves EOP that are defined in the other support parts SUP, respectively. The guide grooves EOP may refer to the guide grooves EOP of the lifting part ELP described above.

A $(k+1)^{th}$ support part SUP_k+1 among the plurality of support parts SUP may be disposed under a $k^{th}$ support part SUP_k with respect to the first direction DR1. Exemplarily, the $k^{th}$ support part SUP_k is illustrated as the uppermost support part SUP, and the $(k+1)^{th}$ support part SUP_k+1 is illustrated as the support part SUP disposed under the uppermost support part SUP (i.e., the second uppermost support part). However, without being limited thereto, in another embodiment, the $k^{th}$ support part SUP_k and the $(k+1)^{th}$ support part SUP_k+1 may be defined as support parts SUP continuously disposed downward in this order.

When the support parts SUP make contact with each other, the $k^{th}$ support part SUP_k may be disposed to cover the upper end and at least a part of the opposite sides of the $(k+1)^{th}$ support part SUP_k+1. When the support parts SUP are spaced apart from each other in the first direction DR1, the opposite sides of the $k^{th}$ support part SUP_k may move in the first direction DR1 along the at least a part of the opposite sides of the $(k+1)^{th}$ support part SUP_k+1. The opposite sides (i.e., outermost sides) of the $k^{th}$ support part SUP_k may face away from each other in the second direction DR2, and the at least a part of the opposite sides (i.e., the part extended in the first direction DR1) of the $(k+1)^{th}$ support part SUP_k+1 may face away from each other in the second direction DR2.

The $k^{th}$ support part SUP_k may be disposed on the upper end and the at least a part of the opposite sides of the $(k+1)^{th}$ support part SUP_k+1. Specifically, the $k^{th}$ support part SUP_k may include a first extension EX1 extending in the second direction DR2 and second extensions EX2 extending in the first direction DR1 from the opposite ends of the first extension EX1 that are apart in the second direction DR2.

The first extension EX1 may be disposed over the $(k+1)^{th}$ support part SUP_k+1. When the lifting part ELP is retracted to the minimum in the first direction DR1, the first extension EX1 may make contact with the upper end of the $(k+1)^{th}$ support part SUP_k+1. When the lifting part ELP is extended upward in the first direction DR1, the first extension EX1 may move away from the upper end of the $(k+1)^{th}$ support part SUP_k+1 in the first direction DR1.

The second extensions EX2 may be disposed on the at least a part of the opposite sides of the $(k+1)^{th}$ support part SUP_k+1 spaced apart in the second direction DR2 and may be adjacent to the at least a part of the opposite sides of the $(k+1)^{th}$ support part SUP_k+1, respectively. The second extensions EX2 may be disposed outward of the at least a part of the opposite sides of the $(k+1)^{th}$ support part SUP_k+1 (i.e., part of sides extending in the first direction DR1) and may make contact with the at least a part of the opposite sides of the $(k+1)^{th}$ support part SUP_k+1, respectively.

Among the support parts SUP other than the lowermost support part SUP, the $(k+1)^{th}$ support part SUP_k+1, similarly to the $k^{th}$ support part SUP_k, may include a first extension EX1' extending in the second direction DR2 and second extensions EX2' extending in the first direction DR1 from the opposite ends of the first extension EX1' and apart in the second direction DR2.

The first extension EX1' may define the upper end of the $(k+1)^{th}$ support part SUP_k+1. The first extension EX1 may face the first extension EX1' in the first direction DR1. The at least a part of opposite sides of the $(k+1)^{th}$ support part SUP_k+1 may be defined by the second extensions EX2'. The second extensions EX2 may be disposed on the second extensions EX2' in the second direction DR2 and may be adjacent to the second extensions EX2', respectively.

The second extensions EX2 may be coupled to the at least a part of the opposite sides of the $(k+1)^{th}$ support part SUP_k+1 so as to move in the first direction DR1. Specifically, the second extensions EX2 may be coupled with the second extensions EX2', which define the at least a part of the opposite sides of the $(k+1)^{th}$ support part SUP_k+1, so as to move in the first direction DR1.

Among the support parts SUP other than the lowermost support part SUP, the $(k+1)^{th}$ support part SUP_k+1 may include third extensions EX3 extending in the second direction DR2 from the lower ends of the second extensions EX2' of the $(k+1)^{th}$ support part SUP_k+1, respectively. The third extensions EX3 may be disposed under the second extensions EX2 of the $k^{th}$ support part SUP_k. Specifically, the third extensions EX3 may extend outward from the lower ends of the second extensions EX2' and may be disposed under the second extensions EX2, respectively.

When the lifting part ELP is retracted to the minimum in the first direction DR1, the second extensions EX2 may make contact with the third extensions EX3. When the lifting part ELP is extended in the first direction DR1, the second extensions EX2 may move away from the third extensions EX3 in the first direction DR1.

Cross roller bearings CRB may be connected to the second extensions EX2. In addition, cross roller bearings CRB may be connected to the at least a part of the opposite sides of the $(k+1)^{th}$ support part SUP_k+1. Specifically, the cross roller bearings CRB may be connected to the second extensions EX2' to face the cross roller bearings CRB connected to the second extensions EX2.

The cross roller bearings CRB disposed on the second extensions EX2 and the cross roller bearings CRB disposed on the second extensions EX2' may be coupled to move relative to each other in the first direction DR1. The second extensions EX2 may be coupled with the second extensions EX2' by the cross roller bearings CRB so as to move in the first direction DR1. The structure of the cross roller bearings CRB will be described below in detail.

The lifting part ELP may further include first stoppers STP1 that are connected to the support parts SUP and that extend in the second direction DR2 and second stoppers STP2 that are defined on the support parts SUP and that extend in the first direction DR1. Movements of the support parts SUP may be restricted by the first and second stoppers STP1 and STP2. This structure will be described below in detail with reference to FIGS. 13 and 14A.

The $k^{th}$ support part SUP_k may further include a protrusion PRT protruding from a portion of the first extension EX1 downward in the first direction DR1. The protrusion PRT may protrude from the central portion of the first extension EX1 toward the $(k+1)^{th}$ support part SUP_k+1. The protrusion PRT may be disposed in a depression RES concavely defined in the first direction DR1 at the upper end of the $(k+1)^{th}$ support part SUP_k+1.

Exemplarily, the protrusion PRT may protrude in a quadrilateral shape, and the depression RES may be recessed in a quadrilateral shape to accommodate the protrusion PRT. However, the shapes of the protrusion PRT and the depression RES are not limited thereto.

In the support parts SUP other than the lowermost and the uppermost support parts SUP, the depression RES may be concavely formed on the central portion of a horizontal extension (e.g., the first extension EX1') of each support part in the downward direction. A depression RES may be concavely formed in the downward direction from the upper end of the lowermost support part SUP.

Figure 13:
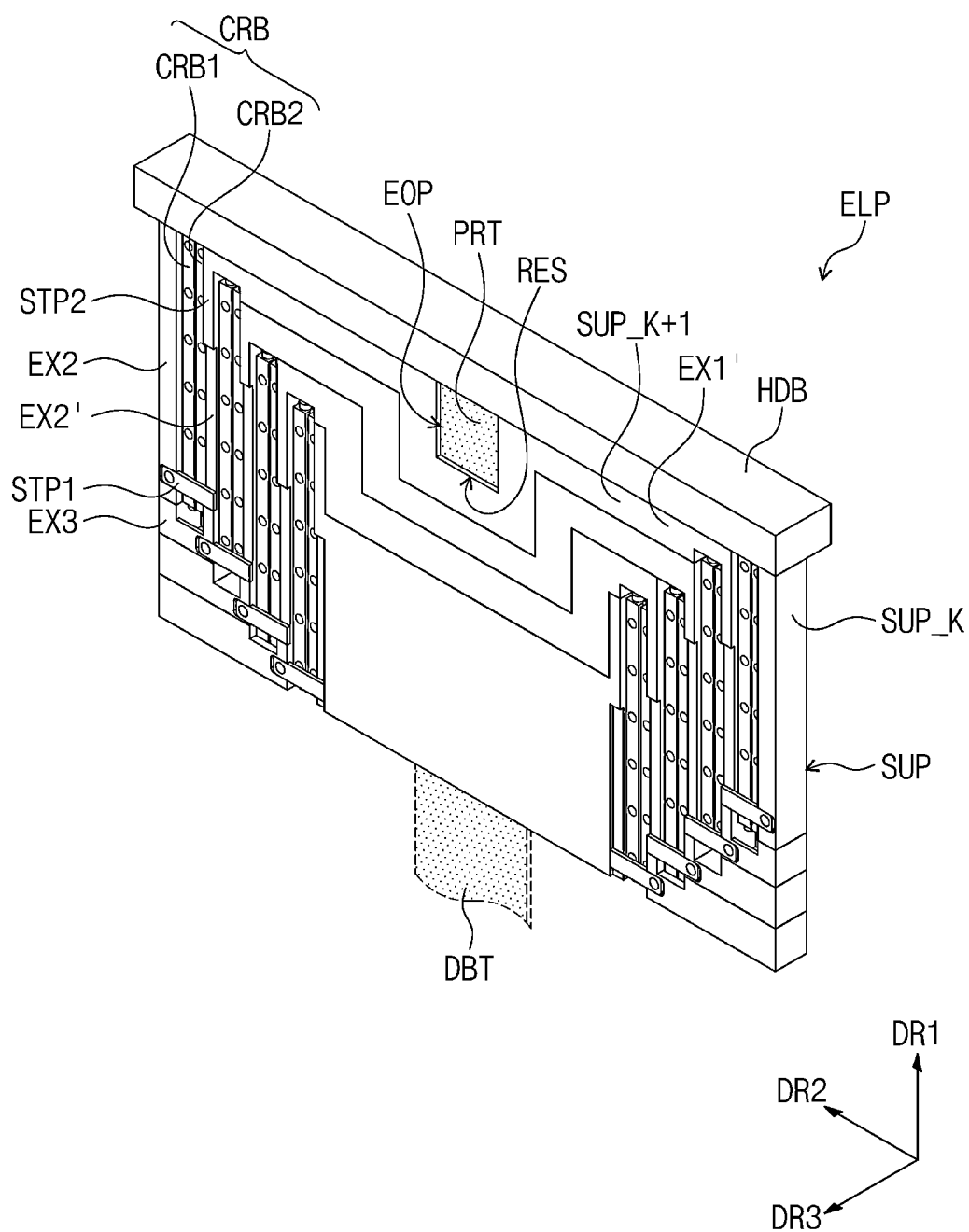
FIG. 13 is a view illustrating an internal structure of the front side of the lifting part illustrated in FIG. 10.
Figure 14A:
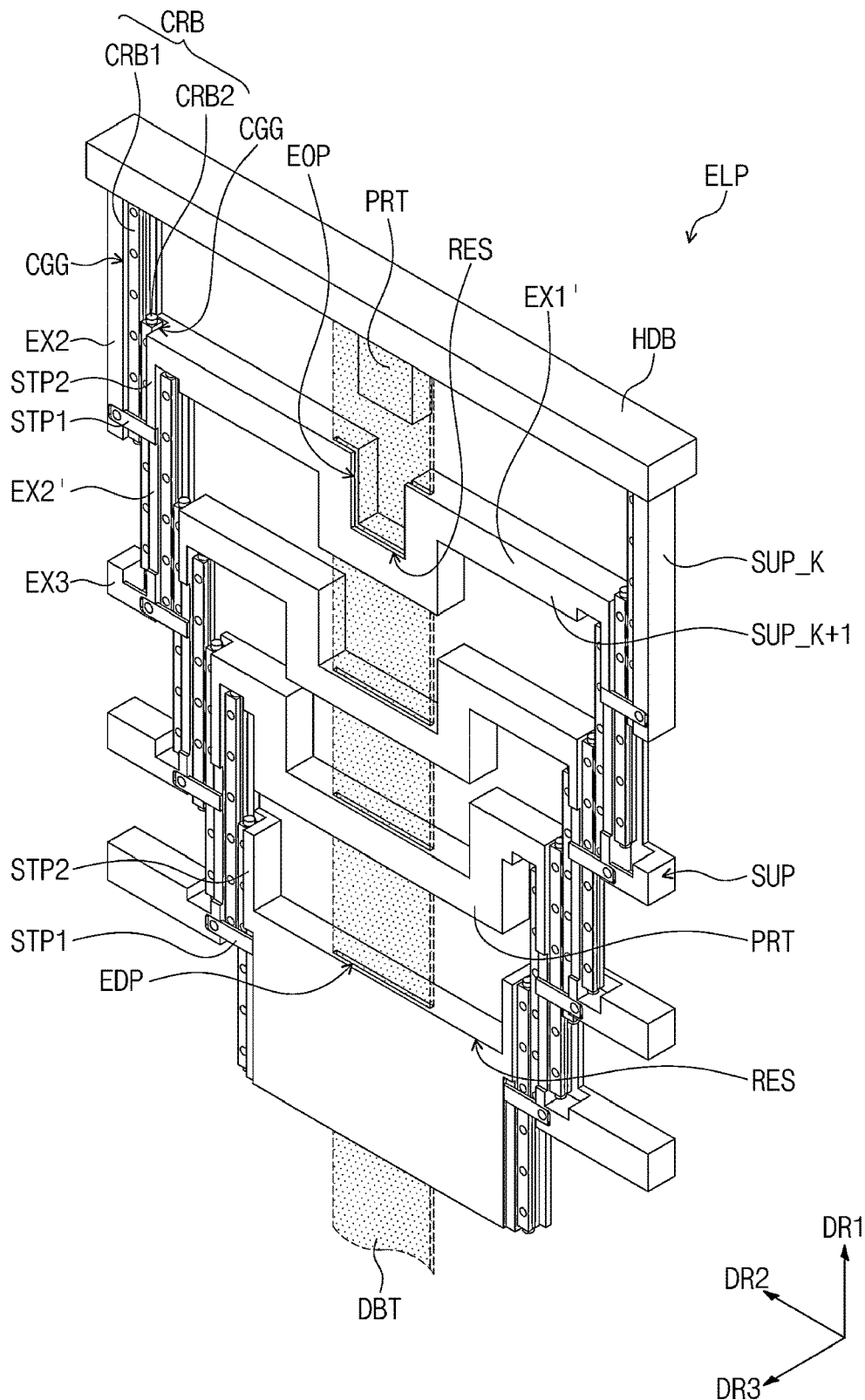
FIG. 14A is a view illustrating an extended state of the lifting part illustrated in FIG. 13.
Figure 14B:
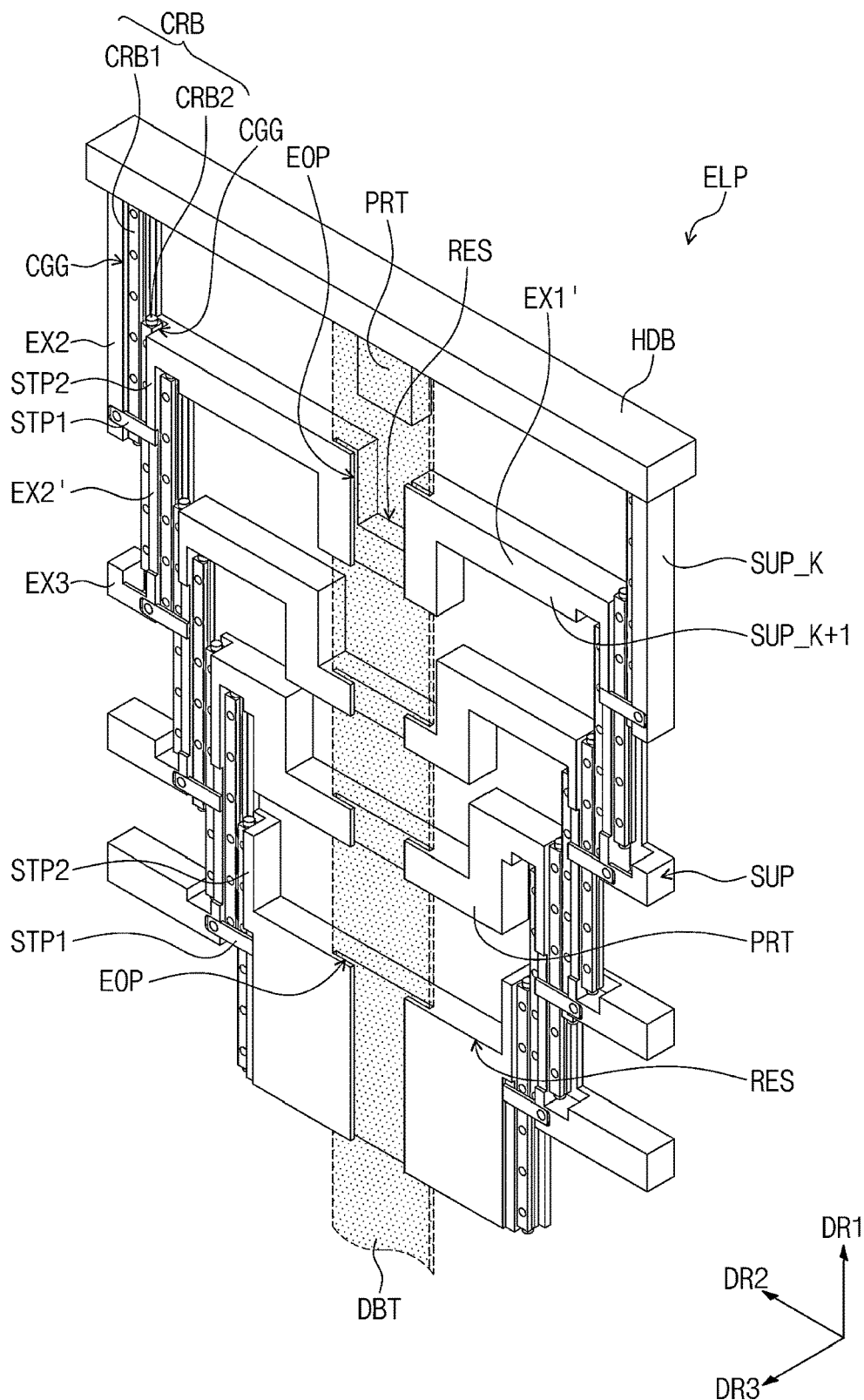
FIG. 14B is a view illustrating a lifting part having a different structure from that illustrated in FIG. 14A.
Figure 15:
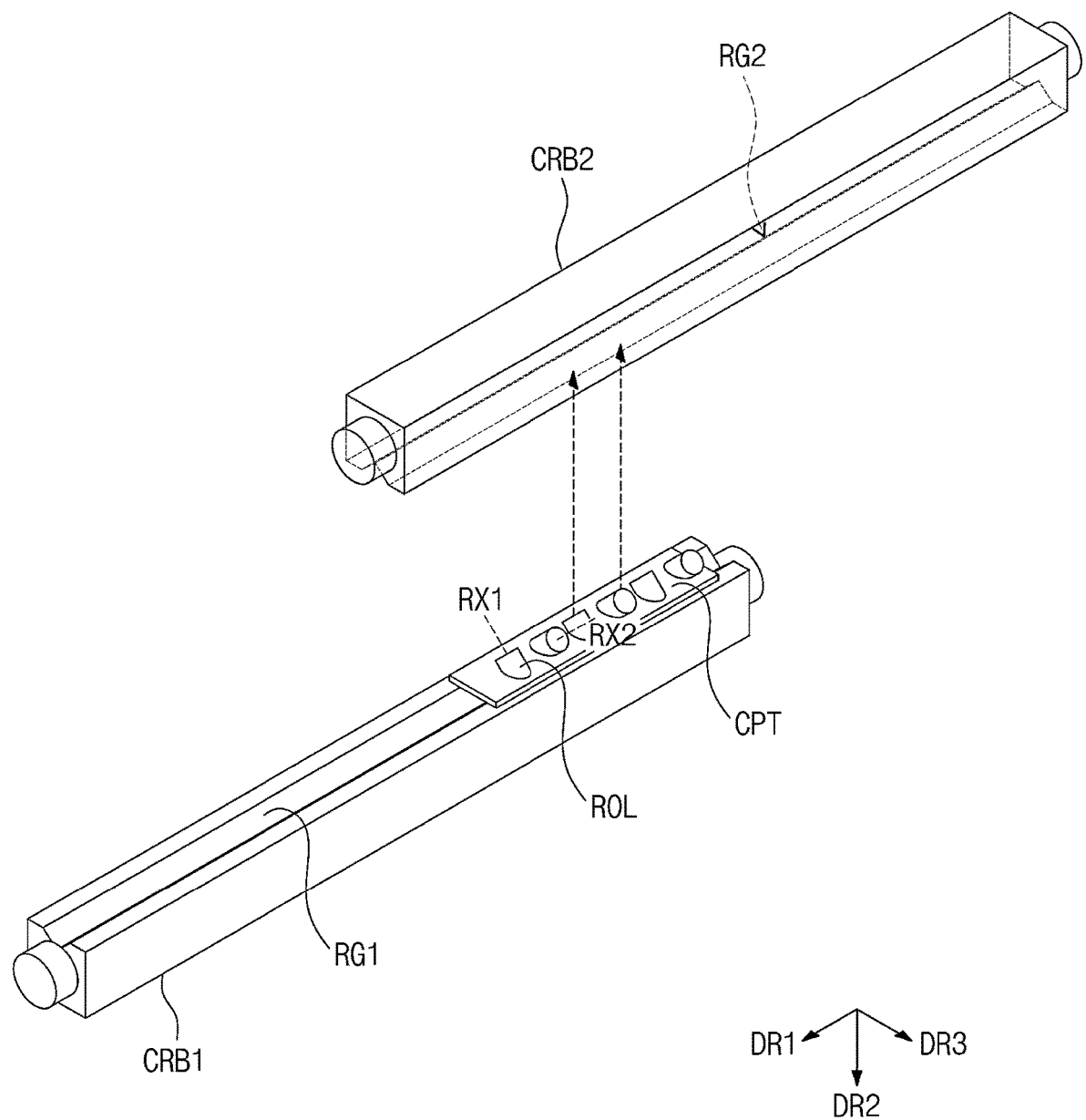
FIG. 15 is a view illustrating two adjacent cross roller bearings illustrated in FIG. 14.

FIG. 13 is a front perspective view of the lifting part illustrated in FIG. 10. FIG. 14A is a view illustrating an extended state of the lifting part illustrated in FIG. 13. FIG. 14B is a view illustrating a lifting part having a different structure from that illustrated in FIG. 14A. FIG. 15 is a view illustrating two adjacent cross roller bearings illustrated in FIG. 14.

Referring to FIGS. 13 and 14, the lifting part ELP may include the cross roller bearings CRB, the plurality of first stoppers STP1, and the plurality of second stoppers STP2.

The cross roller bearings CRB may be connected to the second extensions EX2 and the at least a part of the opposite sides of the $(k+1)^{th}$ support part SUP_k+1. Specifically, the cross roller bearings CRB may include first cross roller bearings CRB1 connected to the second extensions EX2 and second cross roller bearings CRB2 connected to the second extensions EX2'.

Grooves CGG may be defined on the second extensions EX2 and the second extensions EX2', and the first and second cross roller bearings CRB1 and CRB2 may be disposed in the grooves CGG. The grooves CGG may extend in the first direction DR1. The grooves CGG defined on the second extensions EX2 and the grooves CGG defined on the second extensions EX2' may face each other in the second direction DR2.

The first and second cross roller bearings CRB1 and CRB2 may be disposed in the grooves CGG and may be connected to the second extensions EX2 and the second extensions EX2'. The first cross roller bearings CRB1 and the second cross roller bearings CRB2 may be disposed to face each other. The first cross roller bearings CRB1 may be coupled with the second cross roller bearings CRB2 so as to move in the first direction DR1.

Referring to FIG. 15, a first rail groove RG1 may be defined on one surface of the first cross roller bearing CRB1 that faces the second cross roller bearing CRB2. A second rail groove RG2 may be defined on one surface of the second cross roller bearing CRB2 that faces the first cross roller bearing CRB1.

A plurality of rollers ROL may be disposed in a portion of the first rail groove RG1. The rollers ROL may be connected to the one surface of the first cross roller bearing CRB1 through a coupling plate CPT. The rollers ROL may be arranged in the first direction DR1. Axes of rotation RX1 and RX2 of two rollers ROL adjacent to each other may be defined to cross each other at a right angle. The structure of the rollers ROL may be defined as a cross roller.

The second cross roller bearing CRB2 may be coupled to the one surface of the first cross roller bearing CRB1 and may be moved in the first direction DR1 through the rollers ROL. The rollers ROL may be inserted into the second rail groove RG2, and the second cross roller bearing CRB2 may move in the first direction DR1 along the rollers ROL rotating about the axes of rotation RX1 and RX2 crossing each other at a right angle.

Although the cross roller bearings CRB1 and CRB2 are illustrated and described, the present disclosure is not limited thereto. For example, to move the support parts SUP in the first direction DR1, various bearings moving in the first direction DR1 may be coupled to the support parts SUP.

Referring to FIGS. 13 and 14A, the $k^{th}$ support part SUP_k may include the first stoppers STP1 extending from the second extensions EX2 toward the opposite sides (e.g., second extensions EX2') of the $(k+1)^{th}$ support part SUP_k+1. The first stoppers STP1 may extend in the second direction DR2. The first stoppers STP1 may extend to pass over the front surfaces of the first and second cross roller bearings CRB1 and CRB2. The front surfaces of the first and second cross roller bearings CRB1 and CRB2 may be defined as surfaces facing the display module DM.

The first stoppers STP1 may be connected to the second extensions EX2 through fastening units such as screws. However, without being limited thereto, the first stoppers STP1 may be integrally formed with the second extensions EX2 and may extend from the second extensions EX2 in another embodiment.

The second stoppers STP2 may be defined on the at least a part of the opposite sides of the $(k+1)^{th}$ support part SUP_k+1. Specifically, the second stoppers STP2 may be defined on the second extensions EX2' and may protrude in the third direction DR3 and extend in the first direction DR1. The second stoppers STP2 may be disposed on the first stoppers STP1, respectively, in the first direction DR1. When viewed in the first direction DR1, ends of the first stoppers STP1 may overlap the second stopper STP2, respectively.

Referring to FIG. 14A, when the lifting part ELP is extended, the first and second stoppers STP1 and STP2 may restrict the maximum extending distances of the support parts SUP in the first direction DR1. When the $k^{th}$ support part SUP_k moves away from the $(k+1)^{th}$ support part SUP_k+1 in the first direction DR1, the first stoppers STP1 may make contact with the second stoppers STP2 to stop the movement of the $k^{th}$ support part SUP_k.

Referring to FIG. 13, when the lifting part ELP is retracted, the second extensions EX2 moving in the first direction DR1 may make contact with the third extensions EX3, and the movement of the second extensions EX2 may be stopped. Furthermore, when the lifting part ELP is retracted, the protrusion PRT may be disposed in the depression RES, and the movement of the $k^{th}$ support part SUP_k may be stopped.

The uppermost support part SUP may be connected to the head bar HDB. The drive belt DBT may be disposed in the guide grooves EOP defined in the support parts SUP other than the uppermost support part SUP. The drive belt DBT may be disposed on the front surface of the protrusion PRT of the uppermost support part SUP.

Referring to FIGS. 13 and 14A, the guide grooves EOP defined in the support parts SUP may be closed openings that are open in the first direction DR1. As the drive belt DBT moves along the guide grooves EOP, the drive belt DBT may not be separated from the support parts SUP to the outside. The guide grooves EOP may guide the drive belt DBT such that the drive belt DBT is not separated from the support parts SUP to the outside.

Referring to FIG. 14B, the guide grooves EOP in FIG. 14A are closed openings that are open in the first direction DR1, but present disclosure is not limited thereto. For example, the guide grooves EOP may be defined in the support parts SUP to cover the opposite sides of the drive belt DBT that face away from each other in the second direction DR2 in another embodiment.

Specifically, portions of the support parts SUP disposed on the front surface of the central portion of the drive belt DBT may be removed. In this case, the front surface of the central portion of the drive belt DBT may be exposed to the outside, and the guide grooves EOP covering the opposite sides of the drive belt DBT may be defined in the support parts SUP. Even in this structure, the guide grooves EOP may guide the drive belt DBT such that the drive belt DBT is not separated from the support parts SUP to the outside.

However, without being limited thereto, portions of the support parts SUP disposed on the rear surface of the central portion of the drive belt DBT may be removed in another embodiment. In this case, the rear surface of the central portion of the drive belt DBT may be exposed to the outside, and the guide grooves EOP covering the opposite sides of the drive belt DBT may be defined in the support parts SUP. Furthermore, to guide the drive belt DBT, various structures may be applied as embodiments of the present disclosure as long as the structures are capable of preventing separation of the drive belt DBT during a lifting operation of the lifting part ELP.

Referring to FIGS. 4 and 14A, the first and second stoppers STP1 and STP2 and the cross roller bearings CRB may not be exposed to the outside by the display module DM because the display module DM is disposed on the first and second stoppers STP1 and STP2 and the cross roller bearings CRB.

Additionally, covers (not illustrated) may be disposed on the first and second stoppers STP1 and STP2 and the cross roller bearings CRB to cover the first and second stoppers STP1 and STP2 and the cross roller bearings CRB. The first and second stoppers STP1 and STP2 and the cross roller bearings CRB may not be further exposed to the outside by the covers (not illustrated).

Figure 16:
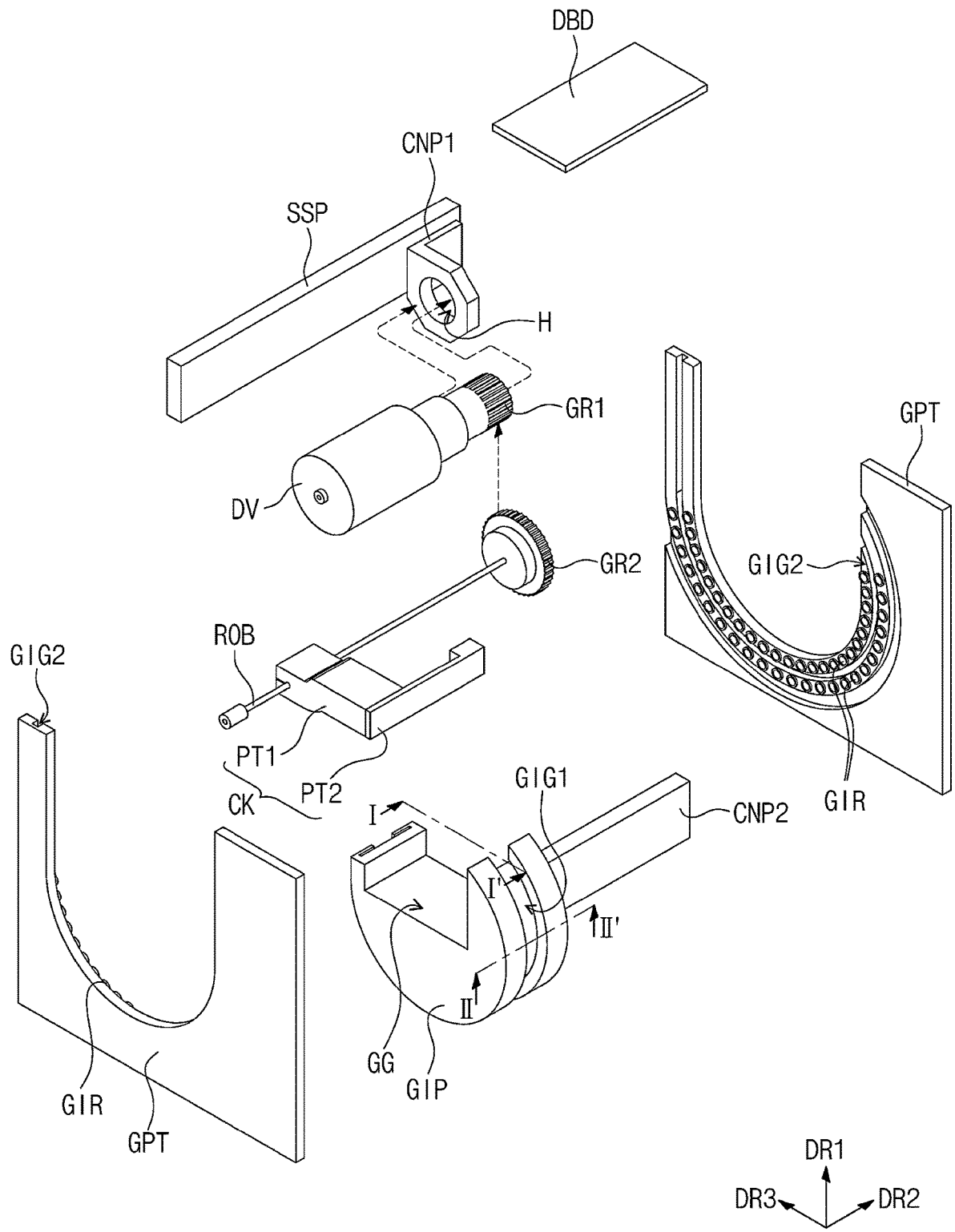
FIG. 16 is an exploded perspective view illustrating the components disposed in the housing illustrated in FIG. 4.

FIG. 16 is an exploded perspective view illustrating components disposed in the housing illustrated in FIG. 4.

Exemplarily, the housing HS is omitted in FIG. 16.

Referring to FIGS. 4 and 16, the display device DD may further include the first and second gears GR1 and GR2, a plurality of guide plates GPT, and a plurality of guide rollers GIR. The support plate SSP may have a flat plate shape defined by the first and second directions DR1 and DR2. The support plate SSP may extend longer in the second direction DR2 than in the first direction DR1.

The drive board DBD may be disposed on the support plate SSP. The drive board DBD may have a flat plate shape defined by the second and third directions DR2 and DR3. The drive board DBD may be connected to the upper end of the support plate SSP with respect to the first direction DR1.

The first connecting part CNP1 may be connected to one of opposite surfaces of the support plate SSP and which are apart in the second direction DR2. The first connecting part CNP1 may have a flat plate shape defined by the first and third directions DR1 and DR3. The first connecting part CNP1 may have a hole H defined therein, and the hole H may penetrate a portion of the first connecting part CNP1 in the second direction DR2. The first connecting part CNP1 may be adjacent to one of opposite sides of the support plate SSP and which are apart in the second direction DR2.

The drive part DV may have a cylindrical shape extending in the second direction DR2. The drive part DV may include a motor. The drive part DV may rotate about an axis of rotation parallel to the second direction DR2. Substantially, the motor disposed in the drive part DV may rotate about an axis of rotation parallel to the second direction DR2.

The support plate SSP may be disposed between the lifting part ELP and the drive part DV that are disposed in the housing HS. The support plate SSP may be disposed between the lifting part ELP and the first connecting part CNP1 that are disposed in the housing HS.

The first gear GR1 may have a cylindrical shape extending in the second direction DR2. The first gear GR1 may be a wheel having cogs on the outer circumferential surface thereof. The first gear GR1 may be arranged in the second direction DR2 with the drive part DV and may be connected to the drive part DV. Torque of the drive part DV may be transmitted to the first gear GR1. The first gear GR1 may rotate about the same axis of rotation as the drive part DV.

The first gear GR1 may be inserted into the hole H and may extend outside the first connecting part CNP1. An end of the first gear GR1 may pass through the hole H and may be disposed outside the first connecting part CNP1. The end of the first gear GR1 may be adjacent to one side of the support plate SSP.

The drive part DV may be connected to the first connecting part CNP1. One surface of the drive part DV that faces the second direction DR2 may be connected to the first connecting part CNP1. The drive part DV may be connected to the support plate SSP through the first connecting part CNP1.

The rotating bar ROB may have a cylindrical shape extending in the second direction DR2. The second gear GR2 may be arranged in the second direction DR2 with the rotating bar ROB and may be connected to one end of the rotating bar ROB. The second gear GR2 may be a wheel having cogs on the outer circumferential surface thereof. The second gear GR2 may be disposed to be engaged with the first gear GR1. The rotating bar ROB and the second gear GR2 may rotate about the same axis of rotation that extends in the second direction DR2.

The crank CK may be spaced apart from the second gear GR2 in the second direction DR2 and may be connected to the rotating bar ROB. The crank CK may include a first portion PT1 connected to the rotating bar ROB and a second portion PT2 that is connected to the first portion PT1 and that extends in the second direction DR2.

The recess GG recessed downward from an upper portion of the guide part GIP may be defined in the guide part GIP. The drive part DV and the rotating bar ROB may be disposed in the recess GG. The rotating bar ROB may extend in the second direction DR2 through the recess GG.

The second connecting part CNP2 may extend in the second direction DR2. The second connecting part CNP2 may have a flat plate shape defined by the first and second directions DR1 and DR2. The second connecting part CNP2 may be connected to the guide part GIP and the sidewall part SP facing each other in the second direction DR2.

The crank CK, especially the first portion PT1, may be disposed on a side surface of the guide part GIP in the second direction DR2. The second connecting part CNP2 may be connected to one of opposite side surfaces of the guide part GIP and which are apart in the second direction DR2, and the crank CK may be disposed on the other one of the opposite side surfaces of the guide part GIP.

Figure 19:
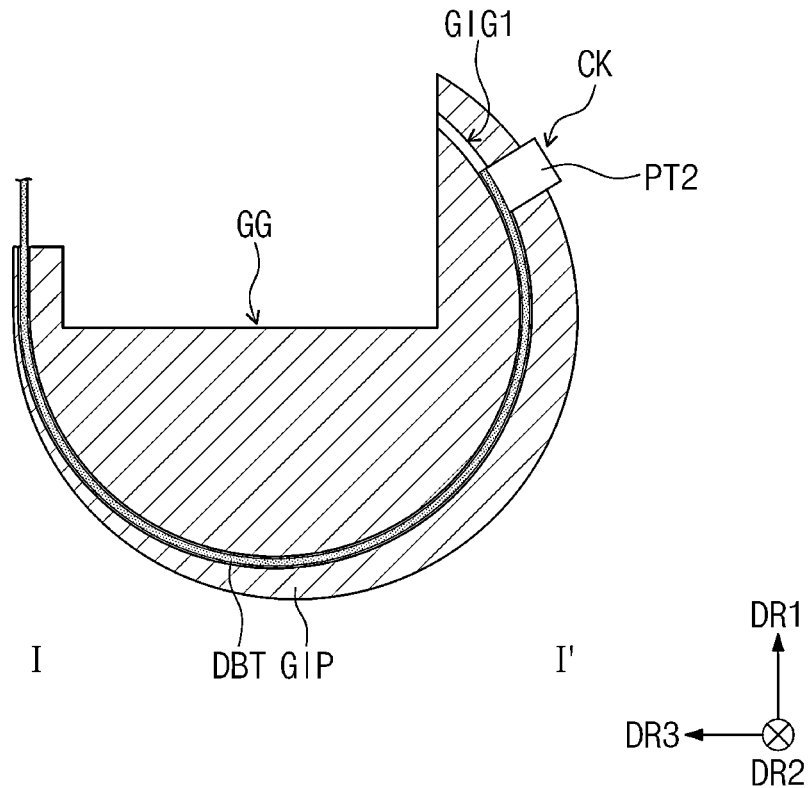
FIG. 19 is a sectional view of a guide part taken along line I-I' illustrated in FIG. 16.

As described above, when viewed in the second direction DR2, the periphery of the guide part GIP may have an arc shape defined by a curve (See FIG. 19). The first guide groove GIG1 may be defined on the periphery of the guide part GIP. The first guide groove GIG1 may extend along the periphery of the guide part GIP and may have a curved shape. An end of the second portion PT2 of the crank CK may protrude toward the first guide groove GIG1 and may be disposed in the first guide groove GIG1.

The guide plates GPT may have a flat plate shape defined by the first and third directions DR1 and DR3. The guide plates GPT may face each other in the second direction DR2 in the housing HS. The guide plates GPT may be connected to the sidewall parts SP facing each other in the second direction DR2. A second guide groove GIG2 may be defined on each of inside surfaces of the guide plates GPT facing each other in the second direction DR2. When viewed in the second direction DR2, the second guide groove GIG2 may have a curved shape.

The guide rollers GIR may be adjacent to the second guide groove GIG2 and may be disposed along the second guide groove GIG2. The guide rollers GIR may be disposed with the second guide groove GIG2 therebetween. The guide rollers GIR each may have a circular shape when viewed in the second direction DR2 and may rotate about an axis of rotation that is parallel to the second direction DR2.

Figure 17:
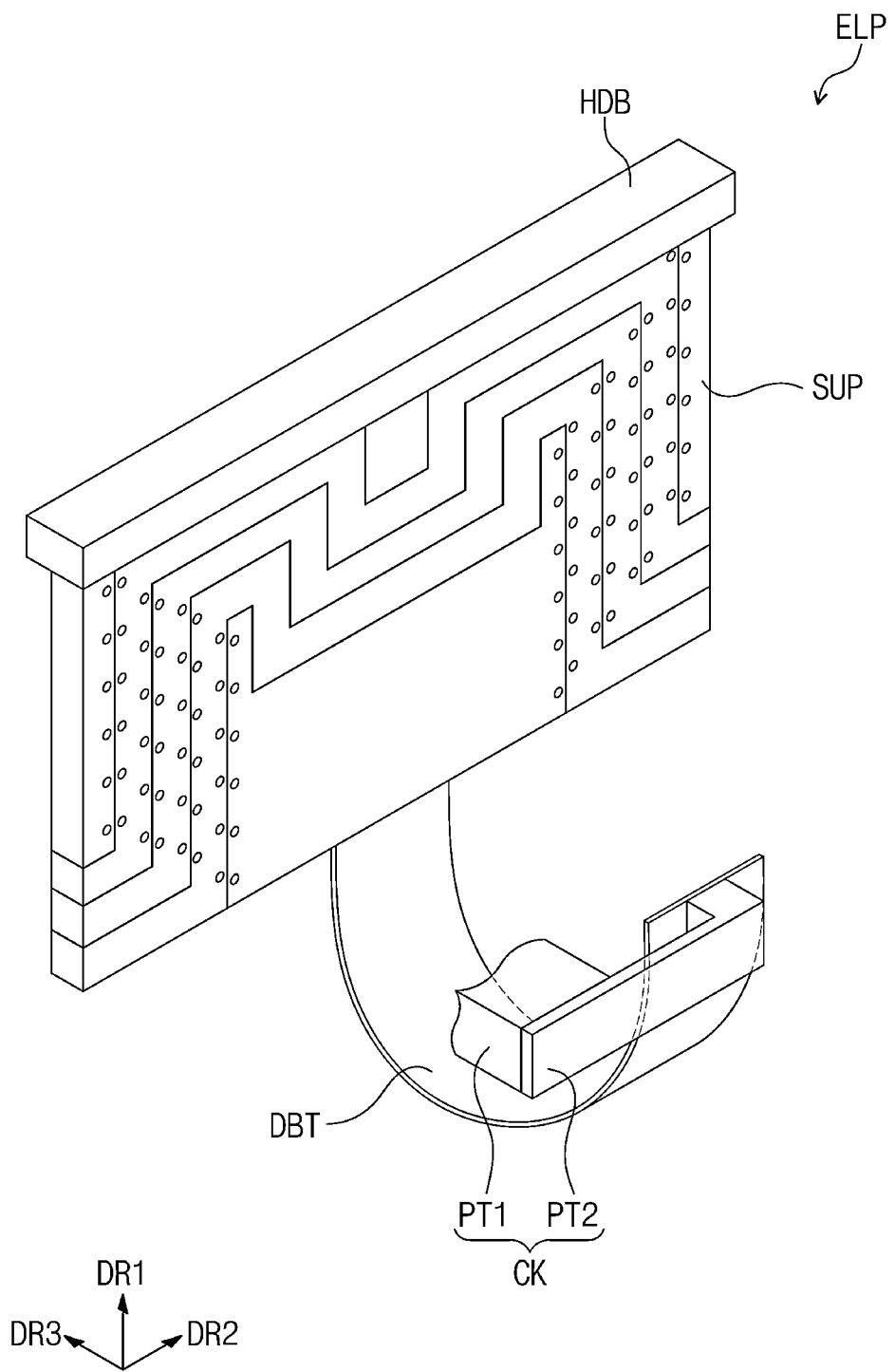
FIGS. 17 and 18 are views illustrating a drive belt and the lifting part connected to a crank illustrated in FIG. 16.
Figure 18:
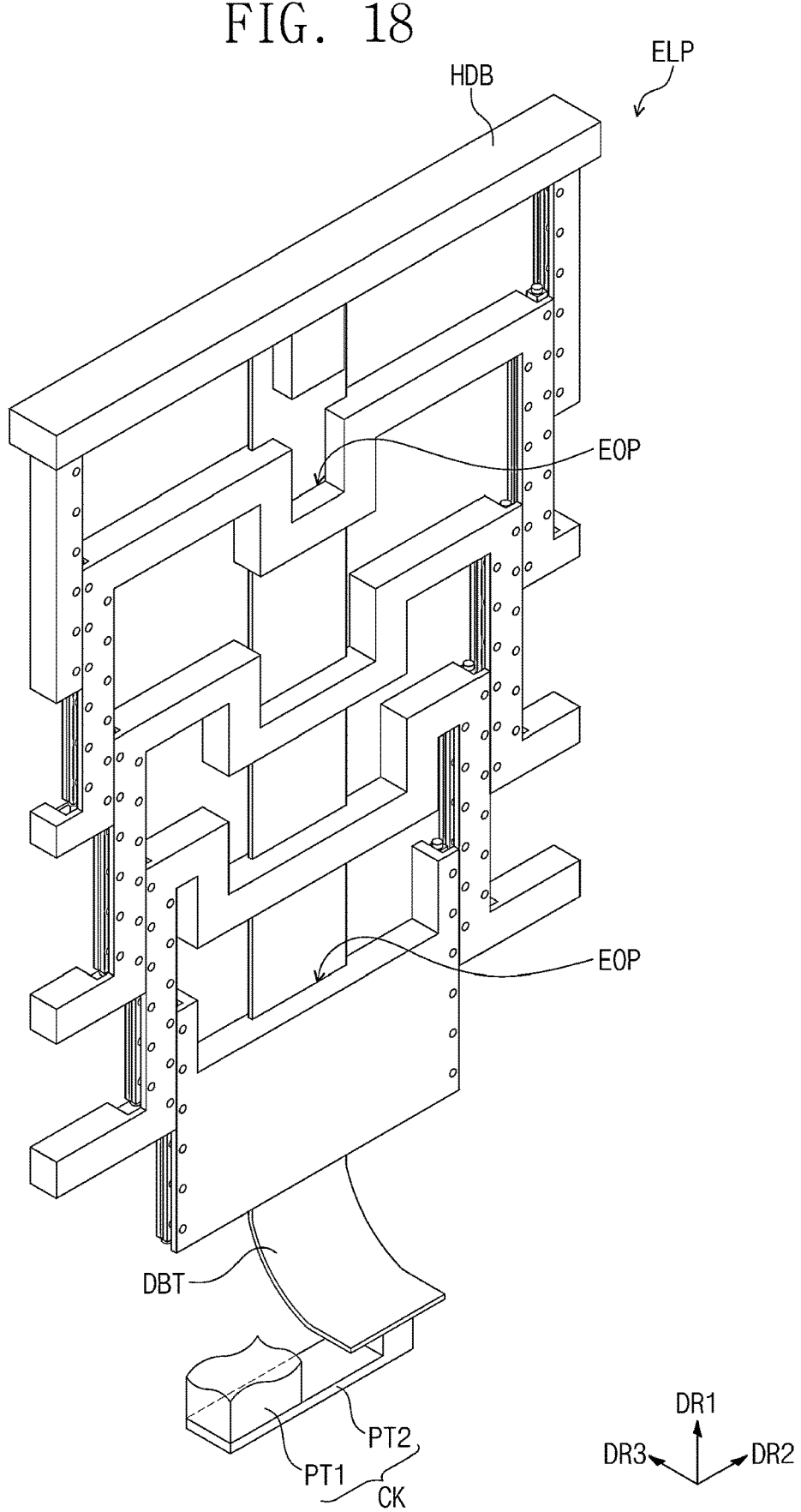

FIGS. 17 and 18 are views illustrating the drive belt and the lifting part connected to the crank illustrated in FIG. 16.

The lifting part ELP in FIG. 17 is illustrated in a retracted state, and the lifting part ELP in FIG. 18 is illustrated in an extended state.

Referring to FIGS. 17 and 18, the crank CK may be connected to the drive belt DBT. Specifically, the opposite end of the drive belt DBT may be connected to a protruding end of the second portion PT2 of the crank CK. The drive belt DBT extending outside the lifting part ELP may have a curved shape. The drive belt DBT may contain a metallic or plastic material that has a predetermined elasticity and that can be deformed in a curved shape. The crank CK may be connected to the drive belt DBT extending outside the lifting part ELP.

As described above, the crank CK may move to rotate as the rotating bar ROB rotates. The drive belt DBT may move to extend the lifting part ELP as the crank CK moves. This operation will be described below in detail.

Figure 20:
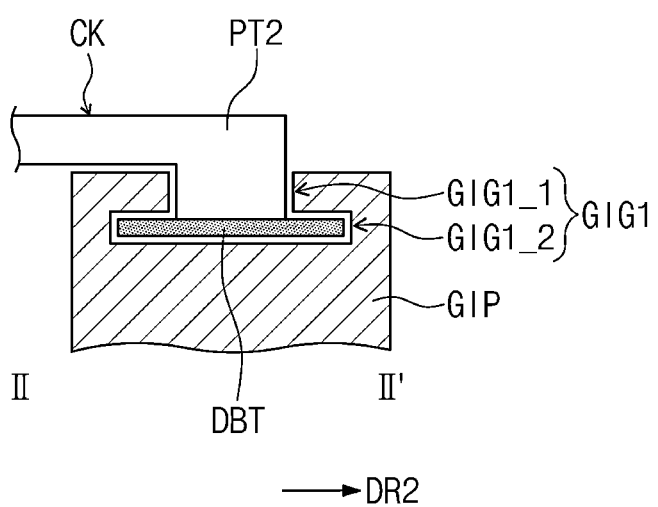
FIG. 20 is a sectional view of the guide part taken along line II-II' illustrated in FIG. 16.

FIG. 19 is a sectional view of the guide part taken along line I-I' illustrated in FIG. 16. FIG. 20 is a sectional view of the guide part taken along line II-II' illustrated in FIG. 16.

Referring to FIGS. 19 and 20, a portion of the drive belt DBT may be disposed in the first guide groove GIG1. The crank CK may be disposed in the first guide groove GIG1 and may be connected to the drive belt DBT. Specifically, the second portion PT2 of the crank CK may be disposed in the first guide groove GIG1 and may be connected to the drive belt DBT.

The first guide groove GIG1 may include a first groove portion GIG1_1 recessed inward from the periphery of the guide part GIP and a second groove portion GIG1_2 recessed from the lower end of the first groove portion GIG1_1 toward the opposite side surfaces of the guide part GIP and which are apart in the second direction DR2.

The protruding end of the second portion PT2 may be disposed in the first groove portion GIG1_1. The drive belt DBT may be disposed in the second groove portion GIG1_2. The second portion PT2 may move along the first groove portion GIG1_1, and the drive belt DBT may move along the second groove portion GIG1_2. Accordingly, the second portion PT2 and the drive belt DBT may move along a curved path of the first guide groove GIG1.

Figure 21:
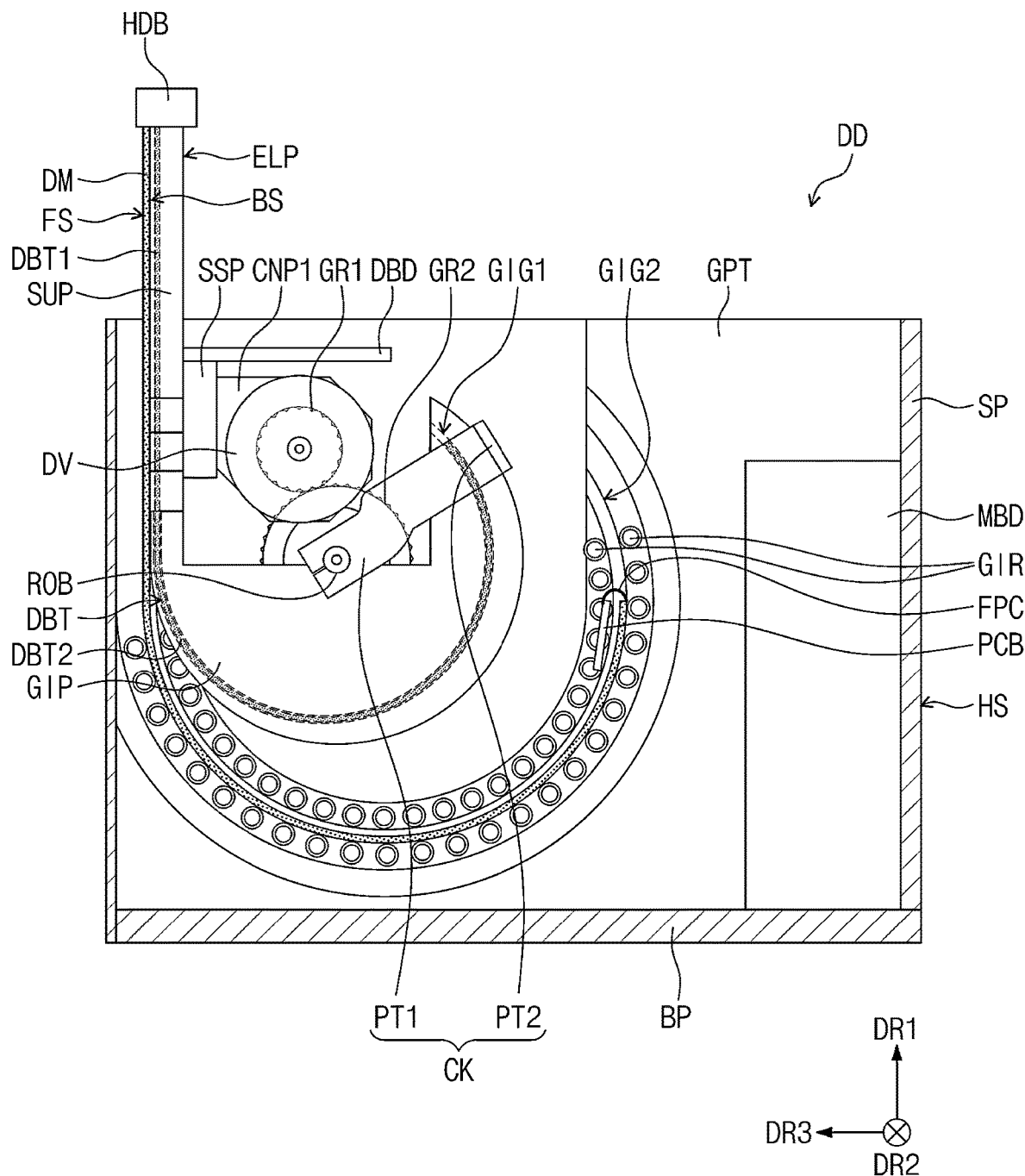
FIGS. 21 and 22 are views illustrating the components disposed in the housing illustrated in FIG. 16 and side surfaces of the lifting part illustrated in FIGS. 17 and 18.
Figure 22:
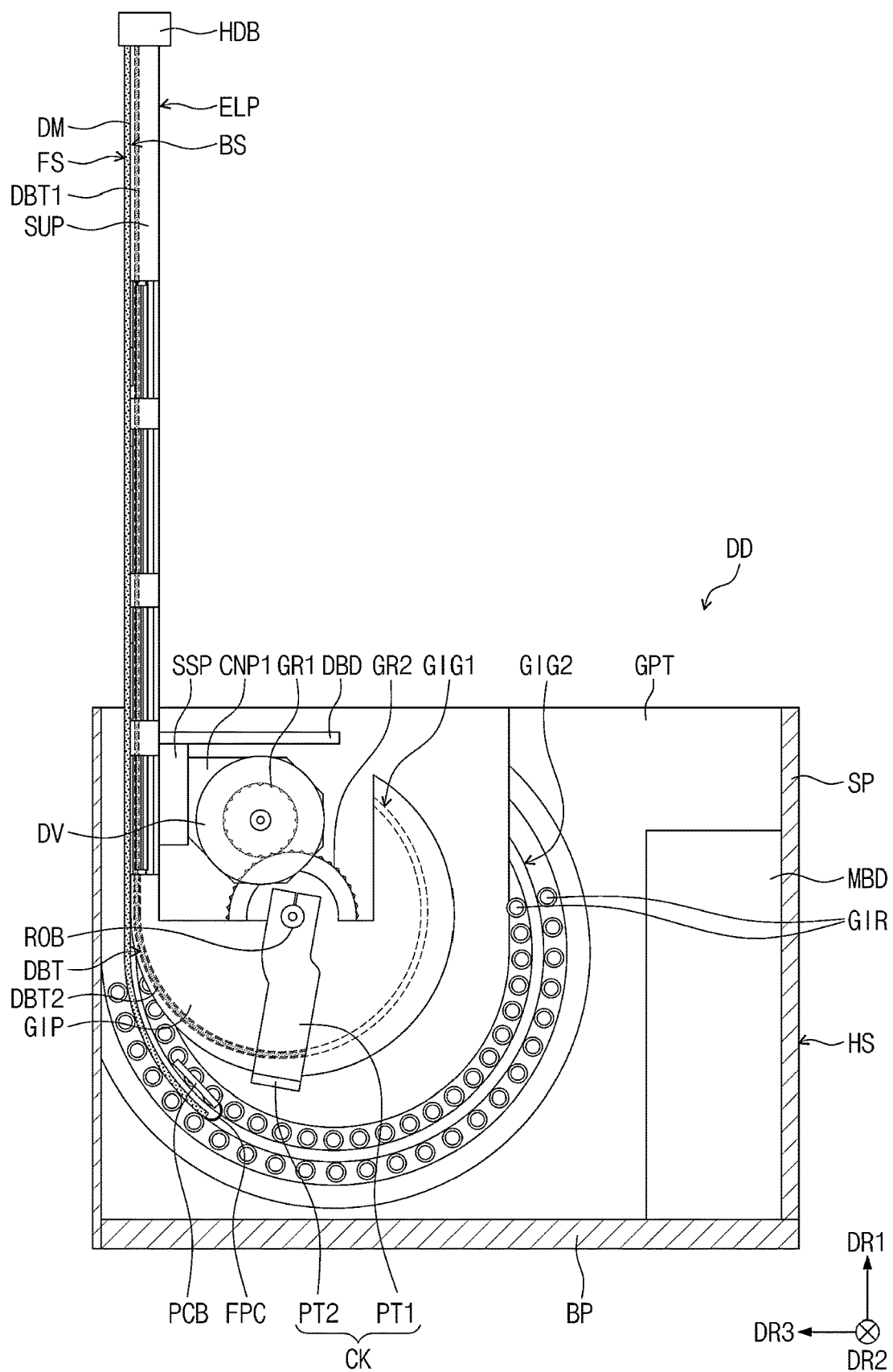
Figure 23:
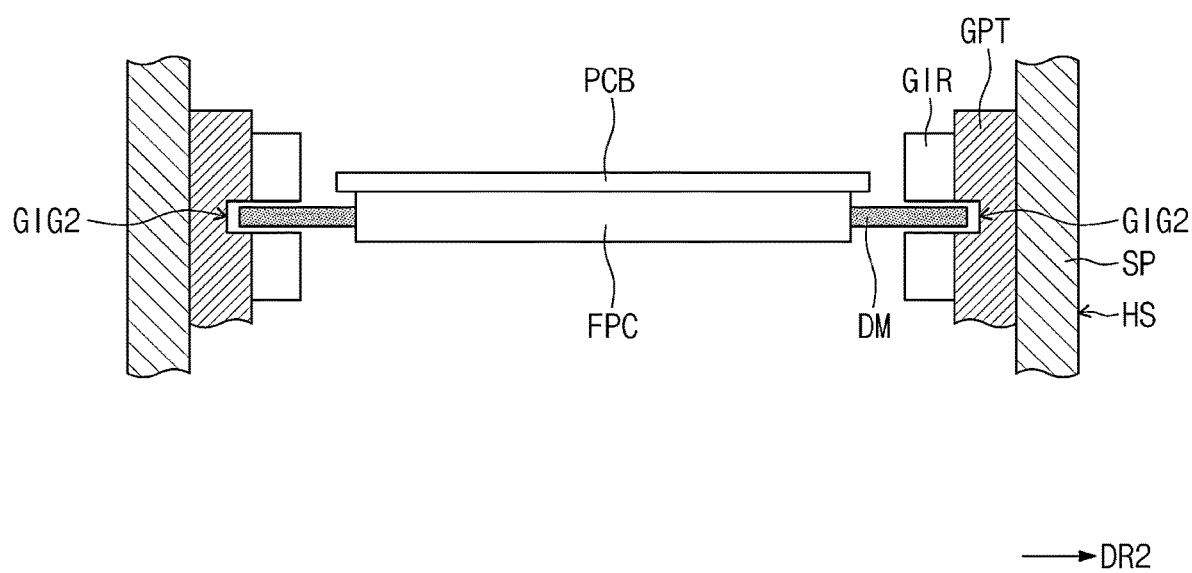
FIG. 23 is a sectional view of guide plates obtained by cutting the guide plates illustrated in FIG. 16 in a second direction.

FIGS. 21 and 22 are views illustrating the components disposed in the housing illustrated in FIG. 16 and the side surfaces of the lifting part illustrated in FIGS. 17 and 18. FIG. 23 is a sectional view of the guide plates obtained by cutting the guide plates illustrated in FIG. 16 in the second direction.

The lifting part ELP in FIG. 21 is illustrated in a retracted state, and the lifting part ELP in FIG. 22 is illustrated in an extended state. Exemplarily, in FIGS. 21 and 22, the drive belt DBT and the first guide groove GIG1 are illustrated by dotted lines. Furthermore, in FIGS. 21 and 22, the structure in which the first and second gears GR1 and GR2 are engaged with each other is illustrated by dotted lines.

Referring to FIGS. 4, 21, and 22, the drive belt DBT may include a first drive belt DBT1 disposed in the lifting part ELP and a second drive belt DBT2 disposed in the first guide groove GIG1. The first drive belt DBT1 may be disposed in the guide grooves EOP described above and may move in the first direction DR1. The second drive belt DBT2 may be disposed outside the lifting part ELP and may be connected to the crank CK in the housing HS in the extended state or in the retracted state.

The first gear GR1 connected to the drive part DV may be engaged with the second gear GR2. The second gear GR2 may be connected to the rotating bar ROB. The crank CK connected to the rotating bar ROB may be connected to the second drive belt DBT2. Accordingly, the second drive belt DBT2 may be connected to the drive part DV by the crank CK, the rotating bar ROB, and the first and second gears GR1 and GR2. Torque of the drive part DV may be transmitted to the drive belt DBT through the first and second gears GR1 and GR2, the rotating bar ROB, and the crank CK.

A motor board MBD may be disposed in the housing HS. The drive part DV may operate to rotate by the motor board MBD. Exemplarily, the motor board MBD may be disposed in the housing HS. However, without being limited thereto, the motor board MBD may be disposed outside the housing HS in another embodiment. Although not illustrated, the motor board MBD may be connected to the drive part DV by interconnection wiring.

Referring to FIG. 23, the display module DM may be disposed in the second guide grooves GIG2 in the housing HS. A portion of the display module DM disposed outside the lifting part ELP may move along the second guide grooves GIG2. For example, the opposite sides of the display module DM facing away from each other in the second direction DR2 may be disposed in the second guide grooves GIG2 and may move along the second guide grooves GIG2. The guide rollers GIR may guide the movement of the display module DM while rotating.

Referring to FIGS. 4 and 22, as the drive part DV rotates in the counterclockwise direction, the first gear GR1 may rotate in the counterclockwise direction. When the first gear GR1 rotates in the counterclockwise direction, the second gear GR2 and the rotating bar ROB may rotate in the clockwise direction. The crank CK may rotate in the clockwise direction by the rotating bar ROB.

While the crank CK rotates in the clockwise direction, the second drive belt DBT2 connected to the crank CK may move in the clockwise direction along the first guide groove GIG1. Furthermore, when the crank CK rotates in the clockwise direction, the first drive belt DBT1 may move in the first direction DR1 so as to be extended outside the housing HS along the guide grooves EOP. That is, the drive belt DBT may move in the first direction DR1 by the torque of the drive part DV.

The drive belt DBT may move the head bar HDB away from the housing HS in the first direction DR1 and may move the support parts SUP, which are connected to the head bar HDB, away from each other in the first direction DR1. Accordingly, the lifting part ELP may be extended in the first direction DR1.

When the support parts SUP move away from each other in the first direction DR1, the display module DM may move in the clockwise direction along the second guide grooves GIG2 in the housing HS. As the support parts SUP move away from each other in the first direction DR1, the area of the display module DM exposed outside the housing HS may be increased in the first direction DR1.

When the display module DM is extended outside the housing HS, the support parts SUP may be arranged in the first direction DR1 and may support the display module DM in the vertical axis corresponding to the first direction DR1. In addition, as described above, the support parts SUP may support the display module DM in the horizontal axis corresponding to the second direction DR2. Accordingly, the support parts SUP may not only move the display module DM upward, but may also support the display module DM more flatly by supporting the display module DM in the horizontal axis and the vertical axis.

Referring to FIGS. 4 and 21, as the drive part DV rotates in the clockwise direction, the first gear GR1 may rotate in the clockwise direction. When the first gear GR1 rotates in the clockwise direction, the second gear GR2 and the rotating bar ROB may rotate in the counterclockwise direction. The crank CK may rotate in the counterclockwise direction by the rotating bar ROB.

While the crank CK rotates in the counterclockwise direction, the second drive belt DBT2 connected to the crank CK may move in the counterclockwise direction along the first guide groove GIG1. Furthermore, when the crank CK rotates in the counterclockwise direction, the first drive belt DBT1 may move in the first direction DR1 so as to be retracted into the housing HS along the guide grooves EOP. That is, the drive belt DBT may move in the first direction DR1 by the torque of the drive part DV.

The drive belt DBT may move the head bar HDB toward the housing HS in the first direction DR1 and may move the support parts SUP, which are connected to the head bar HDB, toward each other in the first direction DR1. Accordingly, the lifting part ELP may be retracted in the first direction DR1.

When the support parts SUP move toward each other in the first direction DR1, the display module DM may move in the counterclockwise direction along the second guide grooves GIG2 in the housing HS. As the support parts SUP move toward each other in the first direction DR1, the area of the display module DM exposed outside the housing HS may be decreased in the first direction DR1.

Figure 24:
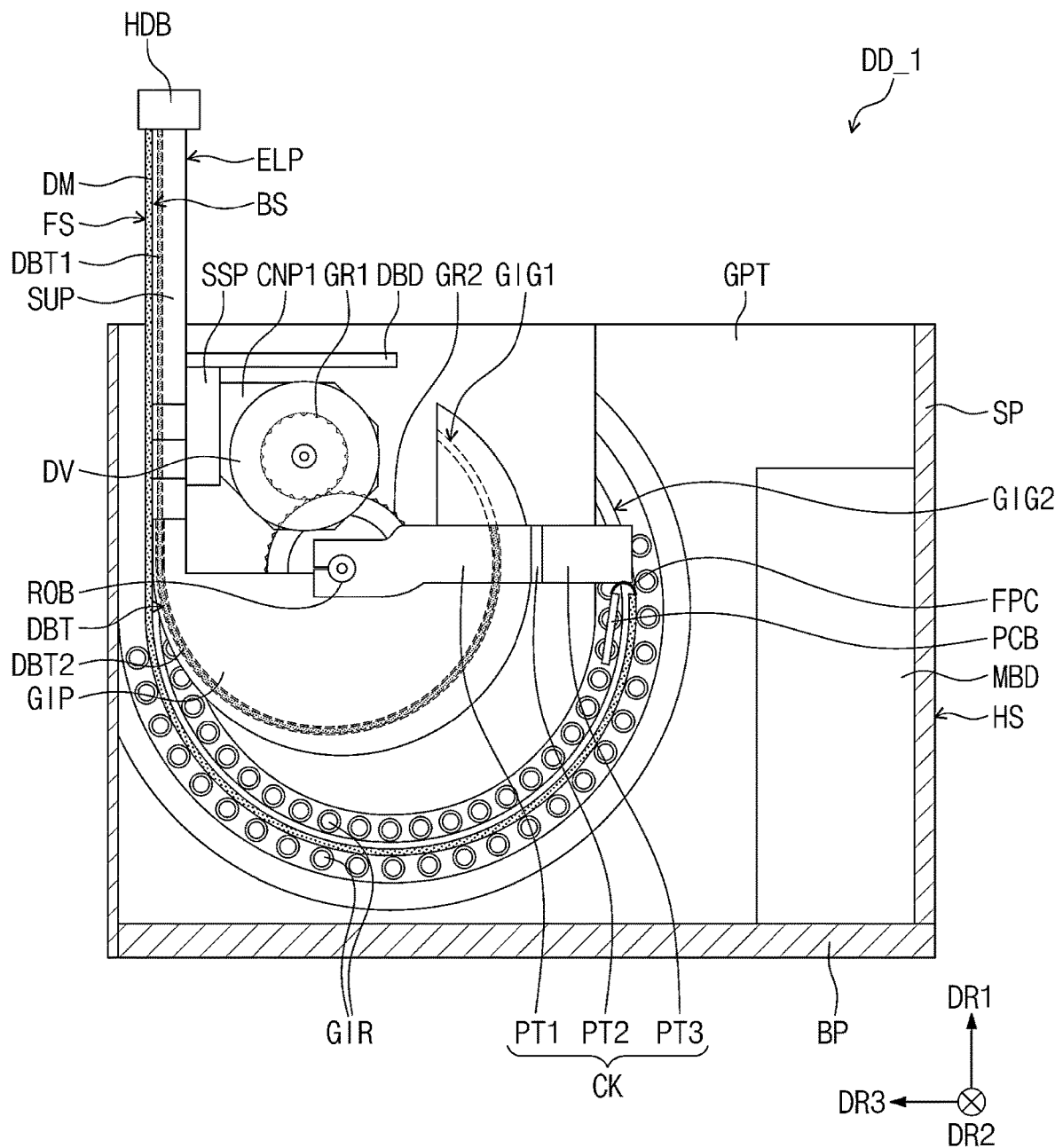
FIG. 24 is a view illustrating a display device according to another embodiment of the present disclosure.

FIG. 24 is a view illustrating a display device according to another embodiment of the present disclosure.

The side view of FIG. 24 corresponds to the side view of FIG. 21. Hereinafter, description of a configuration of the display device DD_1 illustrated in FIG. 24 will be focused on the difference from the structure illustrated in FIG. 21.

Referring to FIG. 24, one end (i.e., upper end) of a display module DM may be connected to a lifting part ELP, and a crank CK may extend toward an opposite end of the display module DM and may be connected to the opposite end of the display module DM. Specifically, unlike the configuration illustrated in FIG. 21, the crank CK in FIG. 24 may further include a third portion PT3. The third portion PT3 may be connected to a second portion PT2. The third portion PT3 may extend toward the opposite end of the display module DM and may be connected to the opposite end of the display module DM.

The third portion PT3 may be connected to a bent portion of a flexible circuit board FPC through an adhesive. However, without being limited thereto, the bent portion of the flexible circuit board FPC may be inserted into a depression defined on the third portion PT3, and the third portion PT3 may be connected to the flexible circuit board FPC accordingly. The third portion PT3 may be connected to the opposite end of the display module DM through the flexible circuit board FPC.

When the crank CK rotates to move a drive belt DBT, the crank CK may push, at the opposite end of the display module DM, the display module DM and may move the display module DM together with the drive belt DBT. Accordingly, the display module DM may more easily move along second guide grooves GIG2.

FIGS. 25 to 31 are views illustrating various embodiments of the lifting part.

Hereinafter, descriptions of configurations of lifting parts ELP_1 to ELP_7 illustrated in FIGS. 25 to 31 will be focused on the difference from the lifting part ELP illustrated in FIGS. 10 to 12. Furthermore, in FIGS. 25 to 31, cross roller bearings are illustrated on front sides of the lifting parts, and stoppers are omitted.

Figure 25A:
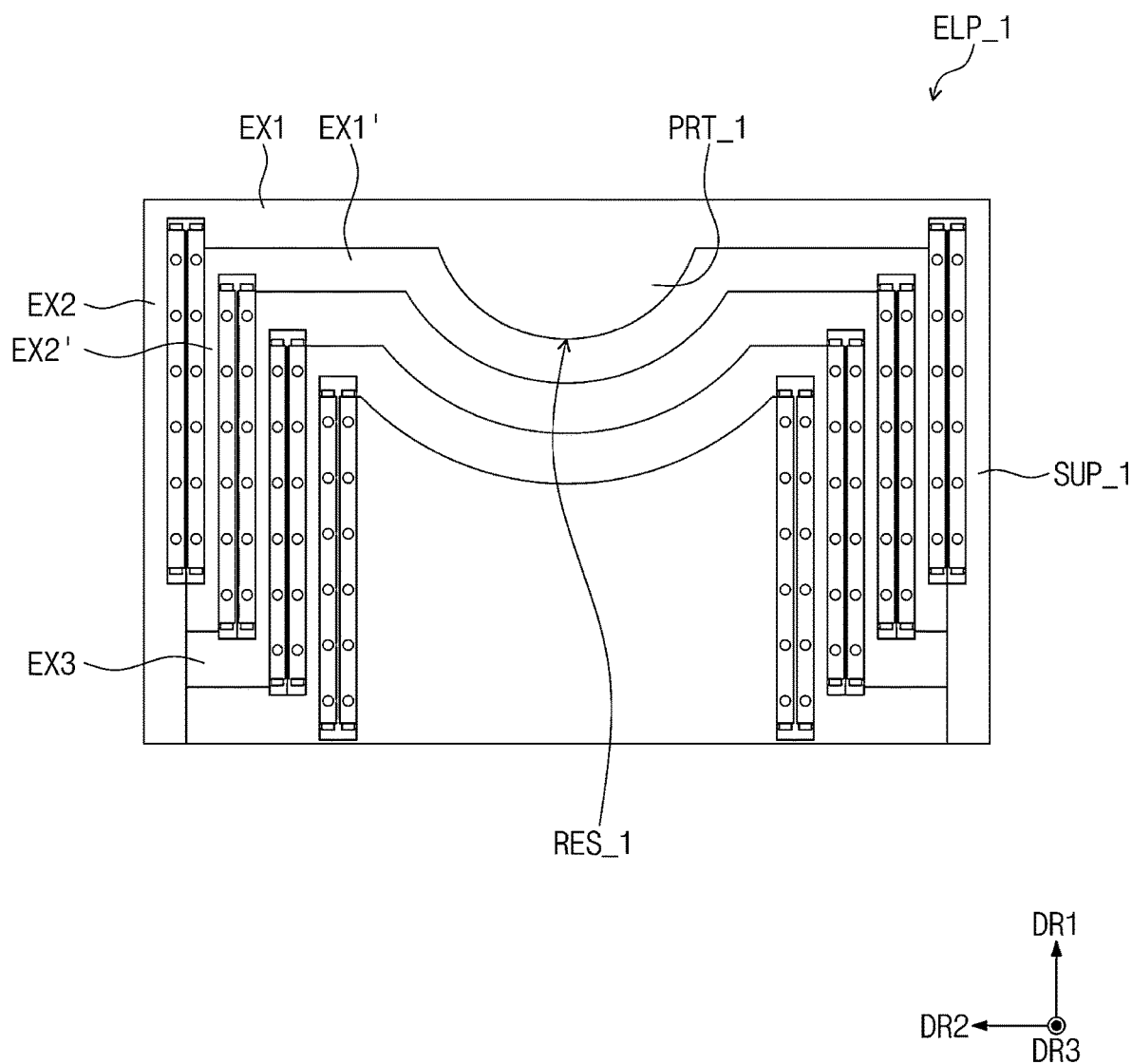
FIGS. 25A to 31C are views illustrating various embodiments of the lifting part.
Figure 25B:
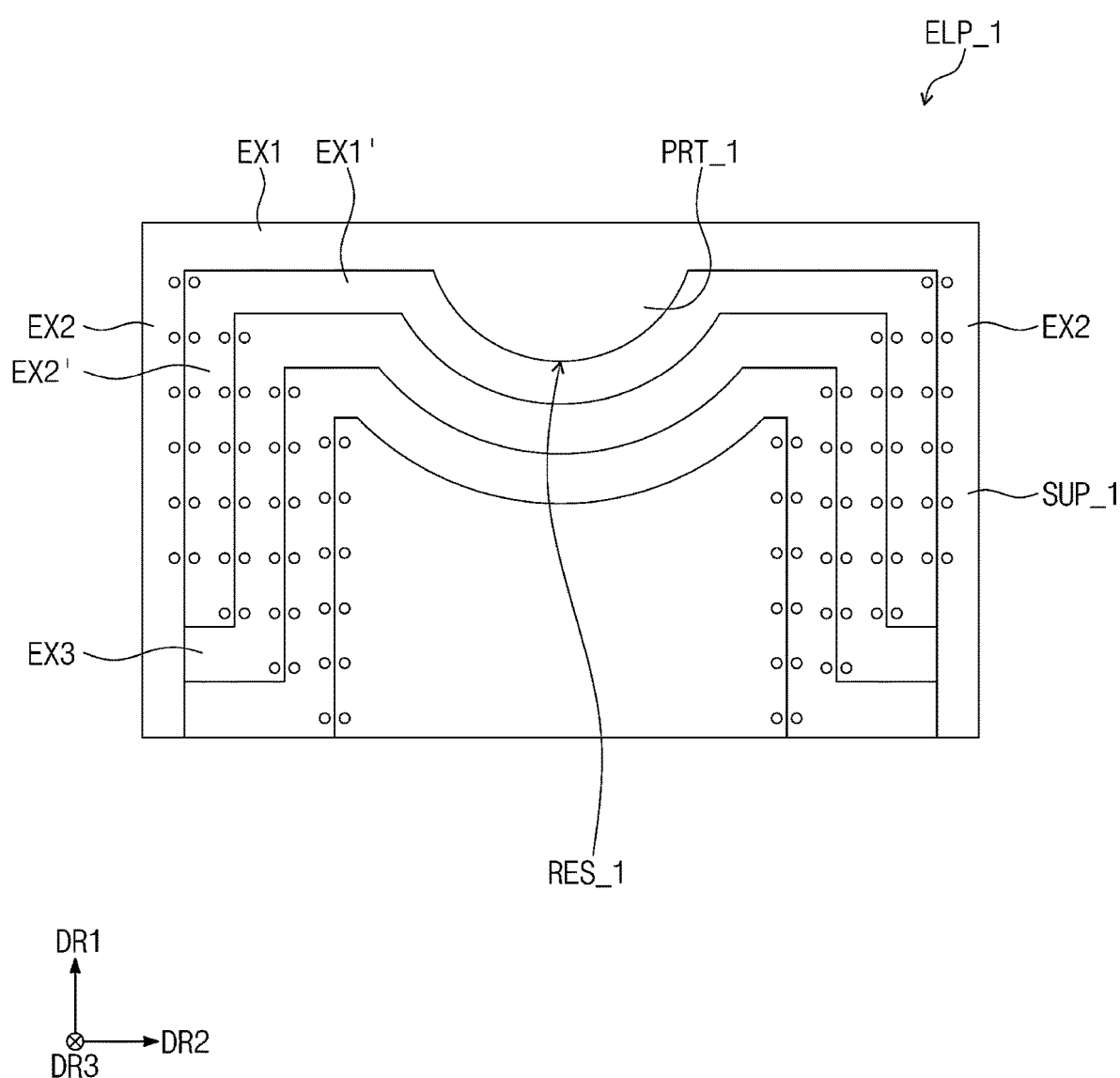
Figure 25C:
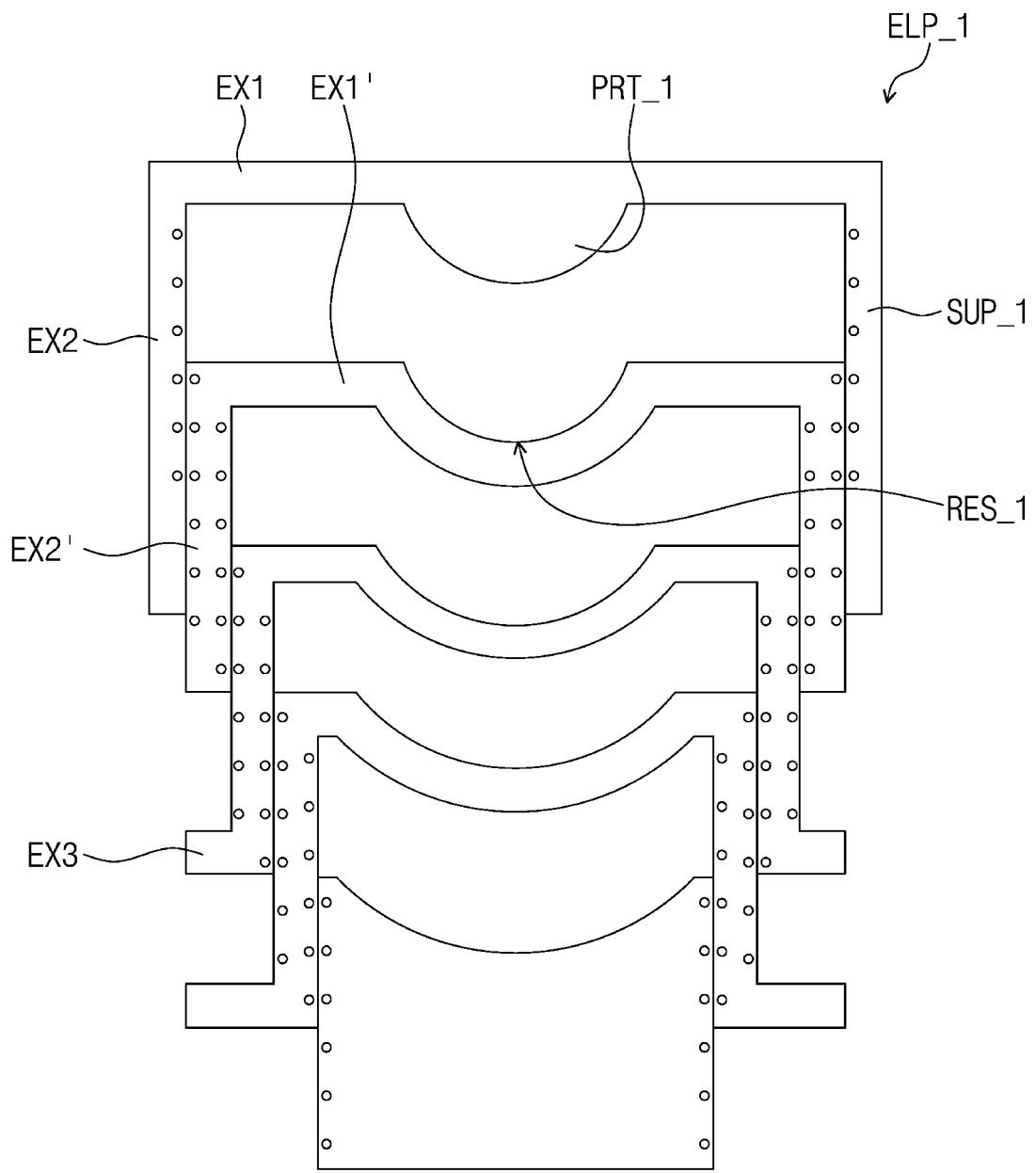

FIGS. 25A, 25B, and 25C are views illustrating a front side, a rear side, and an extended state of a lifting part according to another embodiment of the present disclosure.

Referring to FIGS. 25A, 25B, and 25C, the lifting part ELP_1 may include a plurality of support parts SUP_1 coupled to move relative to each other in the first direction DR1. Second extensions EX2 of the uppermost support part SUP_1 may extend in the first direction DR1 and may be disposed on opposite side surfaces of the remaining support parts SUP_1.

Specifically, the second extensions EX2 of the uppermost support part SUP_1 may be disposed on second extensions EX2' and third extensions EX3 of the other support parts SUP_1. The third extensions EX3 may extend in the second direction DR2 from opposite sides of some of the support parts SUP_1 and may be disposed under the second extensions EX2', respectively. When the lifting part ELP_1 is retracted to the minimum, the second extensions EX2 of the uppermost support part SUP_1 may make contact with the second extensions EX2' and the third extensions EX3.

Protrusions PRT_1 of the support parts SUP_1 may each have a curve convex downward. Depressions RES_1 of the support parts SUP_1 may each have a curved shape concave downward to accommodate the protrusion PRT_1.

Figure 26A:
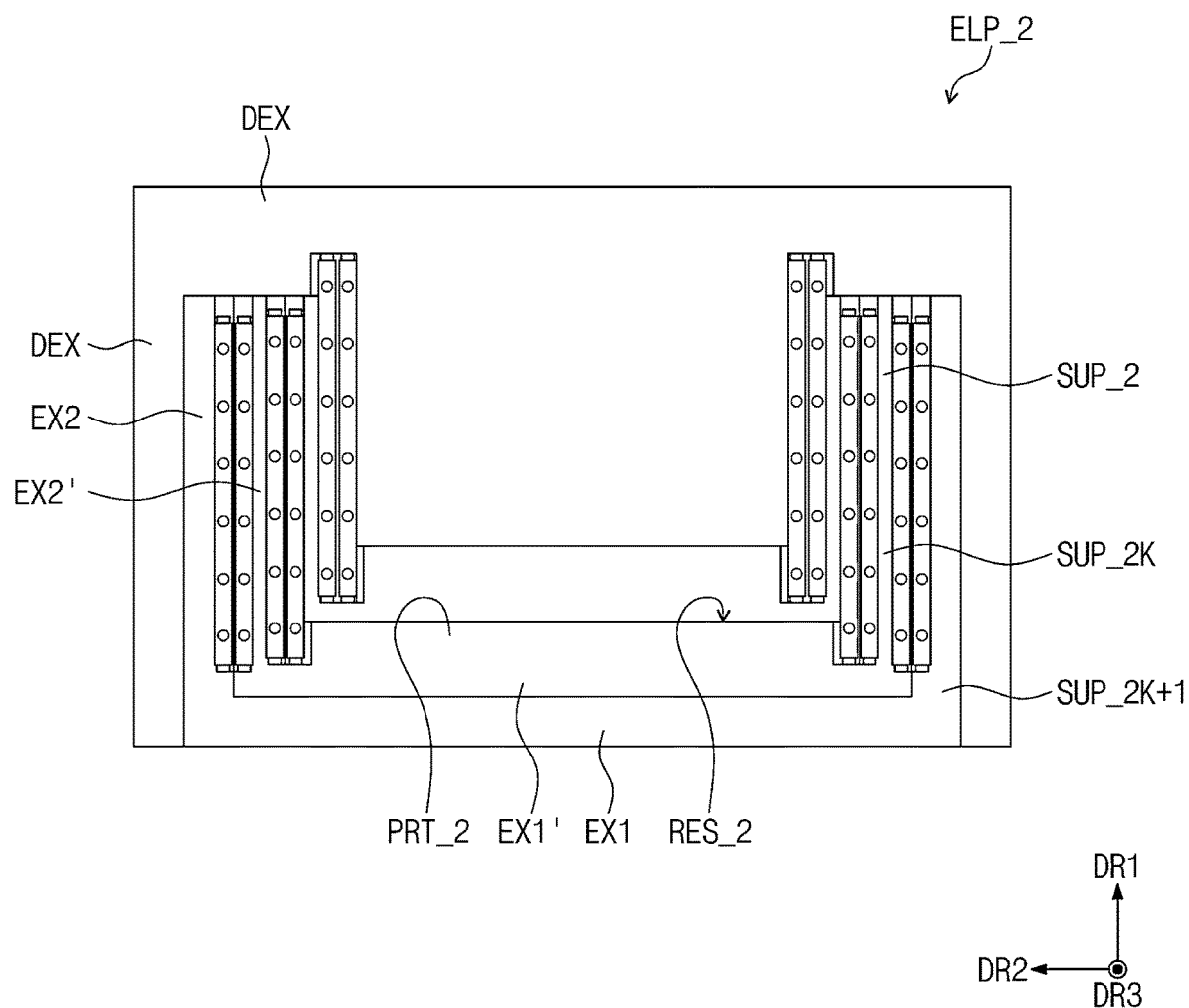
Figure 26B:
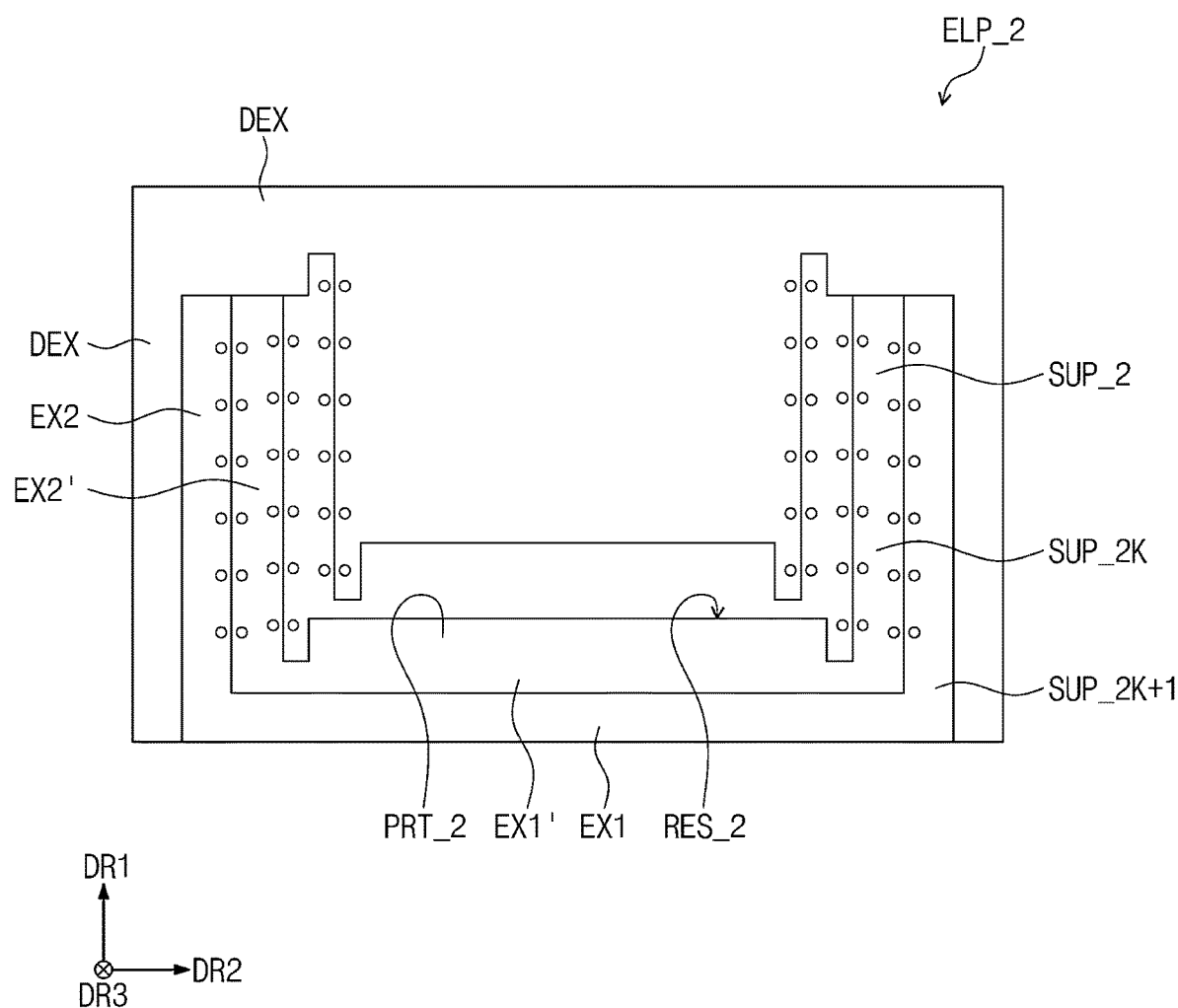
Figure 26C:
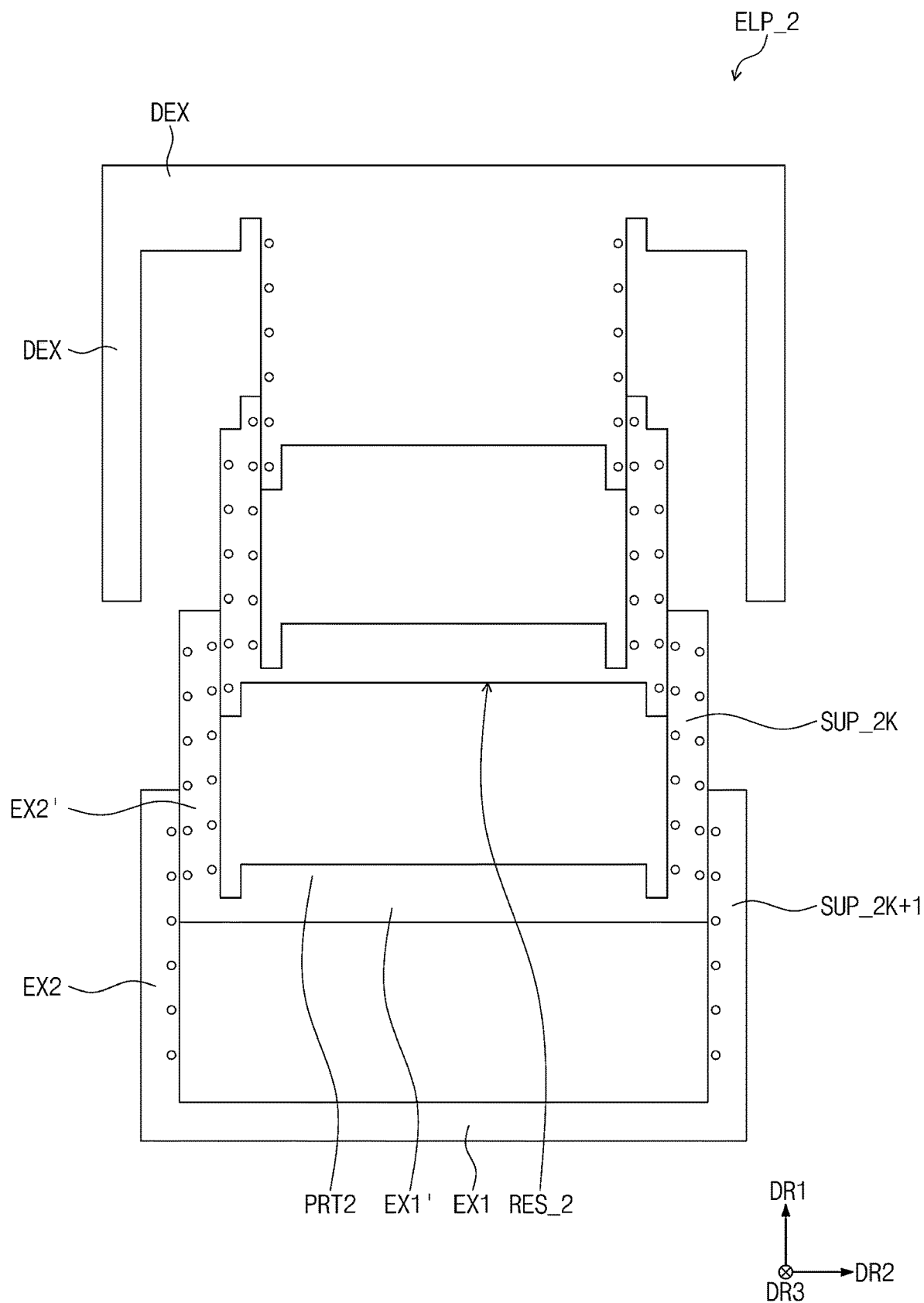

FIGS. 26A, 26B, and 26C are views illustrating a front side, a rear side, and an extended state of a lifting part according to still another embodiment of the present disclosure.

Referring to FIGS. 26A, 26B, and 26C, the lifting part ELP_2 may include a plurality of support parts SUP_2 coupled to move relative to each other in the first direction DR1. The lifting part ELP_2 may include dummy extensions DEX extending in the second direction DR2 and the first direction DR1, disposed over the uppermost support part SUP_2 and surrounding the uppermost support part SUP_2 in the second direction DR2.

Among the support parts SUP_2 other than the uppermost support part SUP_2, a $(k+1)^{th}$ support part SUP_2$k$+1 may include a first extension EX1 that is disposed under a $k^{th}$ support part SUP_2$k$ and that extends in the second direction DR2 and second extensions EX2 extending from the opposite ends of the first extension EX1 in the first direction DR1.

The second extensions EX2 may extend in the first direction DR1 and may be disposed on second extensions EX2' that define the opposite sides of the $k^{th}$ support part SUP_2$k$. The second extensions EX2 may be adjacent to the second extensions EX2' in the second direction DR2, respectively. The dummy extensions DEX may be disposed on the second extensions EX2 and the second extensions EX2' in the second direction DR2 and may be adjacent to the second extensions EX2 and the second extensions EX2'.

Among the support parts SUP_2 other than the lowermost support part SUP_2, two support parts SUP_2 adjacent to each other in the first direction DR1 may have a protrusion PRT_2 and a depression RES_2 defined thereon, respectively. The protrusion PRT_2 and the depression RES_2 may face each other in the first direction DR1.

Figure 27A:
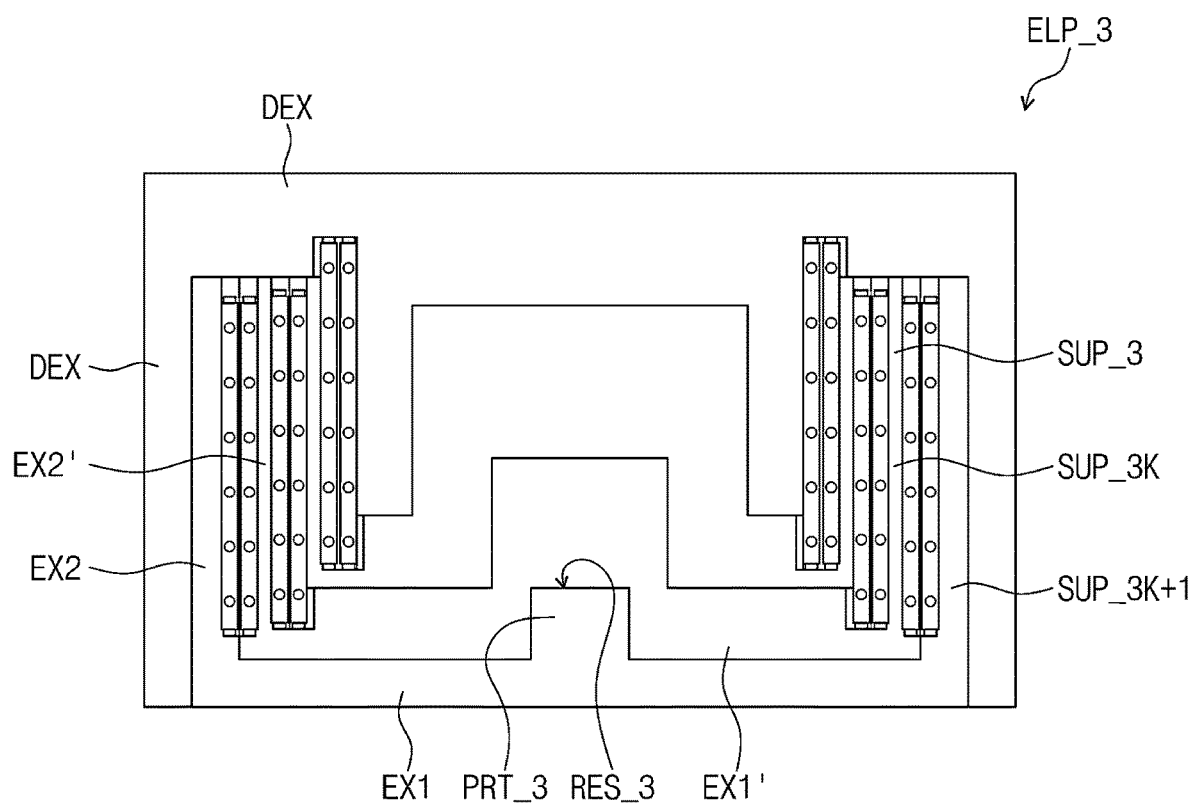
Figure 27A:
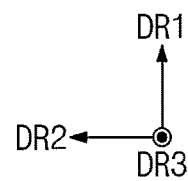
Figure 27B:
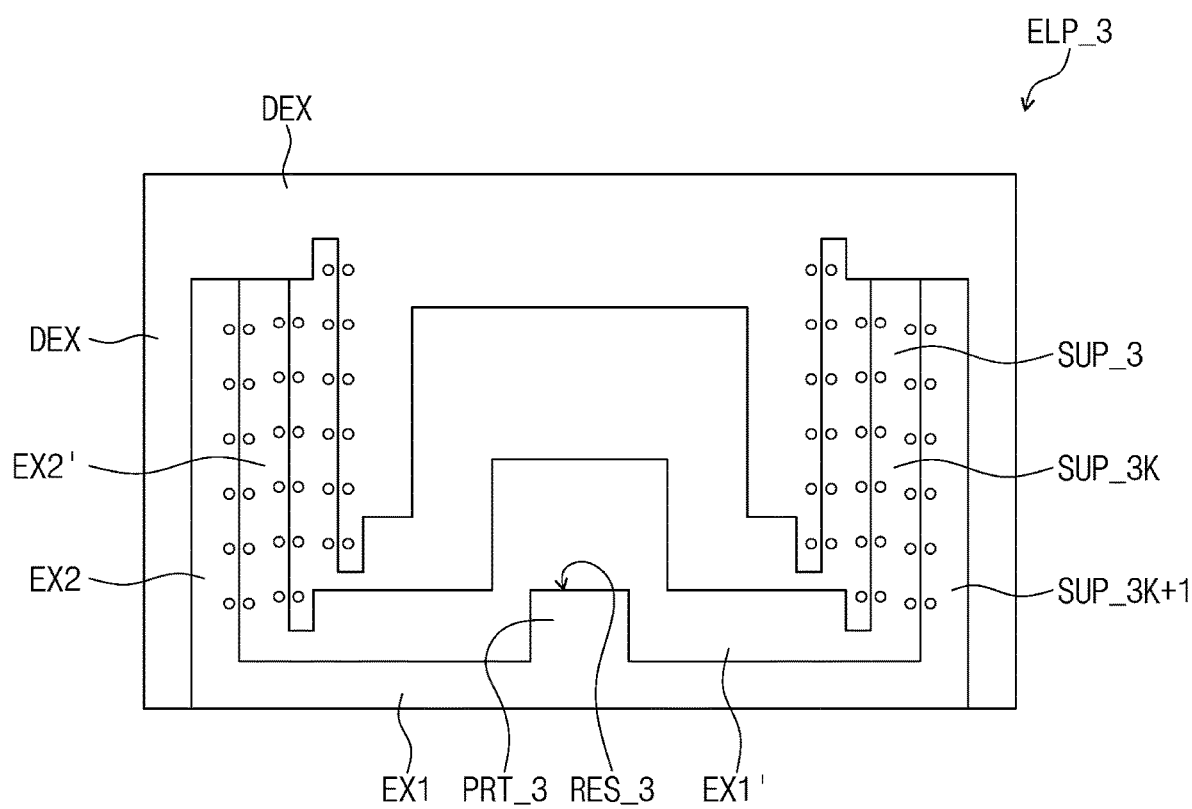
Figure 27C:
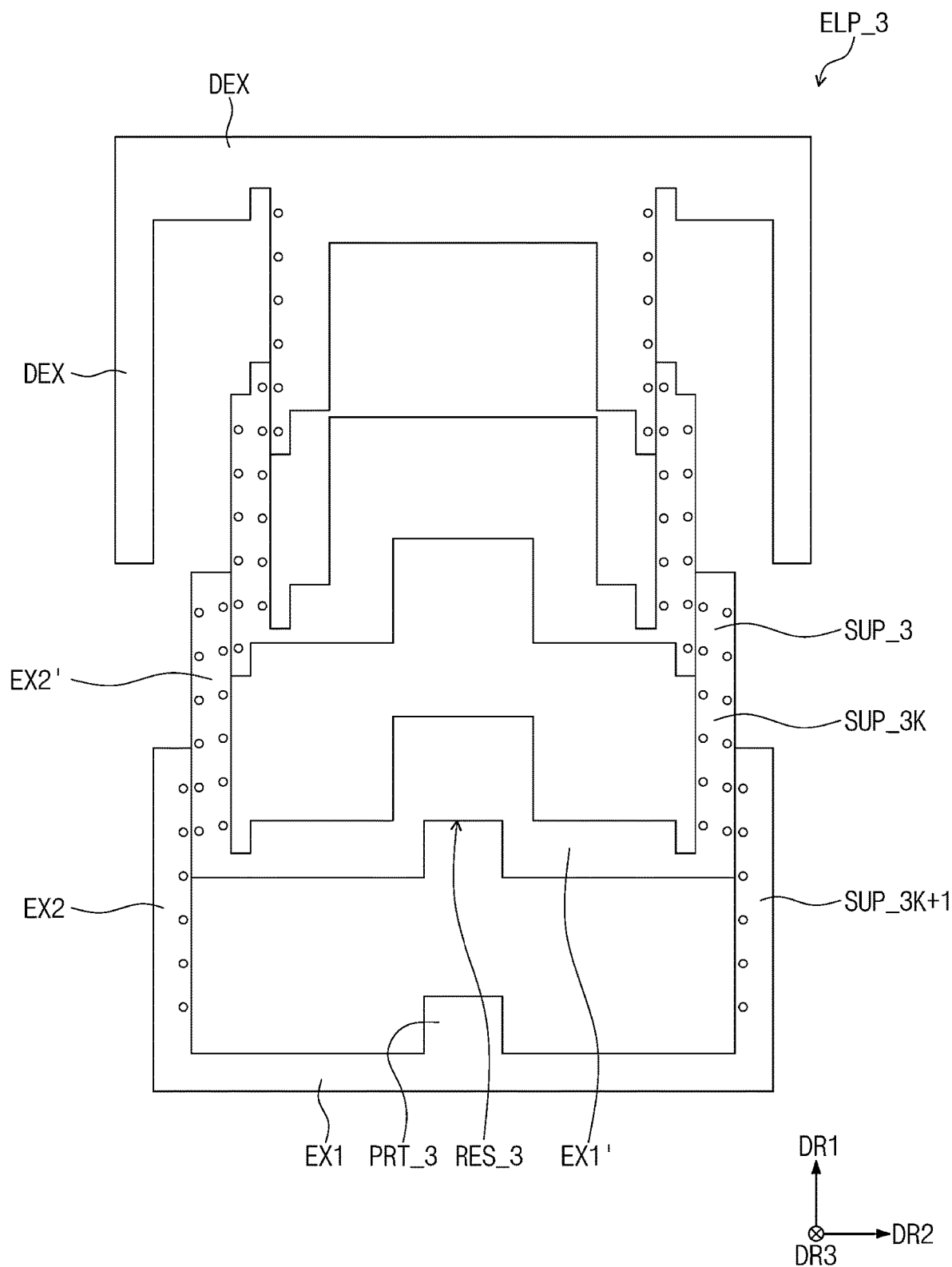

FIGS. 27A, 27B, and 27C are views illustrating a front side, a rear side, and an extended state of a lifting part according to yet another embodiment of the present disclosure.

Referring to FIGS. 27A, 27B, and 27C, the lifting part ELP_3 may include a plurality of support parts SUP_3 coupled to move relative to each other in the first direction DR1. The lifting part ELP_3 may include dummy extensions DEX extending in the second direction DR2 and the first direction DR1, disposed over the uppermost support part SUP_3 and surrounding the uppermost support part SUP_3 in the second direction DR2.

Among the support parts SUP_3 other than the uppermost support part SUP_3, a $(k+1)^{th}$ support part SUP_3$k$+1 may include a first extension EX1 extending in the second direction DR2 and second extensions EX2 extending from the opposite ends of the first extension EX1 in the first direction DR1. The second extensions EX2 may be disposed on second extensions EX2' that define the opposite sides of a $k^{th}$ support part SUP_3$k$. The dummy extensions DEX may be disposed on the second extensions EX2 and the second extensions EX2'.

Two support parts SUP_3 adjacent to each other in the first direction DR1 may have a protrusion PRT_3 and a depression RES_3 defined thereon, respectively. The protrusion PRT_3 and the depression RES_3 may face each other in the first direction DR1. The protrusion PRT_3 defined on the lowermost support part SUP_3 may have a step shape having one step, and the protrusions PRT_3 defined on the remaining support parts SUP_3 may have a step shape having at least two steps.

Figure 28A:
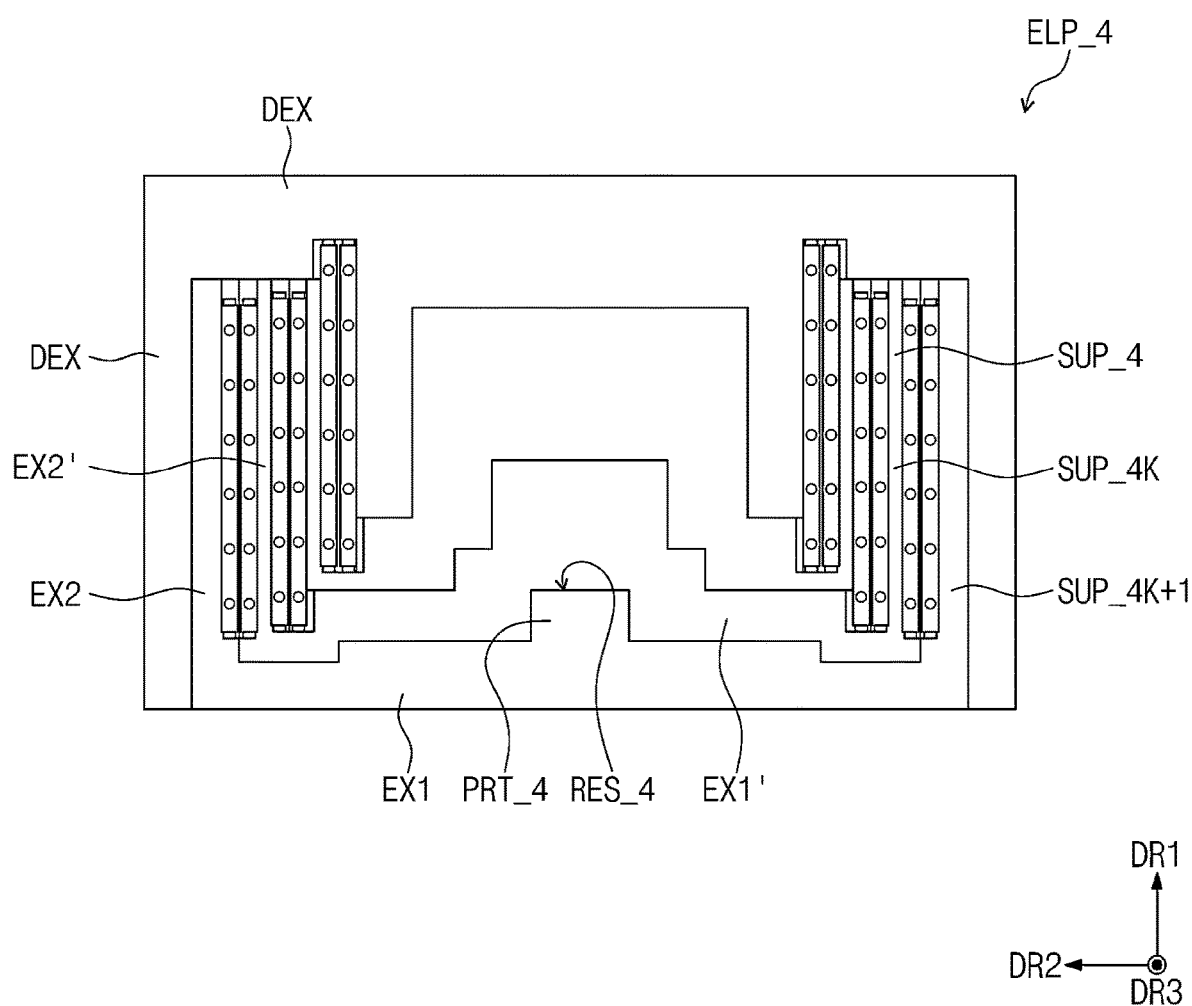
Figure 28B:
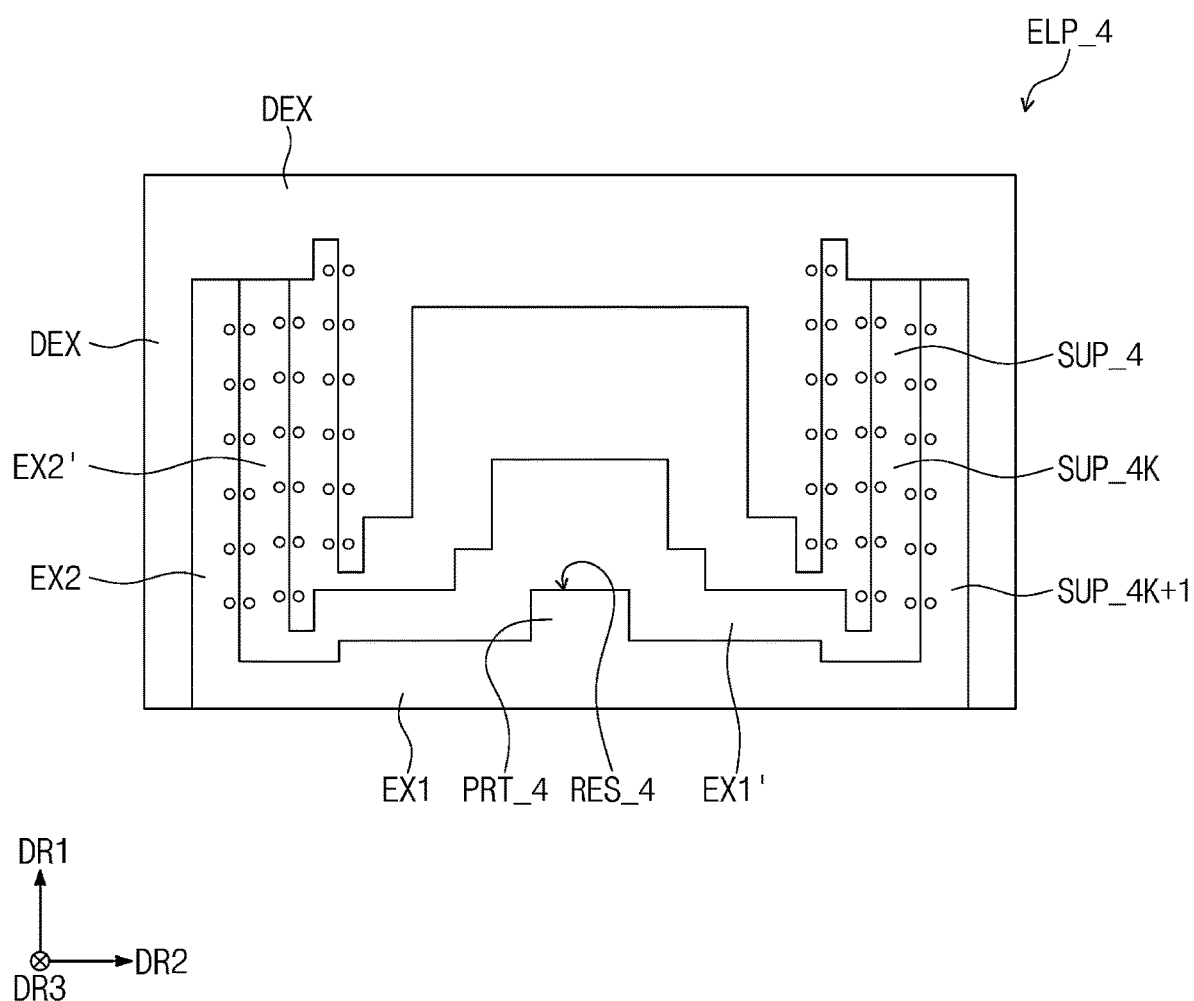
Figure 28C:
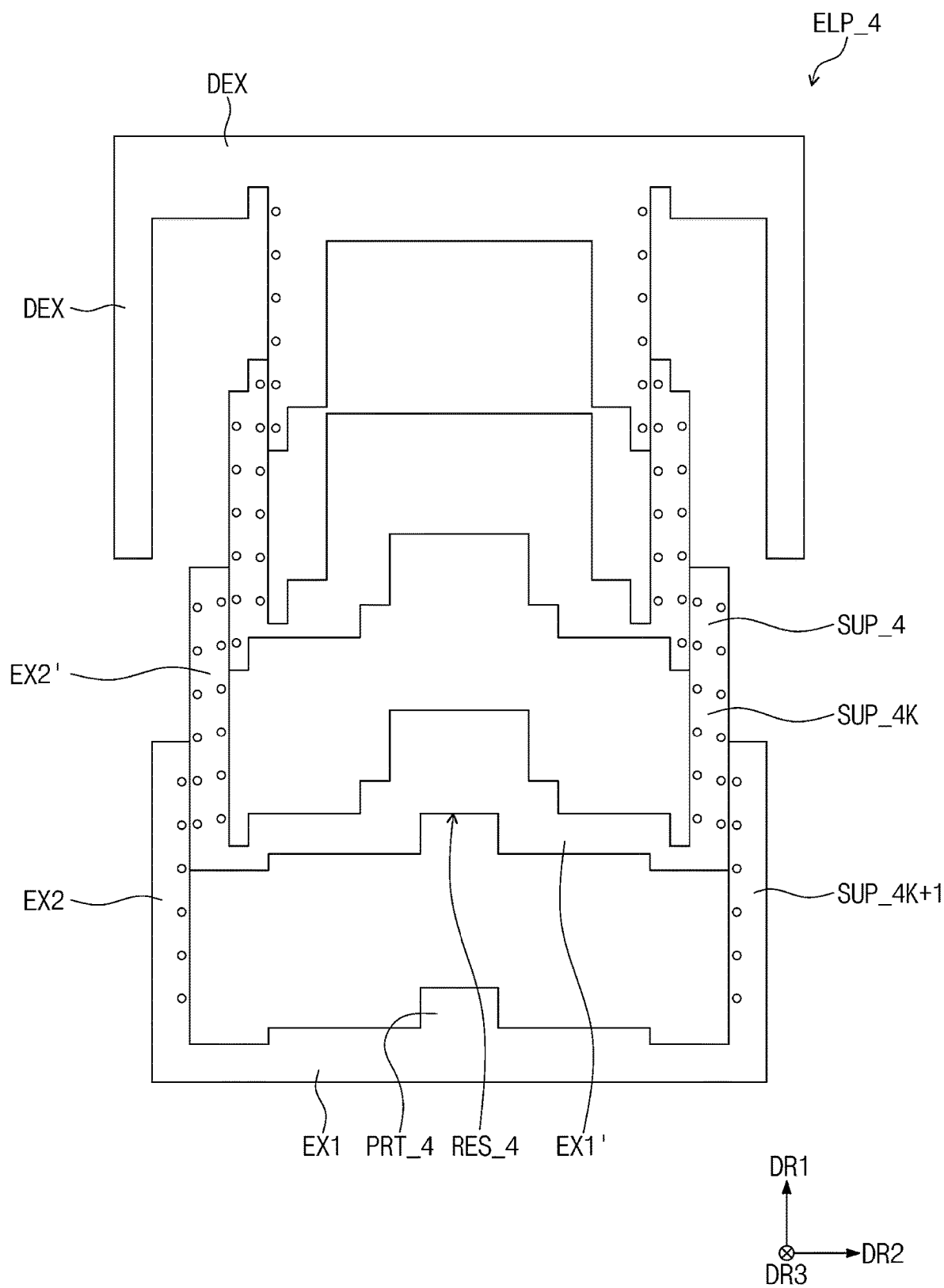

FIGS. 28A, 28B, and 28C are views illustrating a front side, a rear side, and an extended state of a lifting part according to another embodiment of the present disclosure.

Referring to FIGS. 28A, 28B, and 28C, the lifting part ELP 4 may include a plurality of support parts SUP_4 coupled to move relative to each other in the first direction DR1. The lifting part ELP_4 may include dummy extensions DEX extending in the second direction DR2 and the first direction DR1, disposed over the uppermost support part SUP_4 and surrounding the uppermost support part SUP_4 in the second direction DR2.

Among the support parts SUP_4 other than the uppermost support part SUP_4, a $(k+1)^{th}$ support part SUP_4$k$+1 may include a first extension EX1 extending in the second direction DR2 and second extensions EX2 extending from the first extension EX1 in the first direction DR1. The second extensions EX2 may be disposed on second extensions EX2'. The dummy extensions DEX may be disposed on the second extensions EX2 and the second extensions EX2'.

Two support parts SUP_4 adjacent to each other in the first direction DR1 may have a protrusion PRT_4 and a depression RES_4 defined thereon, respectively. The protrusion PRT_4 and the depression RES_4 may face each other in the first direction DR1. The protrusions PRT_4 defined on the support parts SUP_4 may have a step shape having at least two steps.

Figure 29A:
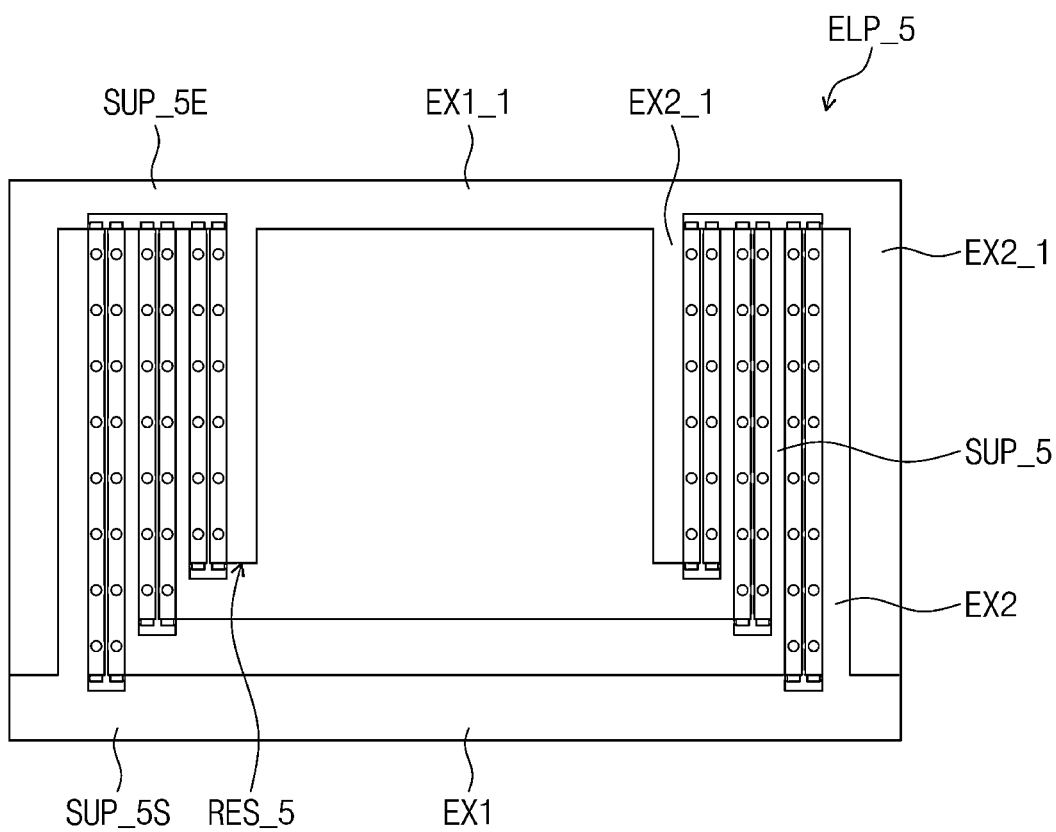
Figure 29B:
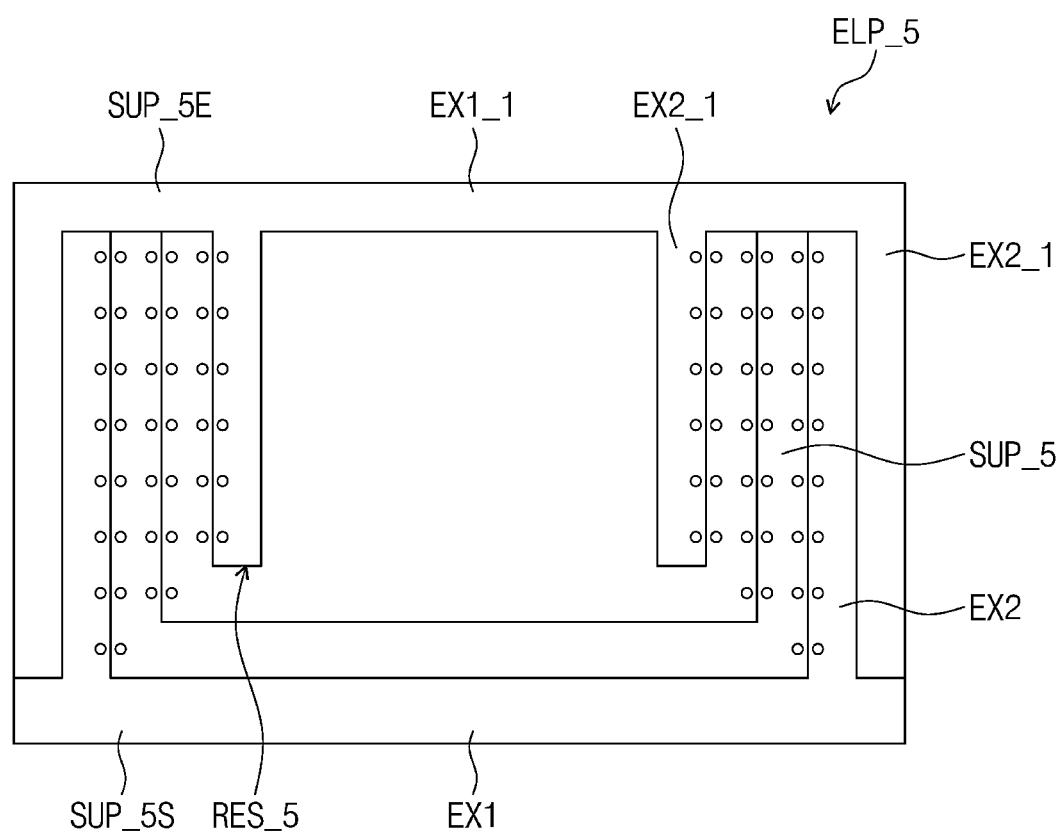
Figure 29C:
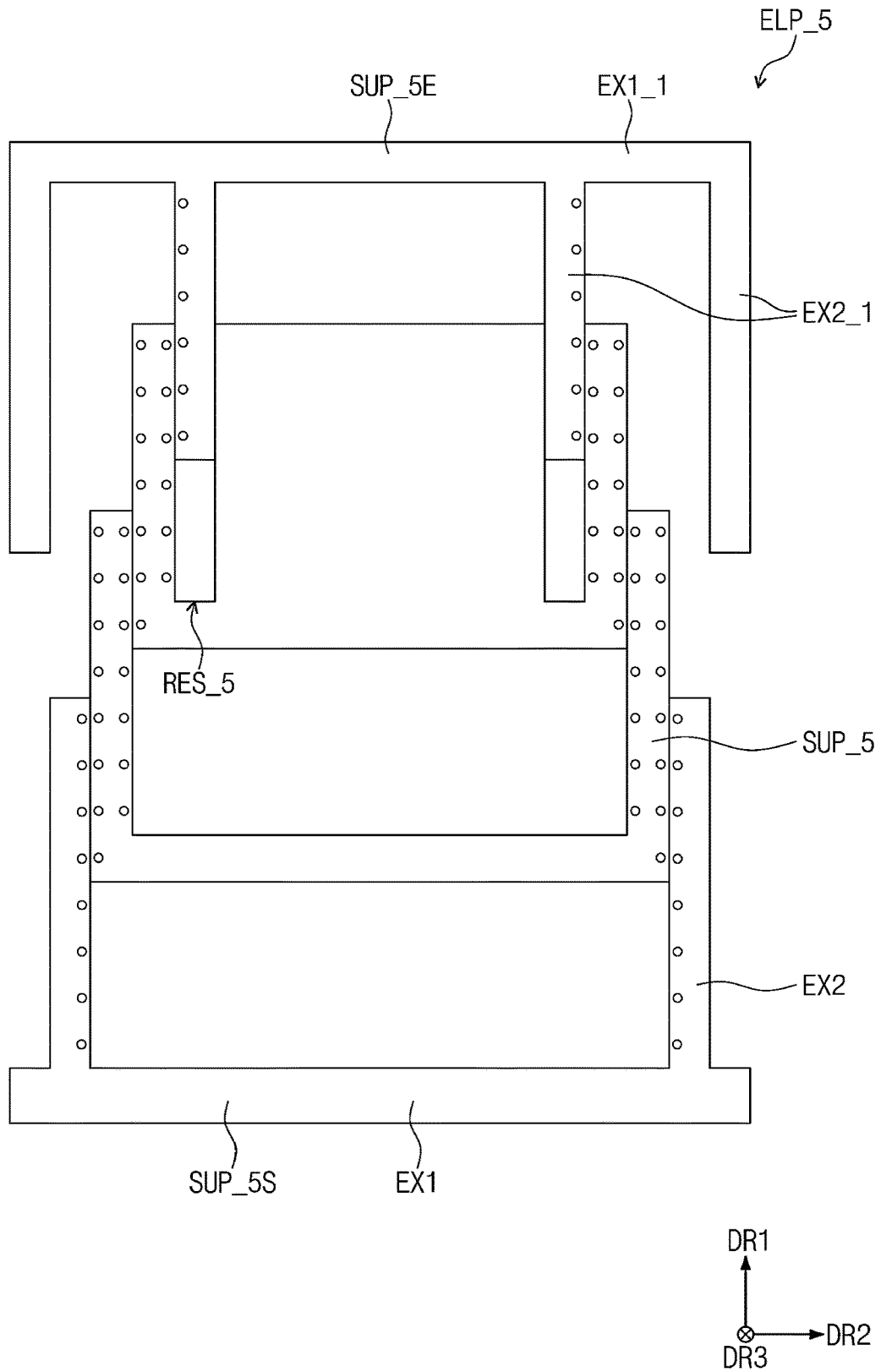

FIGS. 29A, 29B, and 29C are views illustrating a front side, a rear side, and an extended state of a lifting part according to still another embodiment of the present disclosure.

Referring to FIGS. 29A, 29B, and 29C, the lifting part ELP_5 may include a plurality of support parts SUP_5 coupled to move relative to each other in the first direction DR1. A first support part SUP_5S may include a first extension EX1 extending in the second direction DR2 and a plurality of second extensions EX2 that extend in the first direction DR1 from the first extension EX1 and that are spaced apart from each other in the second direction DR2. A last support part SUP_5E may include a first_first extension EX1_1 extending in the second direction DR2 and a plurality of second_first extensions EX2_1 that extend in the first direction DR1 from the first_first extension EX1_1 and that are spaced apart from each other in the second direction DR2. Exemplarily, the first support part SUP_5S may be the lowermost support part, and the last support part SUP_5E may be the uppermost support part.

At least one support part SUP_5 may be disposed between the second extensions EX2, and at least one extension EX2_1 may be inserted into at least one depression RES_5 defined on at least one other support part SUP_5. Exemplarily, one support part SUP_5 may be disposed between two second extensions EX2, and two second_first extensions EX2_1 may be disposed in two depressions RES_5 defined on the one support part SUP_5.

Figure 30A:
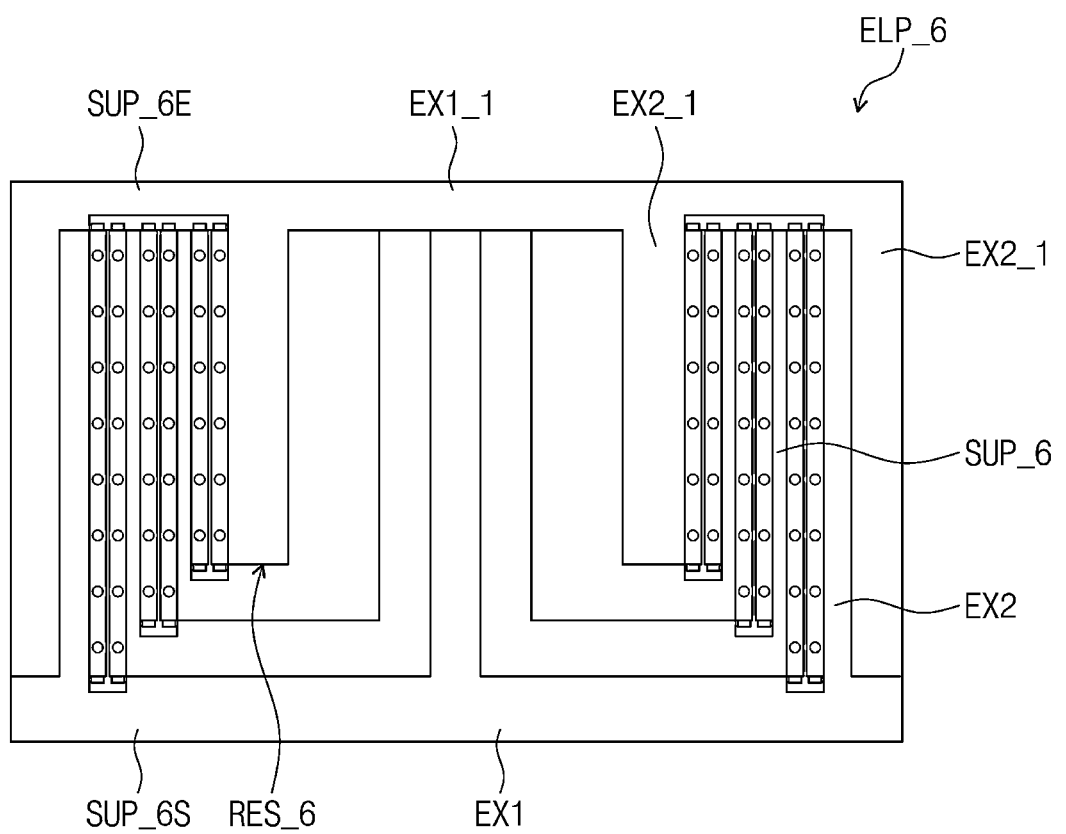
Figure 30B:
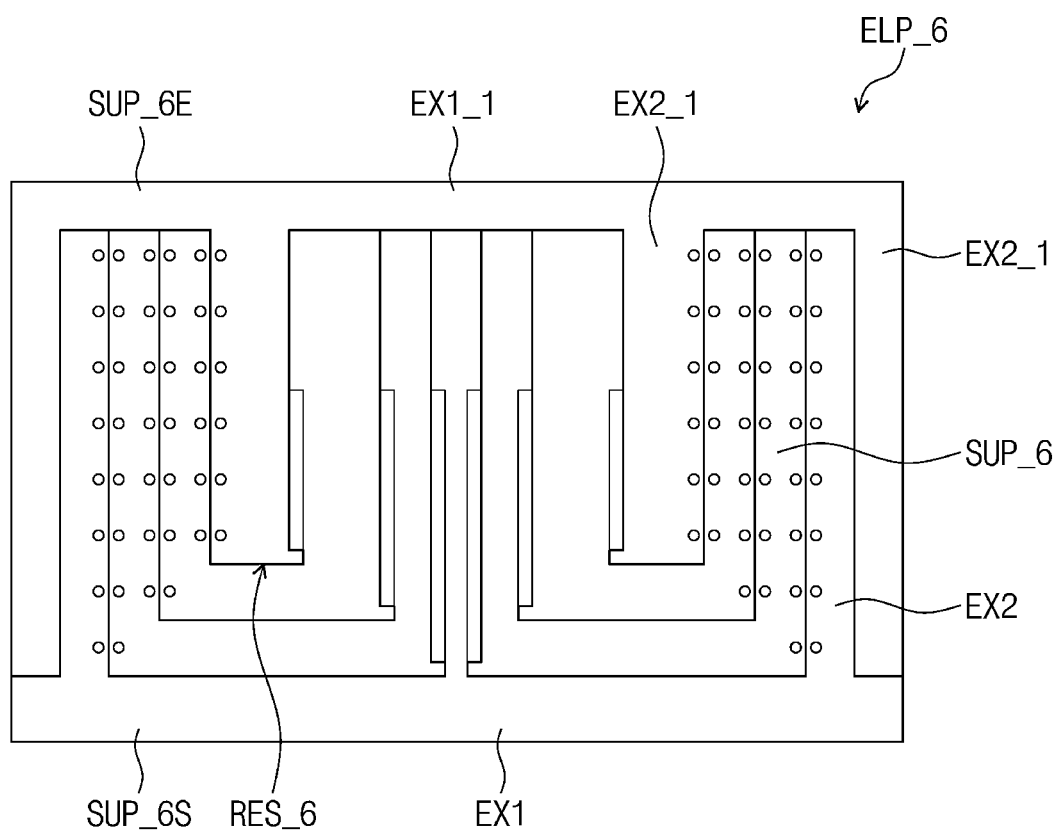
Figure 30C:
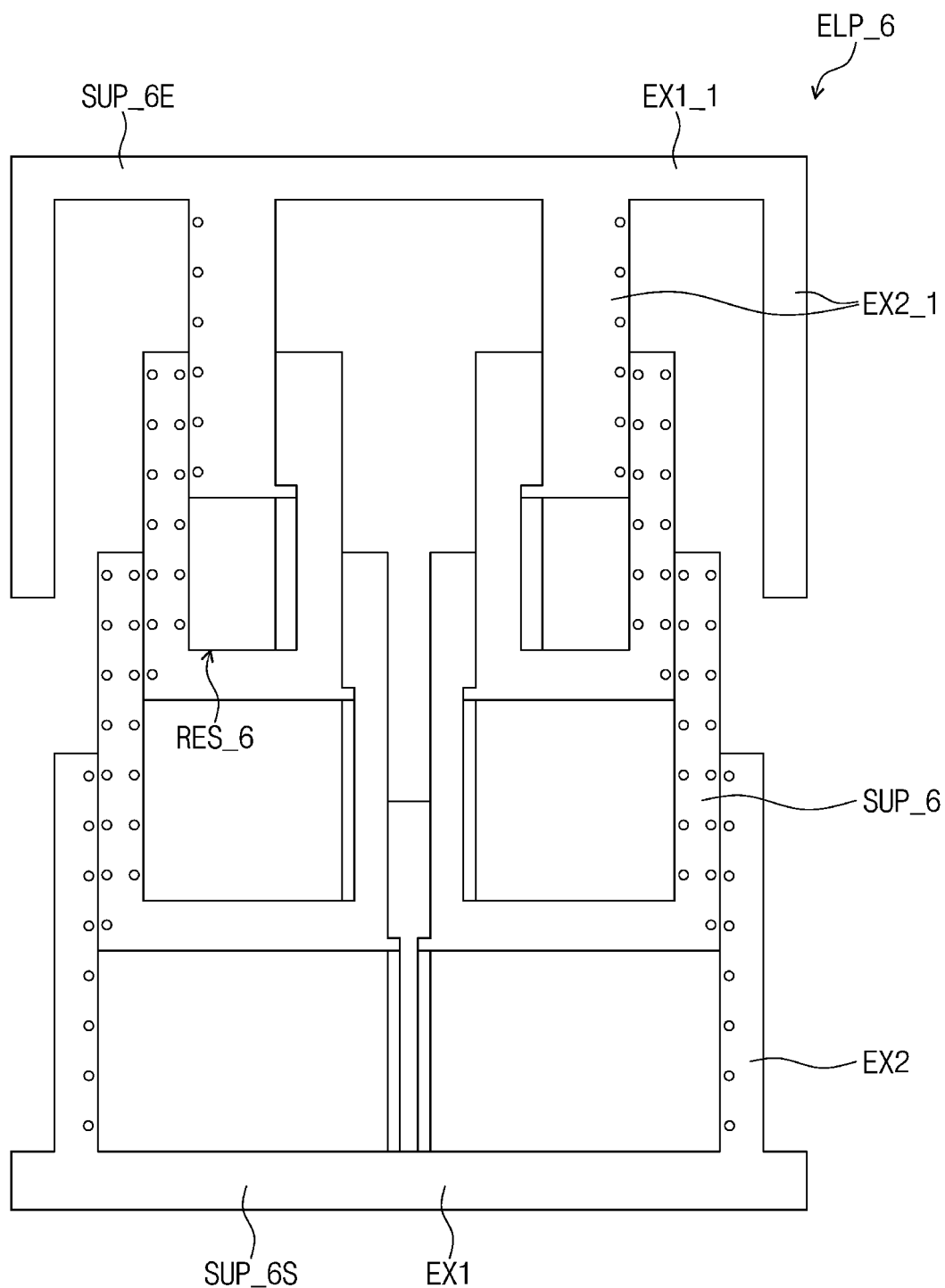

FIGS. 30A, 30B, and 30C are views illustrating a front side, a rear side, and an extended state of a lifting part according to yet another embodiment of the present disclosure.

Referring to FIGS. 30A, 30B, and 30C, the lifting part ELP_6 may include a plurality of support parts SUP_6 coupled to move relative to each other in the first direction DR1. A first support part SUP_6S may include a first extension EX1 extending in the second direction DR2 and a plurality of second extensions EX2 extending in the first direction DR1 from the first extension EX1. A last support part SUP_6E may include a first_first extension EX1_1 extending in the second direction DR2 and a plurality of second_first extensions EX2_1 extending in the first direction DR1 from the first_first extension EX1_1. The first support part SUP_6S may be the lowermost support part, and the last support part SUP_6E may be the uppermost support part.

At least one support part SUP_6 may be disposed between the second extensions EX2, and at least one extension 2_1 EX2_1 may be inserted into at least one depression RES_6 defined on at least one other support part SUP_6. Exemplarily, two support part SUP_6 may be disposed between three second extensions EX2, and two second_first extensions EX2_1 may be disposed in two depressions RES_6 defined on the two support part SUP_6.

Figure 31A:
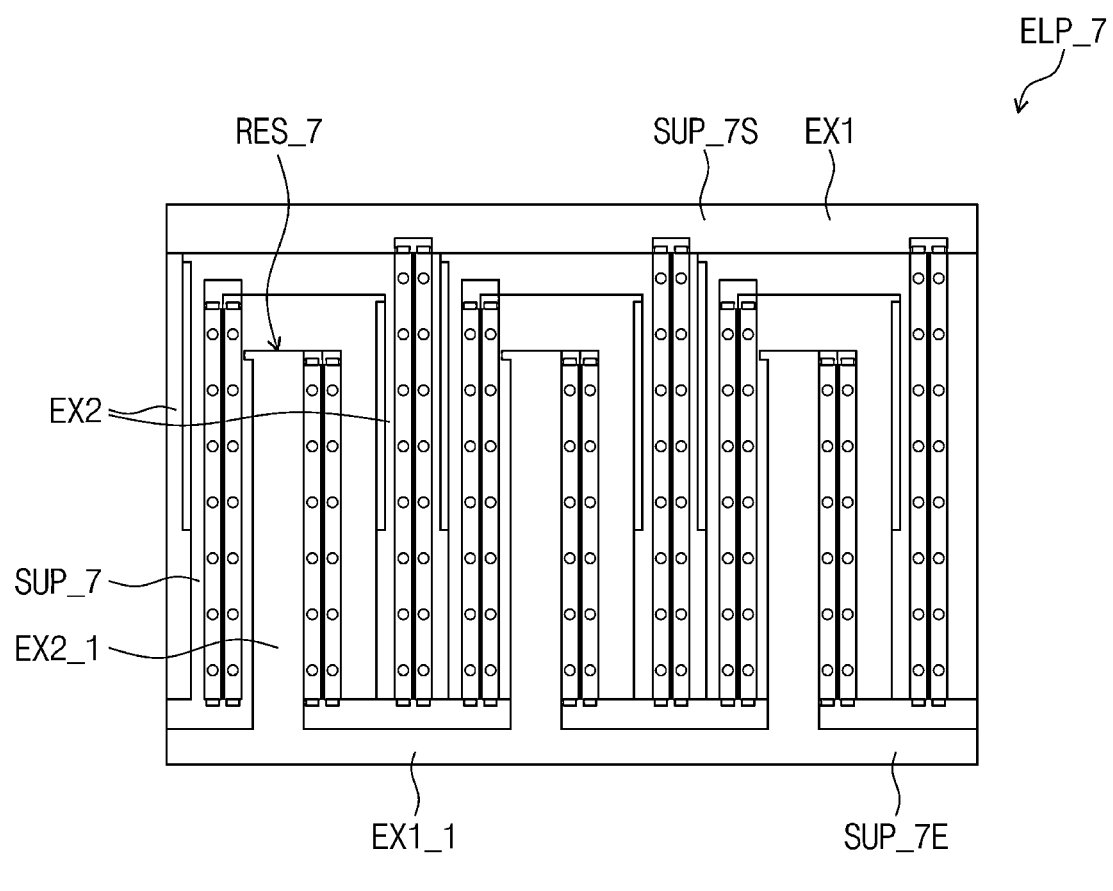
Figure 31A:
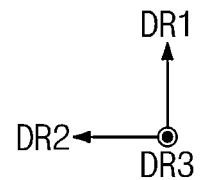
Figure 31B:
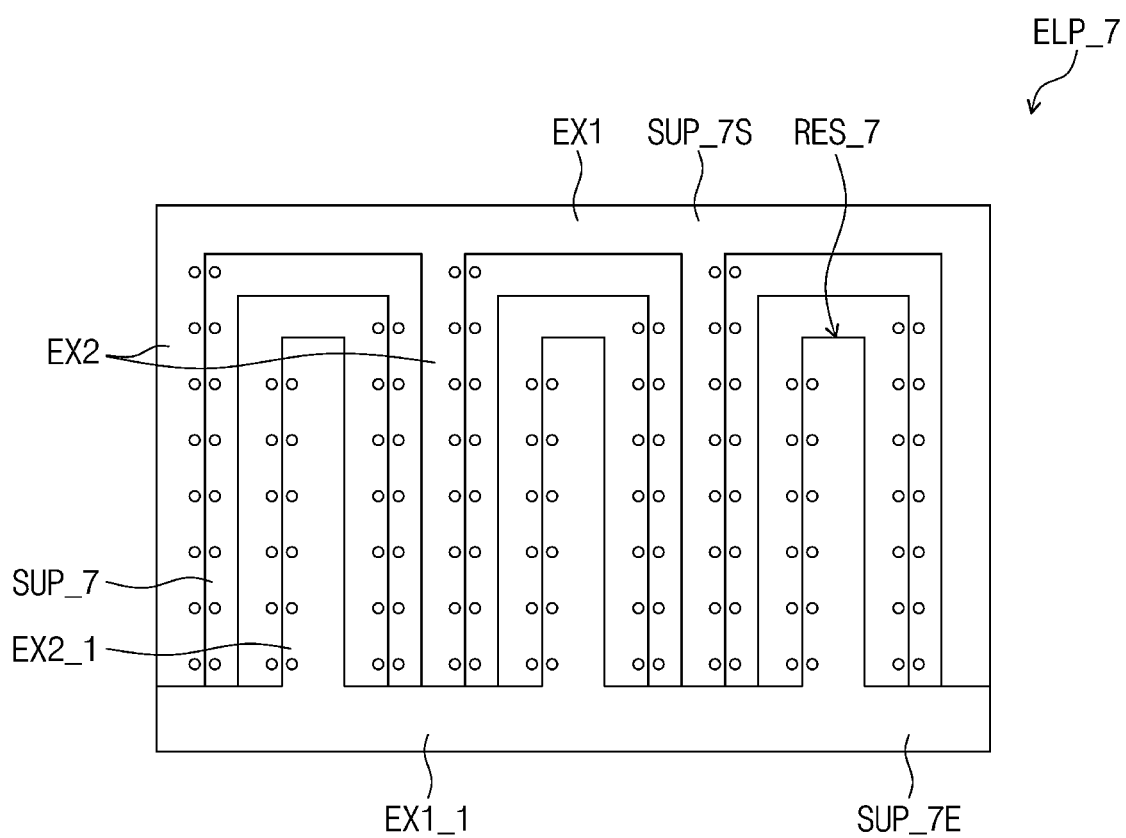
Figure 31C:
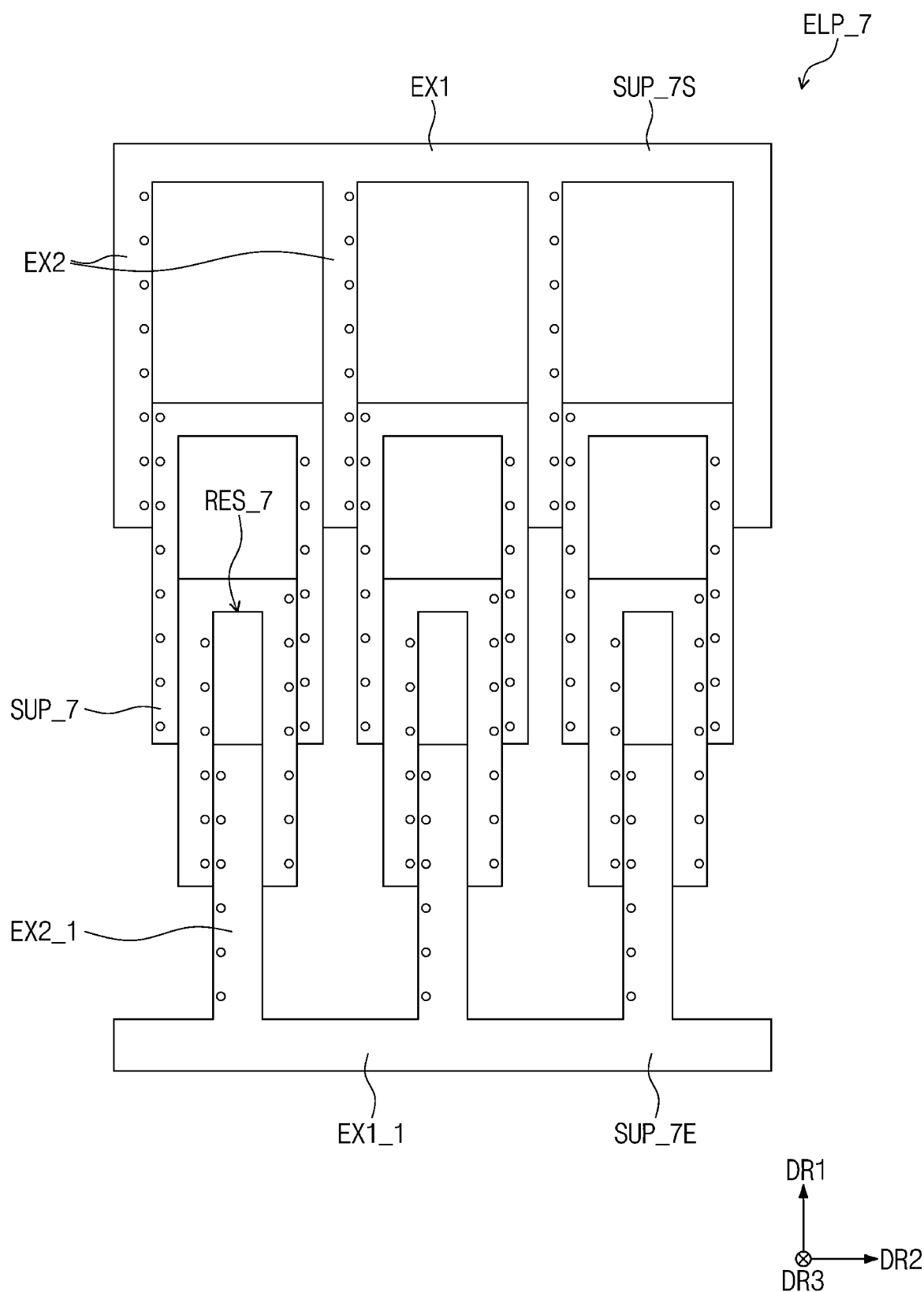

FIGS. 31A, 31B, and 31C are views illustrating a front side, a rear side, and an extended state of a lifting part according to another embodiment of the present disclosure.

Referring to FIGS. 31A, 31B, and 31C, the lifting part ELP_7 may include a plurality of support parts SUP_7 coupled to move relative to each other in the first direction DR1. A first support part SUP_7S may include a first extension EX1 extending in the second direction DR2 and a plurality of second extensions EX2 extending in the first direction DR1 from the first extension EX1. A last support part SUP_7E may include a first_first extension EX1_1 extending in the second direction DR2 and a plurality of second_first extensions EX2_1 extending in the first direction DR1 from the first_first extension EX1_1. The first support part SUP_7S may be the uppermost support part, and the last support part SUP_7E may be the lowermost support part.

At least one support part SUP_7 may be disposed between the second extensions EX2, and at least one extension 2_1 EX2_1 may be inserted into at least one depression RES_7 defined on at least one other support part SUP_7. Exemplarily, three support part SUP_7 may be disposed between four second extensions EX2, and three second_first extensions EX2_1 may be disposed in three depressions RES_7 defined on the three support part SUP_7.

According to the embodiments of the present disclosure, the plurality of support parts may be disposed on the rear surface of the display module and may move in the first direction to extend the display module to the outside of the housing. The support parts may extend from the one side of the display module to the other side of the display module in the second direction and may be disposed on the rear surface of the display module. In this case, the support parts may support the display module extended outside the housing in the horizontal axis corresponding to the second direction, thereby supporting the display module more flatly.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
   a display module;
   a lifting part disposed on a rear surface of the display module and connected to the display module; and
   a drive belt connected to the lifting part and which moves in a first direction to extend and retract the lifting part in the first direction,
   wherein the drive belt is deformable in a curved shape and moves along a guide groove defined in the lifting part,
   the guide groove is open in the first direction,
   the lifting part includes a plurality of support parts arranged in the first direction and coupled to move relative to each other in the first direction, and
   the drive belt is connected to an uppermost support part among the plurality of support parts and is disposed in the guide groove defined in each of the plurality of support parts except for the uppermost support part.

2. The display device of claim 1, wherein
   wherein at least one support part among the plurality of support parts extends between a first side and a second side of the display module, and
   wherein the first side and the second side are opposite to each other in a second direction crossing the first direction.

3. The display device of claim 2, wherein a $k^{th}$ support part among the plurality of support parts is disposed on an upper end and at least a part of two end sides of the $(k+1)^{th}$ support part among the plurality of support parts,
   the two end sides are opposite to each other in the second direction,
   a total number of the support parts is greater than 2, and
   k is a natural number.

4. The display device of claim 3, wherein the $k^{th}$ support part includes:
   a first extension disposed on the $(k+1)^{th}$ support part, and which extends in the second direction; and
   second extensions which extend from the first extension in the first direction, and are adjacent to the at least a part of the two end sides of the $(k+1)^{th}$ support part in the second direction, respectively.

5. The display device of claim 4, wherein the second extensions are coupled with the at least a part of the two end sides of the $(k+1)^{th}$ support part so as to move in the first direction.

6. The display device of claim 4, further comprising:
   cross roller bearings disposed on the second extensions and the at least a part of the two end sides of the $(k+1)^{th}$ support part and coupled to move in the first direction.

7. The display device of claim 4, further comprising:
   first stoppers extending from the second extensions toward the at least a part of the two end sides of the $(k+1)^{th}$ support part, respectively; and
   second stoppers defined on the at least a part of the two end sides of the $(k+1)^{th}$ support part and disposed on the first stoppers in the first direction, respectively.

8. The display device of claim 4, further comprising:
   third extensions extending from the at least a part of the two end sides of the $(k+1)^{th}$ support part in the second direction, respectively, and disposed under the second extensions.

9. The display device of claim 4, wherein the $k^{th}$ support part further includes a protrusion protruding from a portion of the first extension toward the $(k+1)^{th}$ support part, and
   wherein the protrusion is disposed in a depression defined in the upper end of the $(k+1)^{th}$ support part.

10. The display device of claim 2, further comprising:
    a drive part connected to the drive belt and which moves the drive belt in the first direction.

11. The display device of claim 10, wherein the drive belt includes:
    a first drive belt disposed in the guide groove and which moves in the first direction; and
    a second drive belt disposed outside the lifting part and connected to the drive part.

12. The display device of claim 11, further comprising:
    a guide part having a first guide groove defined therein in which the second drive belt is disposed; and
    a crank connected to the drive part, wherein the crank is disposed in the first guide groove and connected to the second drive belt,
    wherein the first guide groove has a curved shape when viewed in the second direction, and the drive part rotates about an axis of rotation parallel to the second direction.

13. The display device of claim 12, further comprising:
    a guide plate having a second guide groove defined thereon; and
    a plurality of guide rollers adjacent to the second guide groove,
    wherein the second guide groove has a curved shape when viewed in the second direction, and a portion of the display module disposed outside the lifting part moves along the second guide groove.

14. The display device of claim 12, further comprising:
a first gear connected to the drive part and which rotates about the axis of rotation;
a second gear engaged with the first gear; and
a rotating bar connected to the second gear and extending in the second direction,
wherein the crank is spaced apart from the second gear and connected to the rotating bar.

15. The display device of claim 12, wherein an upper end of the display module is connected to the lifting part, and the crank extends toward a lower end of the display module and is connected to the lower end of the display module.

16. The display device of claim 2, further comprising:
a dummy extension extending in the second direction and the first direction, disposed over an uppermost support part among the plurality of support parts and surrounding the uppermost support part in the second direction,
wherein a $(k+1)^{th}$ support part among the plurality of support parts includes:
   a first extension disposed under a $k^{th}$ support part among the plurality of support parts the first extension extending in the second direction; and
   second extensions which extend from the first extension in the first direction and are adjacent to two end sides of the $k^{th}$ support part in the second direction, respectively, and
wherein the dummy extension is adjacent to the second extensions in the second direction, a total number of the support parts is greater than 2, and k is a natural number.

17. The display device of claim 2, wherein a first support part among the plurality of support parts includes:
a first extension extending in the second direction; and
a plurality of second extensions extending from the first extension in the first direction and spaced apart from each other in the second direction,
wherein a last support part among the plurality of support parts includes:

a first_first extension extending in the second direction; and
a plurality of second_first extensions extending from the first_first extension in the first direction and spaced apart from each other in the second direction,
wherein at least one support part among the plurality of support parts is disposed between the plurality of second extensions, and
wherein at least one second_first extension among the plurality of second_first extensions is inserted into at least one depression defined on at least one other support part among the plurality of support parts.

18. A display device comprising:
a display module;
a plurality of support parts coupled to the display module, the plurality of support parts being arranged in a first direction and coupled to move relative to each other in the first direction; and
a drive belt deformable in a curved shape, connected to an uppermost support part among the plurality of support parts and disposed in a guide groove defined in each of the plurality of support parts except for the uppermost support part,
wherein a $k^{th}$ support part is connected to at least a part of two end sides of a $(k+1)^{th}$ support part disposed under the $k^{th}$ support part and moves in the first direction, the plurality of support parts includes the $k^{th}$ support part and the $(k+1)^{th}$ support part, a total number of the support parts is greater than 2, and k is a natural number.

19. The display device of claim 18, further comprising:
a drive part connected to the drive belt and which moves the drive belt along the guide groove in the first direction.

20. The display device of claim 18, wherein some of the support parts support the display module in a second direction crossing the first direction.

* * * * *